US006928713B2

(12) United States Patent
Baer

(10) Patent No.: US 6,928,713 B2
(45) Date of Patent: Aug. 16, 2005

(54) HINGE MOUNTING SYSTEM

(76) Inventor: Austin R. Baer, 24416 Hwy. 550, Ridgway, CO (US) 81432

( * ) Notice: Subject to any disclaimer, the term of this patent is extended or adjusted under 35 U.S.C. 154(b) by 0 days.

(21) Appl. No.: 10/731,709

(22) Filed: Dec. 8, 2003

(65) Prior Publication Data

US 2004/0134034 A1 Jul. 15, 2004

Related U.S. Application Data

(62) Division of application No. 10/419,618, filed on Apr. 21, 2003, now Pat. No. 6,694,568, which is a division of application No. 09/957,310, filed on Sep. 19, 2001, now Pat. No. 6,732,409.

(60) Provisional application No. 60/234,163, filed on Sep. 20, 2000.

(51) Int. Cl.[7] .................................................. B23P 11/00

(52) U.S. Cl. .............................. 29/434; 29/11; 29/464; 29/467; 29/469; 29/271; 81/484; 33/645

(58) Field of Search ............................ 29/11, 434, 464, 29/467, 469, 271; 81/46, 484; 248/300; 33/562, 645; 269/37, 40–43, 47, 49, 50; 16/354, 234–237, 247–249, 257–259, 269–272, 263–265, 243, 382, 223

(56) References Cited

U.S. PATENT DOCUMENTS

| | | | | |
|---|---|---|---|---|
| 290,464 | A | 12/1883 | Parnall | 16/388 |
| 312,947 | A | 2/1885 | Andrews | 16/388 |
| 591,359 | A | 10/1897 | Pomeroy | 16/293 |
| 729,406 | A | 5/1903 | Peterson | 16/384 |
| 746,509 | A | 12/1903 | Hogan | 16/389 |
| 795,844 | A | 8/1905 | Marsh | 16/389 |
| 1,098,634 | A | 6/1914 | Neighbors | 16/389 |
| 1,332,768 | A | 3/1920 | Simmons | 16/387 |
| 1,346,029 | A | 7/1920 | Hubbard | 16/271 |
| 1,429,527 | A | 9/1922 | Paul | 16/389 |
| 1,481,142 | A | 1/1924 | Minton et al. | 16/271 |
| 1,835,042 | A | 12/1931 | Hammer | 312/227 |
| 2,048,380 | A | 7/1936 | Hansen | 16/128 |
| 2,371,729 | A | 3/1945 | Aspenleiter | 16/159 |
| 2,587,818 | A | 3/1952 | Caldwell et al. | 16/167 |

(Continued)

FOREIGN PATENT DOCUMENTS

| | | |
|---|---|---|
| DE | 42086 | of 0000 |
| FR | 1363803 | 5/1964 |
| GB | 11382 | 5/1913 |
| GB | 2117041 A | 11/1982 |
| JP | 9-100670 | 4/1997 |

OTHER PUBLICATIONS

Xerox Disclosure Journal, Teri J. Mahuson, Continuous Hinge, vol. 8, No. 3, May/Jun. 1983.

ROTON Continuous Hinge, 1989 ROTON Corporation, catalog.

*Primary Examiner*—Essama Omgba
(74) *Attorney, Agent, or Firm*—Morgan, Lewis & Bockius LLP

(57) ABSTRACT

A hinge that has a first mounting base for attachment to a first hinged object. The hinge also has first and second hinge members pivotally connected together. The first hinge member and the first base are configured and dimensioned for cooperatively positioning and aligning the first hinge member in a plurality of mounted positions along the base length. At least one first locking member is associated with the first hinge member and the first base for locking the first hinge member to the first base in one of the mounted positions. The hinge may also be segmented. A positioning tool may be connected to at least the first base with an attachment portion and configured for positioning the first base and attachment portion on a first hinged object at a predetermined distance from the second hinge member.

19 Claims, 49 Drawing Sheets

U.S. PATENT DOCUMENTS

| | | | | | |
|---|---|---|---|---|---|
| 2,615,194 | A | | 10/1952 | Kreiner | 16/129 |
| 2,655,686 | A | | 10/1953 | Summersgill | 16/161 |
| 2,742,665 | A | | 4/1956 | Stock | 17/128 |
| 2,852,802 | A | | 9/1958 | Seby | 16/135 |
| 3,092,870 | A | | 6/1963 | Baer | 16/128 |
| 3,197,806 | A | | 8/1965 | Ennis | 16/159 |
| 3,346,910 | A | | 10/1967 | Dickinson et al. | 16/163 |
| 3,402,422 | A | | 9/1968 | Baer | 16/163 |
| 3,718,943 | A | | 3/1973 | Bustin | 16/178 |
| 3,871,283 | A | | 3/1975 | John | 109/56 |
| 4,007,514 | A | | 2/1977 | Salice | 16/129 |
| 4,087,942 | A | | 5/1978 | Herrmann | 49/501 |
| 4,104,762 | A | | 8/1978 | Rock et al. | 16/129 |
| 4,189,805 | A | * | 2/1980 | Backus | 16/237 |
| 4,368,558 | A | | 1/1983 | Grass | 16/332 |
| 4,407,044 | A | | 10/1983 | Iseki | 16/237 |
| 4,613,998 | A | | 9/1986 | Drexhage | 5/136 |
| 4,679,277 | A | | 7/1987 | Shibata | 16/354 |
| 4,839,940 | A | | 6/1989 | Grass | 16/258 |
| 4,864,688 | A | | 9/1989 | Gerber | 16/261 |
| 4,976,008 | A | | 12/1990 | Baer | 16/354 |
| 4,996,739 | A | | 3/1991 | Baer | 16/354 |
| 4,999,878 | A | | 3/1991 | Baer | 16/354 |
| 4,999,880 | A | | 3/1991 | Baer | 16/354 |
| 5,001,810 | A | | 3/1991 | Baer | 16/302 |
| 5,025,530 | A | | 6/1991 | Ferrari et al. | 16/236 |
| 5,062,181 | A | | 11/1991 | Bobbowski et al. | 16/354 |
| 5,064,319 | A | * | 11/1991 | Ericksen | 408/115 R |
| 5,144,721 | A | | 9/1992 | Schade | 16/237 |
| 5,201,902 | A | | 4/1993 | Baer | 16/354 |
| 5,327,684 | A | | 7/1994 | Herbst | 49/506 |
| 5,685,045 | A | * | 11/1997 | Lace | 16/354 |
| 5,715,577 | A | * | 2/1998 | Lautenschlager et al. | 16/383 |
| 5,778,491 | A | | 7/1998 | Baer | 16/354 |
| 5,991,975 | A | * | 11/1999 | Baer | 16/354 |
| 6,073,310 | A | | 6/2000 | Baer | 26/354 |
| 6,073,330 | A | | 6/2000 | Roy | 29/281.5 |
| 6,145,164 | A | | 11/2000 | Ferrari et al. | 16/242 |
| 6,382,327 | B1 | * | 5/2002 | Mosdal | 172/311 |
| 6,450,003 | B1 | * | 9/2002 | Pawson | 72/457 |
| 6,694,568 | B2 | * | 2/2004 | Baer | 16/354 |
| 6,732,409 | B2 | * | 5/2004 | Baer | 16/354 |
| 6,735,823 | B2 | * | 5/2004 | Pelletier | 16/354 |
| 2002/0035765 | A1 | | 3/2002 | Baer | |

* cited by examiner

HINGE MOUNTING SYSTEM

CROSS-REFERENCE TO RELATED APPLICATIONS

This is a divisional of U.S. patent application Ser. No. 10/419,618, filed Apr. 21, 2003 now U.S. Pat. No. 6,694, 568, entitled "Hinge Mounting System," which is a divisional application of U.S. patent application Ser. No. 09/957, 310, filed Sep. 19, 2001 now U.S. Pat. No. 6,732,409, entitled "Hinge Mounting System," both of which are incorporated herein by reference.

This application claims benefit of Ser. No. 60/234,163 filed Sep. 20, 2000.

FIELD OF THE INVENTION

The present invention relates to hinges, and more particularly to segmented hinges and hinges with tools and methods to mount and align hinges to hinged objects.

BACKGROUND OF THE INVENTION

When a hinge is mounted to objects to be hinged with respect to each other, care must be taken to ensure proper alignment and mounting of the hinge and hinged objects. Doors that are in need of repair are often retrofitted with various types of hinges that are known for their increased strength among other factors. Hinges that are applied in the field are often installed under less than ideal conditions. To complete a quality field installation of a door, for example, the door must be maintained in proper alignment with the frame, requiring a prescribed set of clearances at each side of the door and at its top and bottom edges. If this is not done, the door may potentially rub against the frame or drag on the threshold, increasing the difficulty for persons entering or leaving the building as well as imposing additional stress and wear on all of the door hardware, such as locksets and automatic door closers.

Uniform industry standards for the design of butt hinges have been applied to doors and frames in the form of cutouts, or receiving mortises, that allow butt hinges to be fastened directly into these recesses. However, not all of the door alignment requirements are assured when the doors and frames are manufactured. Sometimes, particularly if the doors and frames arrive at the job site from different manufacturing sources, the cutouts or recesses may not correspond, creating misalignment problems that can affect the operating clearances. Also, the installation of frames can be affected by improperly dimensioned or misaligned wall openings, resulting in frame distortion that contribute to door misalignment. To install continuous hinges such as disclosed in my U.S. Pat. Nos. 3,092,870; 3,402,422; 4,976, 008; 4,996,739; 4,999,878; 4,999,879; 4,999,880; 5,001, 810; 5,201,902; 5,778,491 and 5,991,975, especially those types that are applied to the exterior faces of doors and frames when they are in need of hinge replacement, the installer typically must carefully remove the damaged hinges and mark and drill for the new fastener locations on both the door and the frame as best he can. All too often, when transferring the new screw hole locations from the continuous hinge to the door and frame, the hinge can shift, or the drill point can slide from the mark, contributing to poor door alignment when the installation is complete. Such fastener hole misplacements occur with even greater frequency when large holes are required for through-bolting, especially when hidden internal door reinforcements are encountered by the installer.

U.S. Pat. No. 1,346,029 teaches a butt hinge intended to be quickly and accurately hung. The hinge has channel portions which attach to a door with barbs and screws. Swinger members can be slid on or off the base plates for quick assembly and removal.

Also, it is often desirable that a continuous hinge match the door height so that resistance to the various forces acting on the door will be enhanced. Also, the sealing against the penetration of light, sound, and weather through the hinged edge of the door can be optimized when the hinge length is approximately equal to the door height. A wide variety of door heights exists, however. For instance, minimum residential door heights are typically 6'–8", while doors for commercial and institutional applications are commonly 7' or larger. It has been traditionally difficult to manufacture, handle, and store the many hinge lengths required to properly fit a variety of doors designed for architectural use.

Continuous hinges for these applications are subject to damage within the manufacturing environment because of the length and fragility of their component parts and because of consequential damage to the completed assembly during the various stages of shipment and transportation from the manufacturing site through the complex channels of distribution to the point of installation. Packaging, shipping, and shipping damage costs can become high because of the unusual ratio of length-to-girth or width of the package and the stringent requirements for protection against bending. In addition, the inventory storage requirements for these long and fragile hardware items are costly, because they require specialized shelving or racks at every intermediate location.

Costs are also present for obtaining and preserving the long lengths of the required hinge components before the assembly process can begin. The generation of manufacturing-scrap is increased at every stage if a part is dropped, twisted or bent, or if a fabrication or finishing defect appears within its length at any point in the manufacturing sequence. Unlike conventional butt hinges, which are comprised of smaller, easier to handle and cheaper parts, any such defect reduces or destroys the value of an inherently long continuous hinge part which can add substantially to the overall cost of manufacture. While continuous hinges for very tall doors have sometimes been pieced together to form assemblies that are longer than any practical manufactured length, little attention has been paid to properly aligning these segments during installation so that the segments simulate the function of a single hinge.

Further complexity and cost results from the difficulty of maintaining adequate inventory of each and every required length suitable to the variety of door heights used in the construction industry. While it is possible to manufacture continuous hinges in virtually any reasonable length for large orders, the availability of unusual custom lengths is often subject to long delays and high costs at each step of the manufacturing and distribution cycle. The retrofit and door repair industry, which is a very large portion of the market for continuous hinges, is typified by its requirement for the immediate availability of an enormous variety of models and lengths so that schools, hospitals, shopping malls and other commercial locations can have their doors quickly restored to proper operation for reasons of traffic flow, safety, and security.

Also, one of the more difficult steps in continuous hinge installation in the field is the proper marking and preparation of the fastener holes in a way which will insure the alignment of the door to its frame when the installation is complete. Currently, the installation of continuous hinges is dependent upon the skills of the individual installer. While individual butt or mortise hinges are typically fitted into cutouts with pre-threaded bolt holes prepared in both the door and the frame at their respective factories, continuous hinges are more frequently applied to the unprepared surfaces of doors and frames which offer little to assist in their alignment. Repair work in particular, where continuous hinges are used to overcome conditions in which conventional hinges have failed, is more dependent upon the skill level of the installer because the working environment as well as the condition of the door and frame components may be less than ideal, largely because the doors themselves may have suffered damage when their hinges failed and because the work must often be completed very quickly with a minimum of installation tools. Unless all of the fastener locations for a continuous hinge are carefully marked and drilled, the door will interfere with or rub against the frame following installation or shortly thereafter.

SUMMARY OF THE INVENTION

The present invention is directed to a hinge with first and second hinge members pivotally connected together. In one embodiment, a first mounting base having a first base length is provided for attachment to a first hinged object. The first hinge member and the first base are configured and dimensioned for cooperatively positioning and aligning the first hinge member in a plurality of mounted positions along the length of the first base. At least one first locking member is associated with the first hinge member and the first base for locking the first hinge member to the first base in one of the mounted positions, which preferably includes substantially a continuum of mounting positions over at least one range. The hinge may be a pinless hinge.

The preferred hinge has a hinge width with the first and second hinge members pivoted away from each other, and the ratio of the first length to the hinge width is greater than about 1.25, and more preferably greater than about 2. Also, the first base can be of integral construction with the first hinged object or otherwise attached thereto.

The first base of the preferred embodiment includes a ledge. The first hinge member includes a hook portion engageable around the ledge configured for mounting the first hinge member to the first base.

The locking member preferably has a locked position for locking the first hinge member to the first base, an unlocked position for releasing the first hinge member from the first base, and is movable in a locking direction between the unlocked and locked positions. The first base includes a fastening surface disposed at a fastening surface angle to the locking direction. The fastening surface angle is preferably between about 20° and 60°, but it is anticipated that various cooperating profiles for hooking and locking the first hinge member and the first base to each other may be used, such as "v" shapes or inverted "v" shapes on each edge of the mounting base. The second mounting base and second hinge member may utilize alternate but functionally similar profiles as the first mounting base and the first hinge member, depending on the requirements and limitations of the door and frame materials and profiles, i.e., the first and second mounting bases need not be the same size or shape to function in a similar manner.

In this embodiment, the first base and the first hinge member have lateral edges that are engageable to each other for mounting the first hinge member to the first base. The hinge has a second mounting base for attachment to a second hinged object and for mounting the second hinge member.

A preferred hinge mounting system of the invention includes a first mounting base attachable to a first hinged object and configured and dimensioned for mounting a first mountable portion of a first hinge member thereto with the first base attached to the first hinged object. A mount assembly for a second hinge member and for attachment to a second hinged object is also provided. Preferably, the mount assembly comprises a second mounting base configured and dimensioned for mounting a second mountable portion of the second hinge member thereto with the second base attached to the second hinged object. The mounting system includes a positioning tool connected to the first base and to a mount assembly of the second hinge member. The mounting tool is configured for positioning the first base and mount assembly at a predetermined distance from each other for placement on and attachment to the hinged objects. The first and second hinge members may further be pivotally connected together.

The mounting system may include the first and second hinge members, for which the first mounting base and the mount assembly are configured and dimensioned for mounting thereto, respectively, being sized and connected together to position the first mounting base and the mount assembly at a mounted distance that is different than the predetermined distance set by the positioning tool. This may be achieved by selecting a first and second hinge member each having a total width when connected together that increases or decreases the spacing between the first mounting base and mount assembly after the hinge members are attached. This aspect of the invention is useful for adjusting the spacing or gap between the first and second hinged objects to be closer or farther apart than the their original spacing before the hinges are mounted.

In the preferred embodiment, the positioning tool is associated with the first base and the mount assembly for substantially restricting a distance between the first base and mount assembly to a preselected maximum or minimum distance. The positioning tool can be adjustable to select the maximum or minimum distance. The tool can include a flexible portion, and it may be substantially rigid.

An embodiment of the mounting tool has a magnet magnetically connecting the positioning tool to the first base. Another embodiment uses non-magnetic means to connect the positioning tool to the first base.

An embodiment of the mounting system has a disconnect portion that is frangible and disposed such that severing of the disconnect portion causes the positioning tool to disconnect the first base from the mount assembly. Another embodiment contains one or more pierced openings to allow the installer to peer through the frangible or solid positioning tool to properly align it with the interface between the door and the frame or other hinged objects. The disconnect portion of an embodiment includes a tearstrip configured for severing the positioning tool at the disconnect portion.

An embodiment of the tool further includes a hinged object spacer having a thickness and protruding from the positioning tool at an angle with respect to the direction of the predetermined distance and configured for setting a clearance between the hinged objects depending the thickness of the object spacer.

An embodiment of the tool may include means for adjusting the positioning of the hinged bases to accommodate differences in the attachment planes of the hinged objects.

In one embodiment, at least the first base includes an adhesive configured and disposed for attaching to the first hinged object. In another embodiment, at least one of the first base and the positioning tool includes first and second segments of non-unitary construction.

An embodiment of the hinge is segmented and includes a first hinge member attachable to a hinged object and a second hinge member attachable to another hinged object. The first and second hinged member are pivotally connected together. Preferably, a clamp is provided to pivotally connect the first and second hinge members. At least the clamp or both hinge members of this embodiment are segmented into at least first and second segments disposed in longitudinal series. One embodiment has the first and second hinge members collectively segmented into the first and second segments. The first and second hinge members of an embodiment include at least lateral or longitudinal support configuration, and the support configuration is different in the first and second segments. The support configuration in the first hinge segment is preferably free of longitudinal supports between the hinge members, such that the hinge members in the first segment are is movable longitudinally relative to each other.

In the second hinge segment, the support configuration includes at least one longitudinal support for restricting relative longitudinal movement between the hinge members. Another embodiment has a mounting base configured for attachment to a hinged object, wherein the first hinge member and base are configured and dimensioned for cooperatively positioning and aligning the first hinge member to the base. Preferably, the mounting base is segmented into first and second segments disposed in longitudinal series. In another embodiment, a coupling member is provided that is configured for coupling the first and second segments together with the hinge detached from the hinged objects.

Another embodiment of the hinge is segmented, preferably including a pin pivotally connecting knuckle portions of first and second hinge members. At least one of the first and second hinge members and the pin of this embodiment is segmented into first and second segments disposed in longitudinal series. One embodiment has the first and second hinge members collectively segmented into the first and second segments. The first and second hinge members of an embodiment include at least lateral or longitudinal support configuration, and the support configuration is different in the first and second segments. The support configuration in the first segment is preferably movable longitudinally between the hinge members, accomplished by allowing extra longitudinal spacing between the knuckle of the connected hinge members. In the second hinge segment, the support configuration includes at least one pair of knuckles that restrict relative longitudinal movement between the hinge members.

The preceding pinned hinge is described in U.S. Pat. No. 5,778,491, with particular reference to FIG. 12 therein and the accompanying discussion; this patent being incorporated herein by reference. FIG. 12 depicts a first segment 142 wherein the connected hinge members are movable longitudinally with respect to each other. Second segment 160 depicted in FIG. 12 has a support configuration wherein at least one pair of knuckles restrict relative longitudinal movement between the hinge members. Of course, the present invention may be used with other pinned hinges such as the covered type hinge described in my U.S. Pat. No. 5,991,975, which is incorporated herein by reference.

The mounting base of a segmented embodiment is segmented into first and second base segments disposed in longitudinal series. In an embodiment, at least one of the base members may be mounted to the hinged members in a non-segmented length approximately equal to the full height of a door or a frame. Similarly, at least one of the hinge members may be non-segmented and mounted to base members in which one or both may be segmented in order to accommodate the installation of segmented hinged objects such as "Dutch" doors.

In an embodiment, a hinge has first and second hinge members attachable to first and second hinged objects. A joining member, such as a clamp or a pin, is provided for pivotally connecting the first and second hinge members together in coupled association. At least the joining member or both hinge members are segmented into at least first and second segments. At least one coupling member is also provided that is configured for coupling the first and second segments together with the hinge detached from the hinged objects and coaxially aligned and disposed in longitudinal series. In an embodiment, both the hinge members and joining member are segmented into at least first and second segments that are connected by coupling members.

In a preferred method of mounting a hinge to two hinged objects, a first base is aligned and spaced in a mounting position from a mount assembly of a second hinge member with a positioning tool. The first base is attached to a first hinged object in the mounting position, and a first hinge member that is pivotally connected to the second hinge member is aligned and mounted to the first base. The mount assembly may then be attached to a second hinged object, and the second hinge member may then be attached thereto.

The mounting portion is preferably connected to the first base and the mount assembly in connected association with the positioning tool. The connected association is disconnected, with the first member mounted to the first base.

In some embodiments of the invention, the mounting base for one hinge member and the mount assembly for the other hinge member are positioned with a positioning tool at a predetermined distance. When the hinge members are mounted to the first base and mount assembly, these are positioned at a mounted distance with respect to each other that is different than the predetermined distance.

An embodiment of a mounting base has an attachment portion and a fastening assembly associated with the attachment portion for selectively attaching in a plurality of positions to the hinged object at an attachment position on the hinged object.

In an embodiment, a positioning tool for mounting a hinge is provided having a first base positioner and a detachable second base positioner. The base positioners are configured and adapted for receiving a first and second hinge mounting base; the bases for mounting to a first and second hinged object, respectively. A connecting means, which may be a fastener, releaseably holds the first and second mounting base positioners together. The positioning tool may further comprise the first and second base positioners each having a base retaining portion for placement over the first and second mounting bases, respectively, and a handle portion which is angularly disposed at an angle to the contact portion and may be used to grasp the tool. The angle is about 90 degrees in one embodiment. In one embodiment, the offset means comprises the handle portion of the first base positioner having a round opening for receiving the connecting means and the handle portion of the second base positioner having an elongated opening for receiving the connecting means. This arrangement allows the offset to be formed via the slidable connection between the handle portions.

In another embodiment, the aforementined positioning tool may further have a releasably attached hinged object spacer. The spacer projects a distance outwards from the positioning tool for placement into a gap formed between a first and second hinged object to which hinges are applied. In another embodiment, an adjustment means is provided for varying the projection distance.

A segmented positioning tool in one embodiment, which has a longitudinal axis, has a first and second base positioner that is configured and adapted for receiving a first and second hinge mounting base; the bases for mounting to a first and second hinged object, respectively. The tool is segmented into at least first and second longitudinal segments. In one embodiment, at least one hinge is provided that is laterally arranged on the tool for holding the at least first and second segments in a pivotable relationship.

The present invention eases the task of hinge installation and improves the quality of door operation by enabling pre-alignment of the hinge or hinge segments to the hinged objects before the hinge is installed. Whether the hinge is installed as a single piece or arrives at the installation in multiple lengths to be joined together endwise, this invention allows increased speeds of installation and improved operation of the door opening.

Yet another advantage of this invention is the improved appearance and security of the hinges. Previous to this invention, many continuous hinges utilize full-length moldings whose sole purpose is to conceal fasteners to improve security and appearance. These costly extra moldings can be eliminated because the fasteners that hold the hinges to the door and to the frame can be covered by the hinge members themselves, thereby hindering or preventing unauthorized access to the fasteners or removal of the hinge.

It should be noted that the hinges of the present invention may be mounted in a variety of configurations, several of which are shown in the accompanying drawings. For example, the segmented hinge may be provided, with one or more segments being capable of longitudinal support as shown in FIG. 36. The hinge may utilize segments that are all capable of longitudinal support if desired. In another embodiment, one hinge member may be segmented while its mating hinge member may be of continuous length. In yet another embodiment, the mounting base may be segmented while the hinge members are continuous or divided into sections segmented in different lengths than the mounting base as shown in FIG. 35. Alternatively, one of the two (or more) mounting bases can be continuous while the other(s) is/are segmented. Of course, any of the foregoing combinations may be used; for example, segmented bases with segmented hinge sections, segmented hinge sections with non-segmented bases or vice versa, one of the bases or hinge members being continuous and the other segmented, one or more of the foregoing hinge members being capable of longitudinal support, etc. Preferably, the joints between segments of the mounting bases should not be located at the same vertical location or position (on the door and frame) as the joints between segments of the hinge members.

BRIEF DESCRIPTION OF THE DRAWINGS

FIG. 73*a*–*c* are various views of a stop for a segmented pinless hinge;

DETAILED DESCRIPTION OF THE PREFERRED EMBODIMENTS

Figure 1:
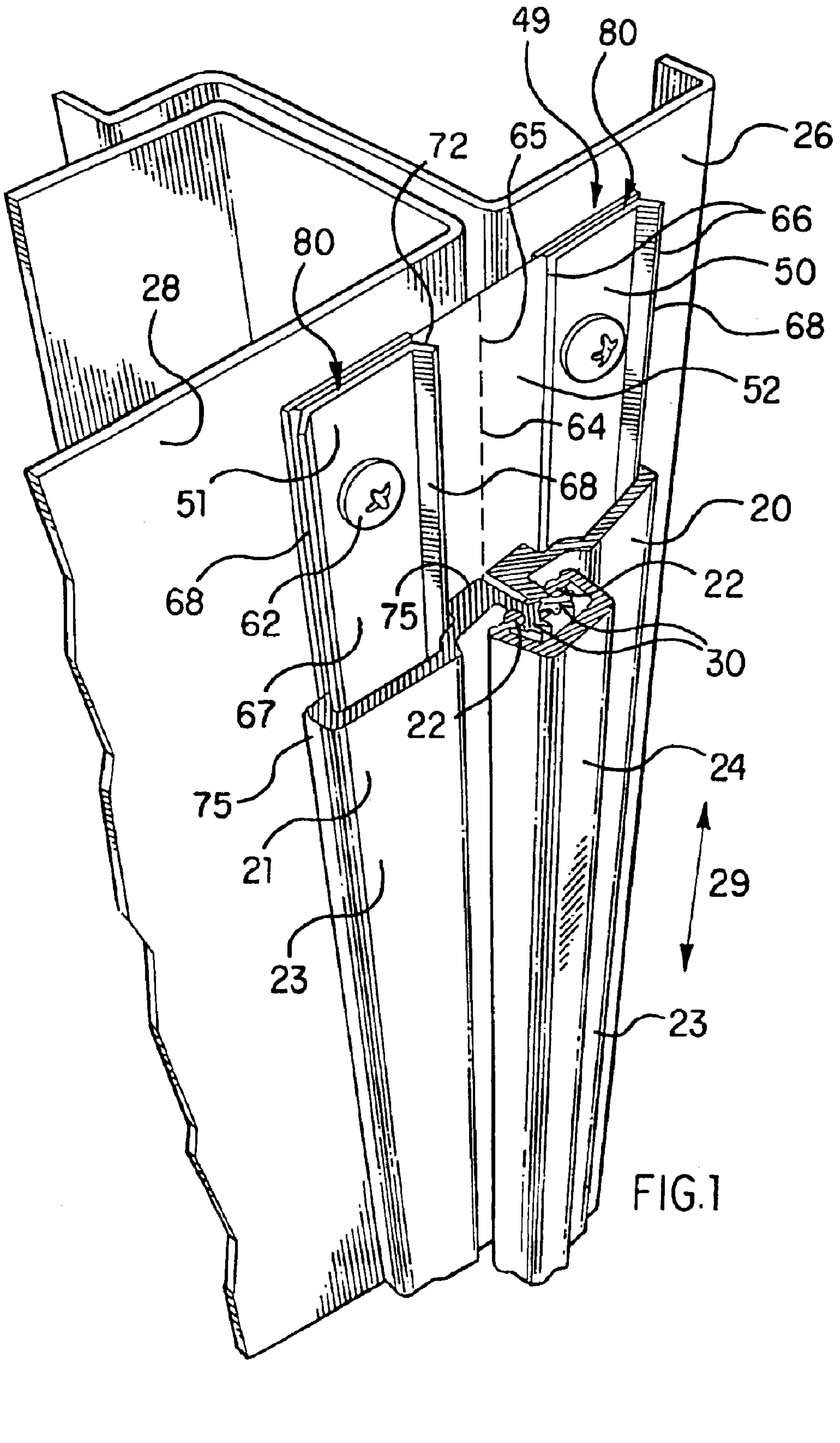
FIG. 1 is a perspective view of a hinge constructed according to the invention.

Referring to FIG. 1, an embodiment of a continuous pinless hinge according to the invention has two hinge members 20,21. The hinge members 20,21 are rotatably engaged to two semi-cylindrical ends 22 of a joining member, such as a clamp 24. The hinge members 20,21 are fixed to hinged objects 26 and 28, which in FIG. 1 are a door and a frame.

The edges of hinge members 20,21 comprise gear segments 30 that extend in a longitudinal direction 29 longitudinally, parallel to the length of the clamp 24. The hinge members 20,21 are pivotally mounted together, as gear segments 30 are pivotally mounted about the semi-cylindrical ends 22 of the clamp 24, which in this embodiment are at the axes of rotation of the hinge members 20,21. The clamp 24 retains the gear segments 30 in mesh and preferably provides lateral support throughout the length of the hinge. Other embodiments do not have meshed gear segments.

Figure 2:
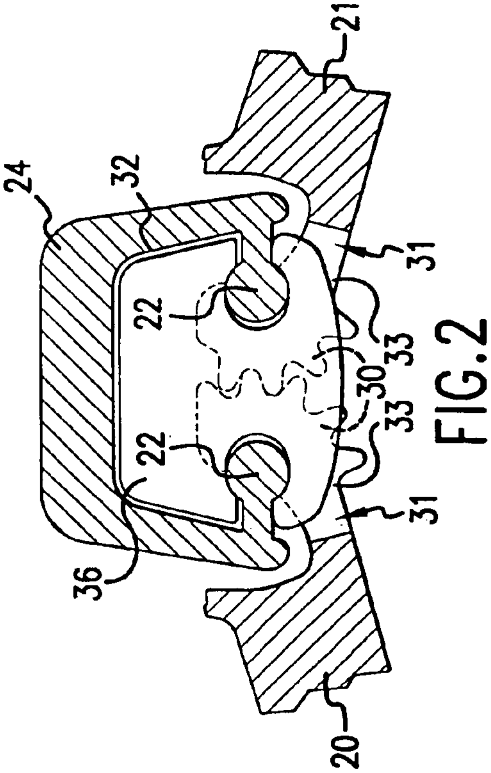
FIG. 2 is a cross-sectional view through a lateral plane in the hinge of FIG. 1.
Figure 4:
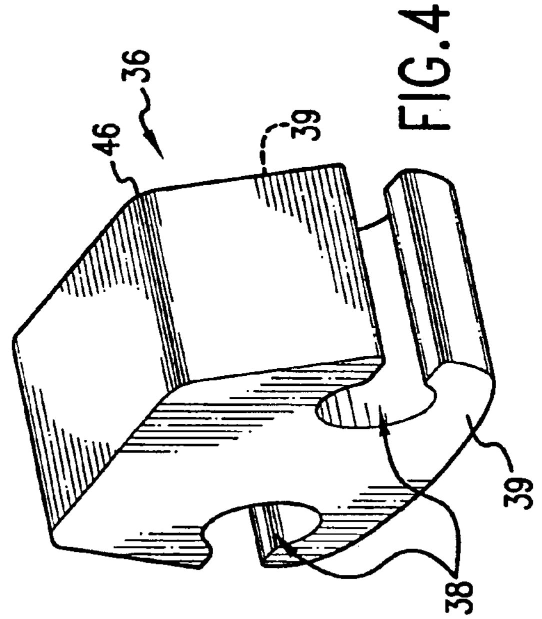
FIG. 4 is a perspective view of an embodiment of a thrust bearing thereof.
Figure 3:
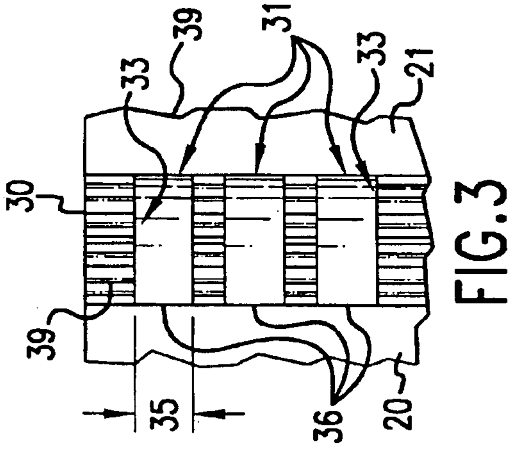
FIG. 3 is a cutaway underside view of the hinge.

In cross-section, the clamp 24 has an internal preferably C-shaped channel 32, as shown in FIG. 2. Recesses 31 extend through the gear segments 30 at various intervals, as shown in FIGS. 2 and 3, and are bound by opposing recess surfaces 33. To restrict, and preferably prevent relative longitudinal movement between the hinge members 20,21, thrust bearings 36, as shown in detail in FIG. 4, are received in the clamp channel 32, within recesses 31 of both hinge members 20,21.

The longitudinal dimensions 35 of the recesses 31 are large enough so that the thrust bearings 36 leave sufficient clearance therebetween for the hinge members 20,21 to pivot without binding on the bearings 36. The bearings 36 are preferably longitudinally thick enough to prevent their shearing by the hinge members 20,21 when they are biased under the opposing loads of the door and the frame.

Bearings 36 are formed with longitudinally extending slots 38 configured to receive the semi-cylindrical clamp ends 22. As seen in FIG. 2, the bearings 36 preferably mostly fill the cross-section of the clamp channel 32.

Each bearing 36 has parallel bearing surfaces 39 disposed on opposite longitudinal sides of the body 46 of the bearing 36. These bearing surfaces 39 abut and support the recess surfaces 33. The recess and bearing surfaces 33 and 39 preferably lie flush with one another to maximize the area of contact therebetween, reducing the pressure and wear on each surface 33 and 39. In another embodiment, these bearing surfaces comprise separate inserts, as disclosed in U.S. Pat. No. 4,976,008, which are assembled to form part of the body 46.

Relative longitudinal movement of the clamp 24 with respect to the hinge members 20,21 is preferably prevented by securing or fastening one or more thrust bearings 36 to the clamp 24, such as by means of a set screw, adhesives, or crimping. Where segmented hinge assemblies are used that contain no thrust bearings 36 in some of the segments (see FIG. 36 and accompanying discussion below), means for providing some longitudinal restriction in movement of the clamp member relative to the hinge members is required to keep the clamp from sliding to the floor in these unsupported segments. A device such as a single thrust bearing 36, a metal tab similar to FIGS. 6–9 shown in U.S. Pat. No. 3,402,422, or similar device may be used for this purpose.

Referring again to FIG. 1 mount assemblies 49 include mounting bases 50,51 that are shown attached to the hinged objects 26,28. Each hinge member 20,21 has a mountable portion 23 and its corresponding bases 50,51, respectively, are preferably configured and dimensioned for cooperatively positioning and aligning each hinge member 20,21 in a mounted position with respect to the base 50,51 when mounted thereto.

Figure 5:
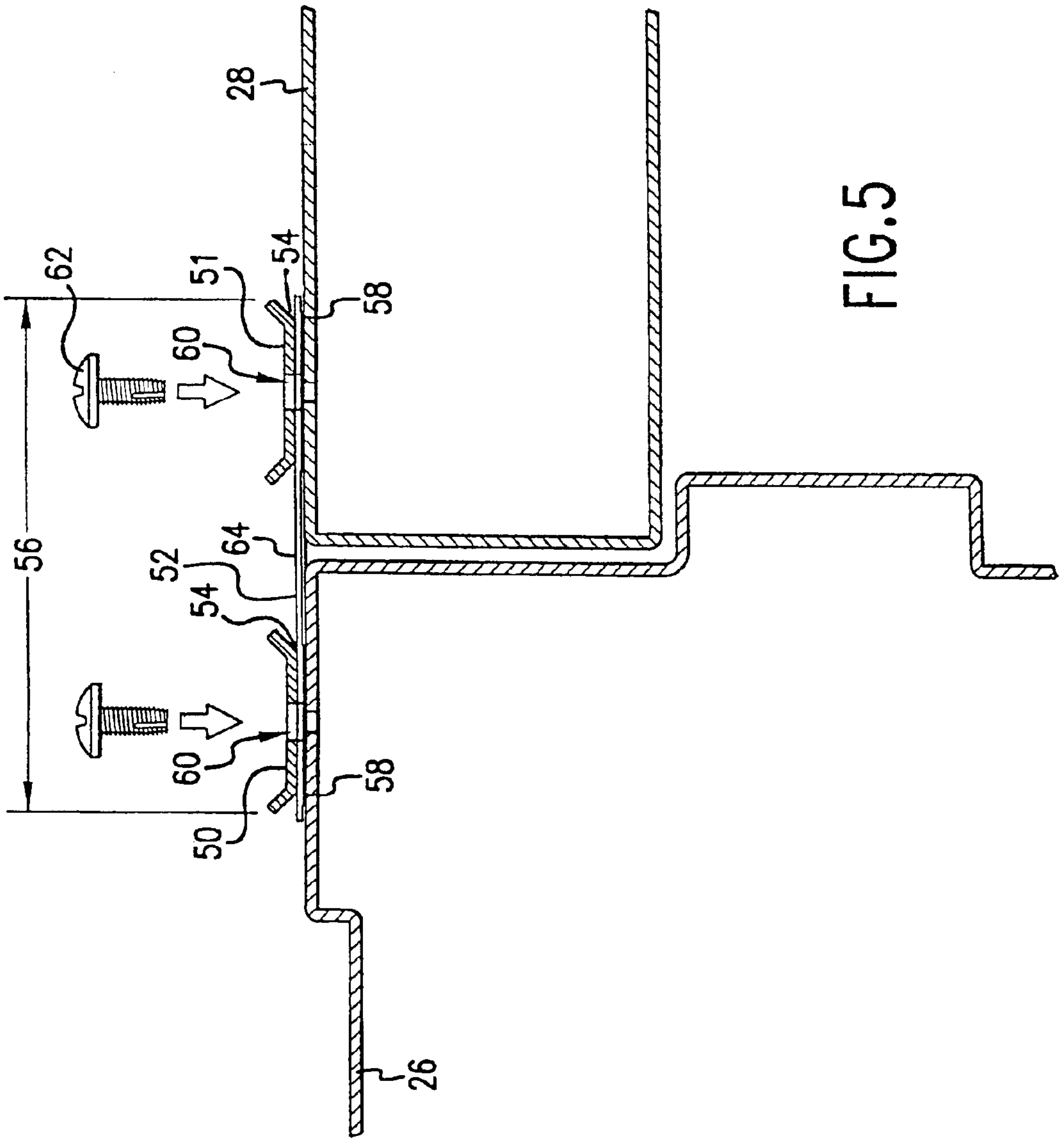
FIGS. 5–10 are cross-sectional top views showing steps in the assembly and mounting of the hinge to hinged objects.

The bases 50,51 of this embodiment are attached to the hinged objects 26,28 as shown in FIG. 5. The bases 50,51 are connected to a mounting spacer or positioning tool 52, preferably by a layer of adhesive 54. The positioning tool 52 includes a preferably flexible web that is configured for positioning the bases 50,51 at a predetermined distance 56 from each other for placement on and attachment to the hinged objects 26,28 in a mounting position. The web is preferably made of a plastic, foil, paper, or rubber, although other materials are suitable. Another layer of adhesive 58 is disposed on the side of the positioning tool 52 opposite from the bases 50,51. This adhesive 58 can thus be exposed prior to attaching to the hinged objects 26,28. The adhesive layers can comprise double-sided tape.

In use, the bases 50,51 are spread apart from each other to locate them at the desired predetermined distance 56 from each other, to properly relatively position them to accept the hinge members 20,21, which will subsequently be mounted thereto. The positioning tool 52 preferably locates the bases 50,51 substantially parallel to each other and with ends of the bases 50,51 preferably at the same longitudinal height. The bases 50,51 are preferably continuous strips of a length approximating the length of the hinge, but it is anticipated that they could be segmented or composed of short lengths arranged substantially parallel to each other and spaced to a length approximating the length of the hinge. The web of the positioning tool is pulled generally flat, to align the bases 50,51 with respect to each other. One of the bases 50,51 can be attached to one of the hinged objects 26,28 first, then the second of the bases 50,51 can be attached to the other hinged object 26,28. The bases 50,51 can then be firmly attached to the hinged objects 26,28 by drilling a hole in the hinged objects 26,28 through openings 60 in the bases 50,51, and fastening a fastener 62 therethrough, such as a screw or a bolt, or other fastener known in the art.

Figure 45:
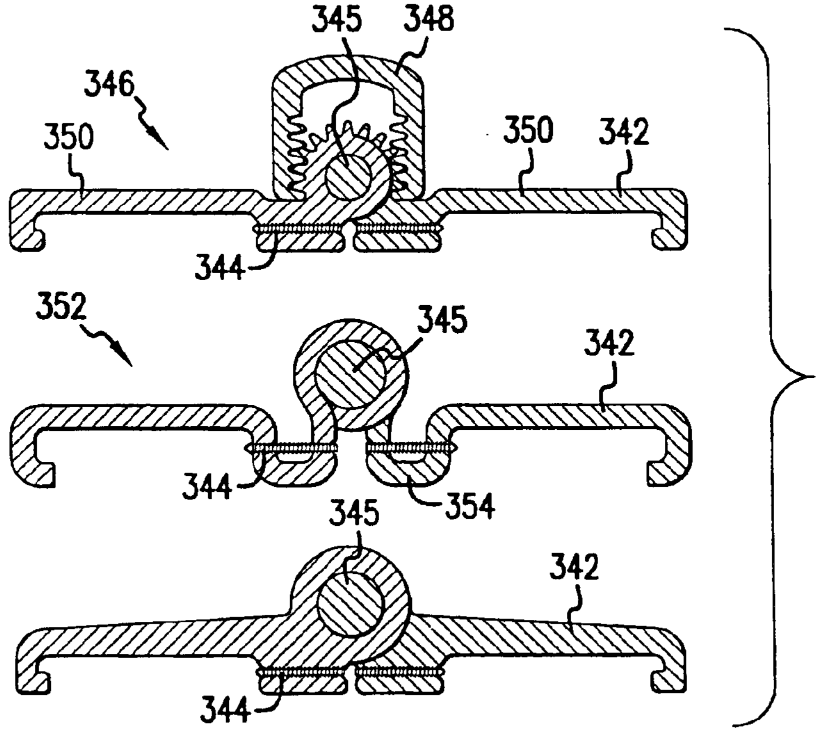
FIG. 45 shows cross-sectional top views of embodiments of pinned hinges relative to mounting bases.

Although the positioning tool in FIG. 1 is shown being used with a pinless hinge, it will be appreciated that the tool may also be used with pinned or pinned and covered hinges such as those shown in FIG. 45, for example.

Figure 6A:
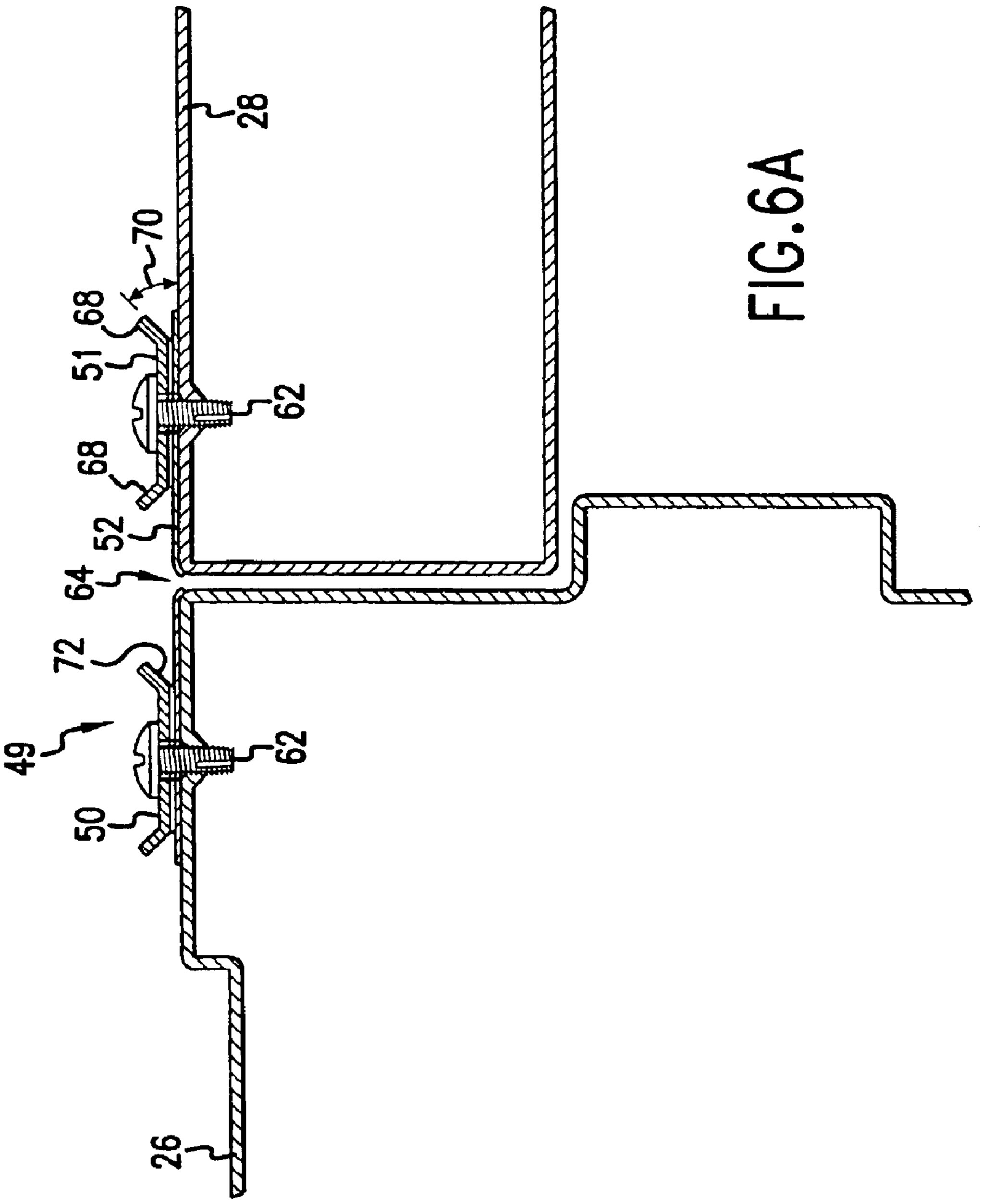

As shown in FIG. 6*a*, the positioning tool is then severed to disconnect the connection between the bases 50,51 through the positioning tool 52. The severing is done through a frangible disconnect portion 64 of the positioning tool 52. This frangible portion 64 is preferably marked by indicia 65, as shown in FIG. 1, such as a solid or segmented line. The frangible portion 64 of this embodiment also preferably comprises a perforated portion of the positioning tool 52, and can be severed by applying localized pressure, such as by a screwdriver blade biased against the positioning tool 52 in the space between the hinged objects 26,28, or can be cut, such as by a utility knife blade.

Figure 6B:
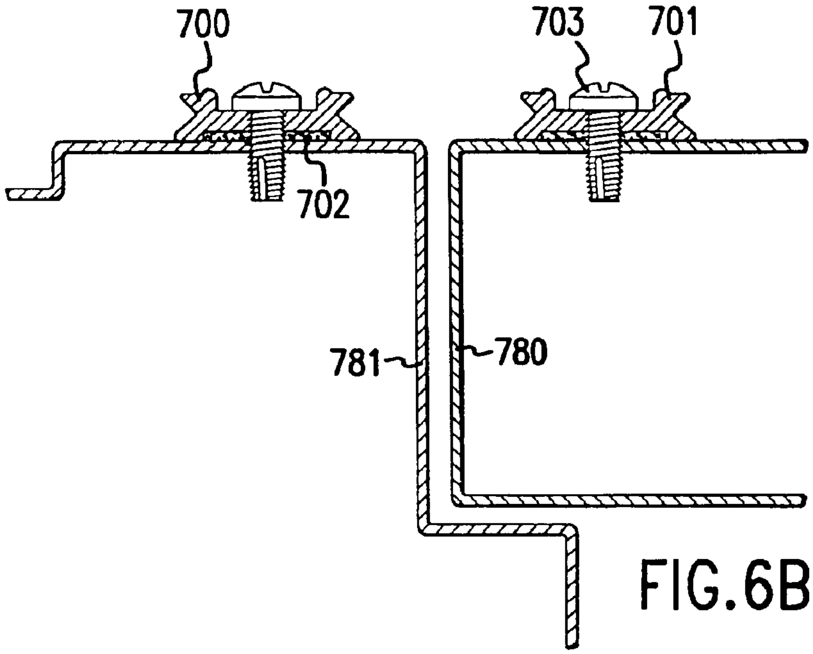

Each base 50,51 of this embodiment is generally elongated and has a length similar to that of the hinge members 20,21. The bases 50,51 are preferably constructed as rails and made of sheet metal, such as steel, or it may be an extruded metal or plastic part. Each base 50,51 also has a substantially flat attachment portion 67, which includes the fastener openings 60 and which preferably attaches to the hinged objects 26,28, and has a mounting portion 66 configured for aligning and mounting the hinge members 20,21 thereto. The mounting portions 66 preferably include elevated portions such as upturned lateral sides 68 of the bases 50,51 as shown in FIG. 6*a*, or grooves formed in the sides of extruded or molded bases as shown in FIG. 6*b*. Referring to FIG. 6*a*, the upturned sides 68 form ledges with fastening surfaces 72 spaced from the bottom-of the mount assembly 49, angled, configured and dimensioned for receiving and securing fastening members of the hinge members 20,21, as described below. For the extruded or molded bases 700, 701 shown in FIG. 6*b*, the grooves are angled, configured, and dimensioned in a similar way to that shown in FIG. 6*a*. The cavities 702 on the underside of the mounting bases of FIG. 6*b* are preferably lined with continuous or segmented strips of double-sided foam adhesive tape for temporarily positioning the mounting bases on the hinged objects.

Figure 7:
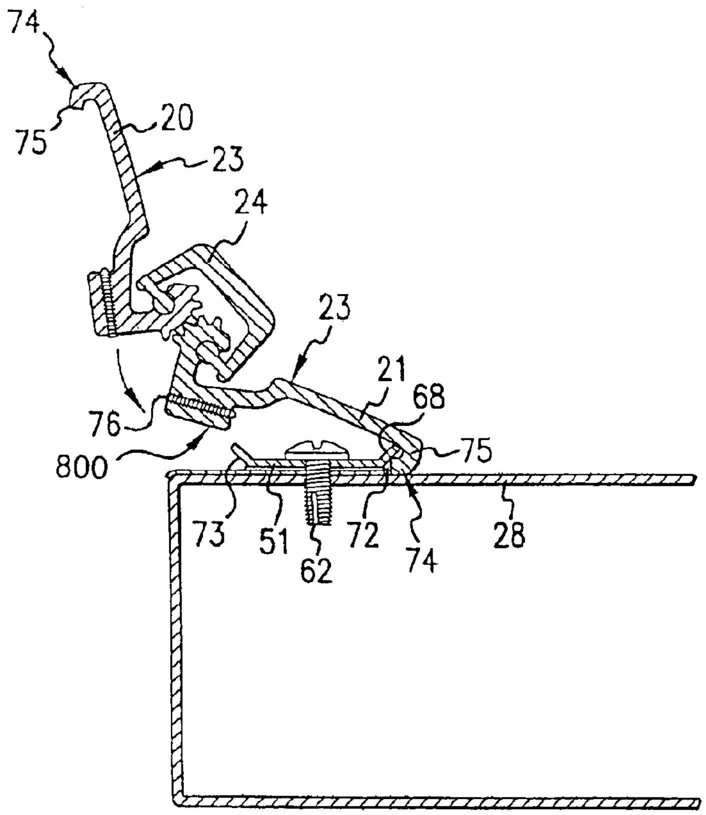

Referring to FIG. 7, hinge members 20,21 have outer mounting portions 74, which in the embodiment shown, include inwardly curved hooks 75, configured to be received against the fastening surfaces 72,73. The outer mounting portion of hinge member 21 is placed in the space between the base 51 and the hinged object 28, engaged against the fastening surface 72. The inner mounting portions 800 of the hinge members 20,21 also include a locking member, preferably fastening members 76, shown retracted in an unlocked or released position, with respect to the adjacent fastening surface 73. The fastening members 76 are movable between the unlocked position shown in FIG. 7 and a locked or engaged position shown in FIG. 8. The fastening members preferably include set screws but may alternatively include other fasteners, adhesives, latches, protrusions and receptacles, or other suitable members, such as locking members that provide a snap-fit locked association between the hinge member and mounting base. The upturned lateral sides 68 of the bases 50,51 are preferably disposed at an angle 70 (shown in FIG. 6A) with respect to the locking direction 77 (shown in FIG. 8) of fastening members 76, which is substantially parallel with the attachment portion 67 of the bases. Angle 70 is preferably less than 90°, and more preferably between about 20° and 60°, and most preferably around 45°. In an alternative embodiment, such as in which a pivotable latch is used, the locking direction of the locking member can be curved.

Figure 8:
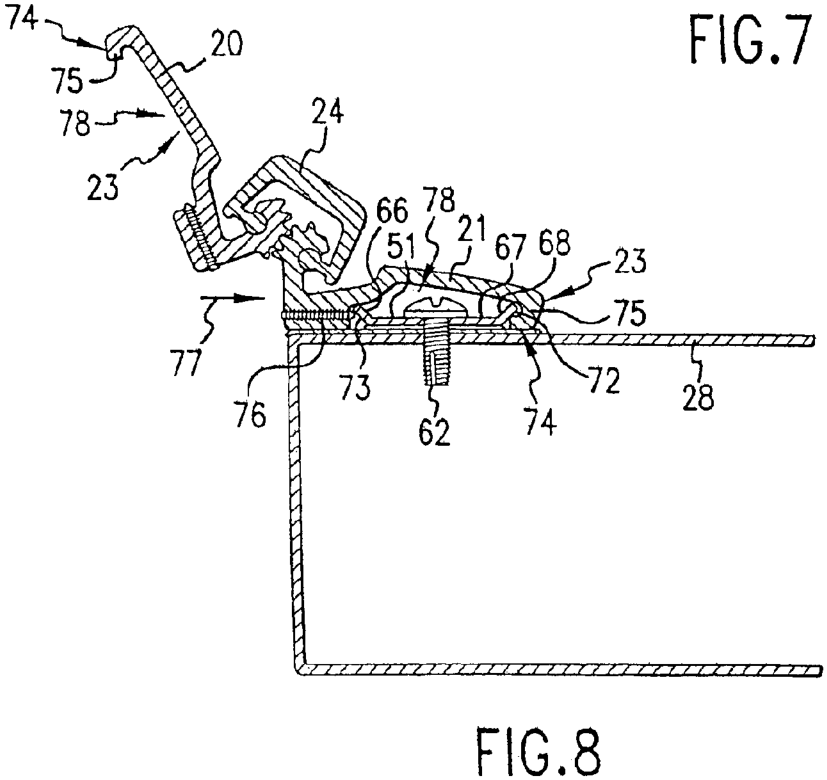
Figure 9:
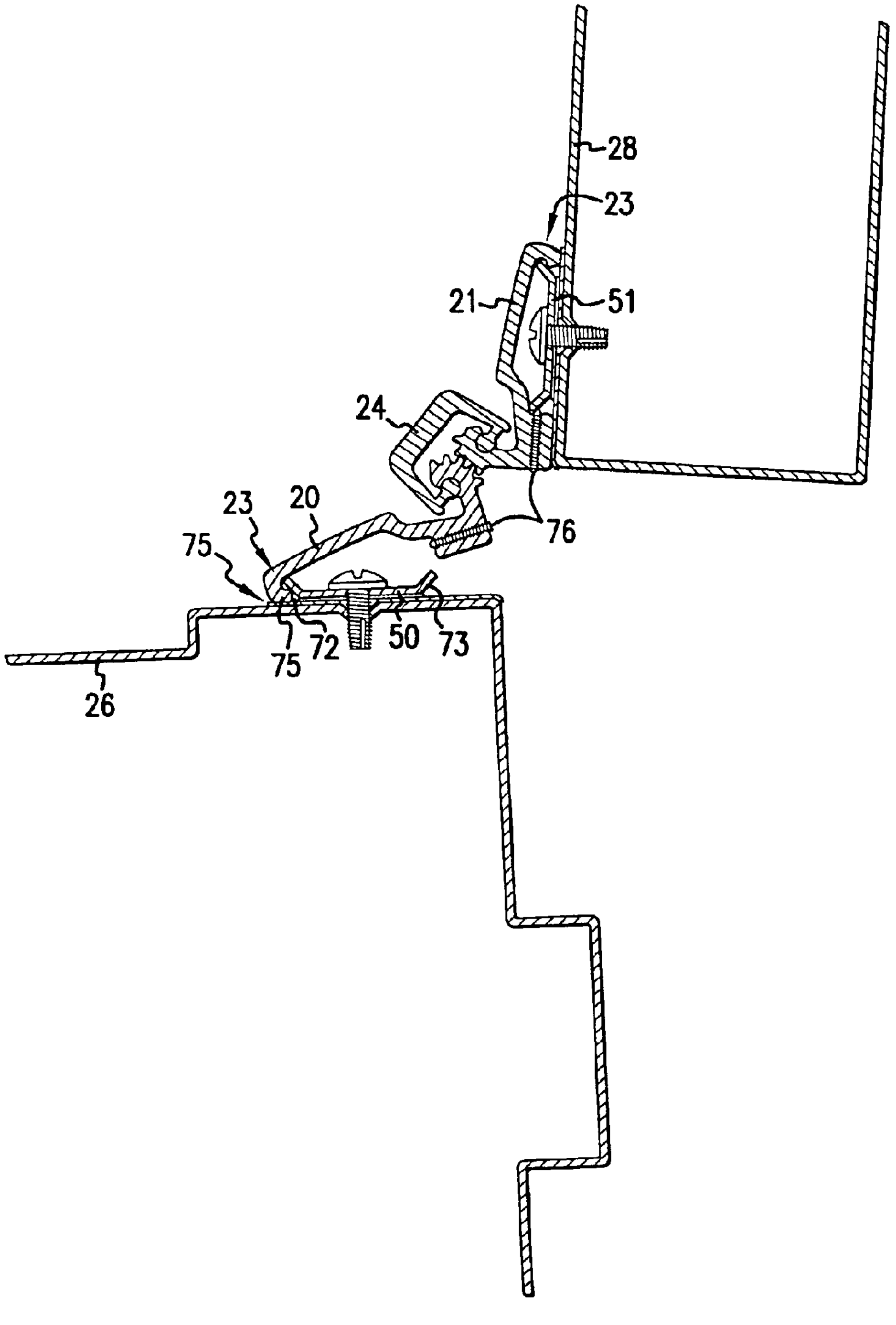
Figure 10:
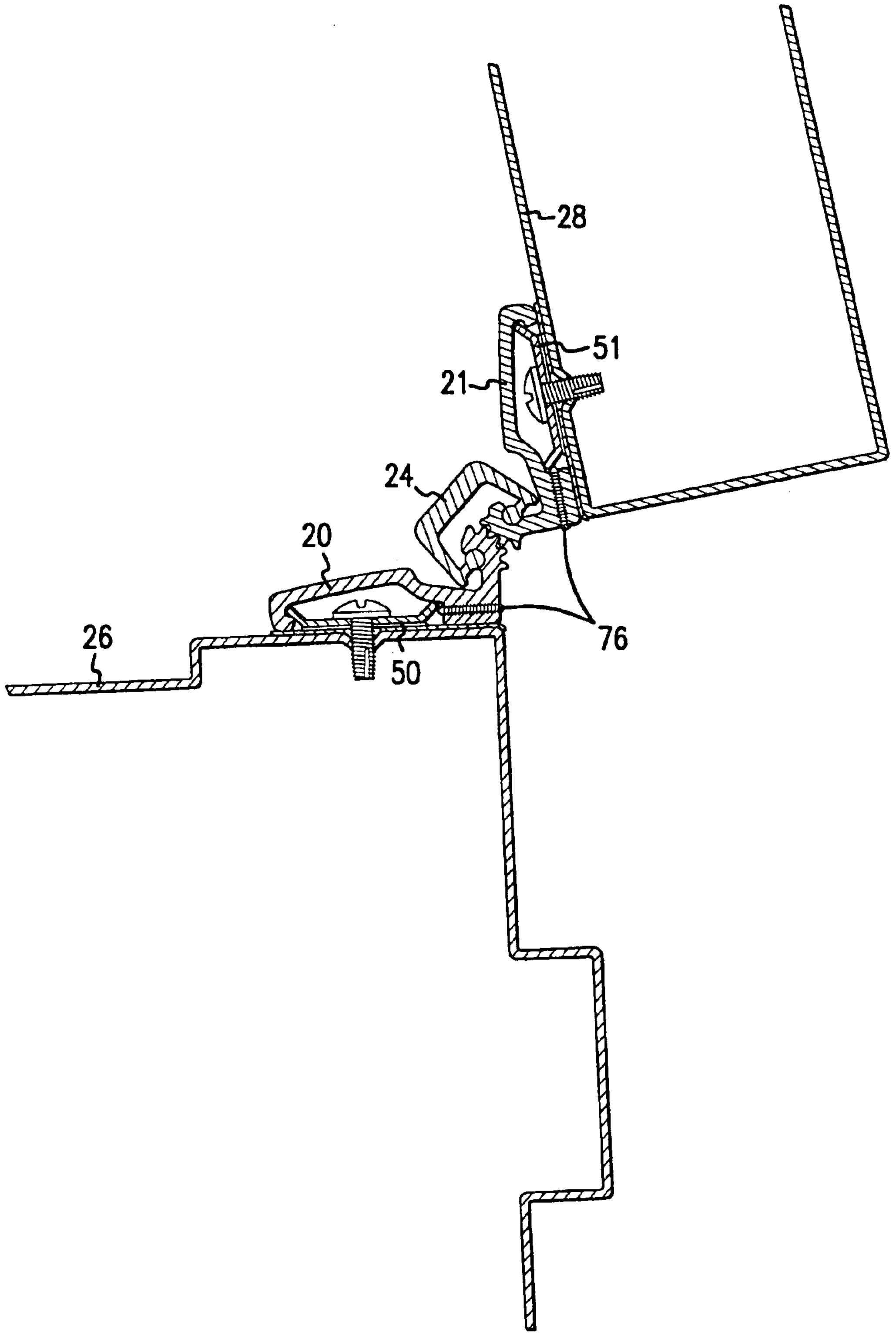

As shown in FIG. 8, the hooked hinged member 21 is rotated against the base 51 and may be slid, for longitudinal adjustment, along the length of the base 51 to a selected mounted position with respect to the base, among a substantial continuum of available mounted positions. The hinge members 20,21 are thus preferably infinitely positionable for securement on the bases 50,51. The fastening member 76 is moved to a locked position protruding from the mountable portion 23 of the hinge member 21, preferably towards the interior thereof, and engaged against the fastening surface of the mounting portion 66. Fastening member 76 is tightened to fix and preferably effectively lock the hinge member 21 to the base 51. Thus, the hinge members 20,21 are substantially self-aligning and self-positioning by locking the fastening members 76, which ensure proper alignment and positioning of the hinge members 20,21 on the hinged objects 26,28. The other hinge member 20 is preferably mounted and affixed to the base 50 in a similar manner as hinge member 21 to base 51, as shown in FIGS. 9 and 10. Each hinge member 20,21 of the preferred embodiment is thus mountable to the corresponding base 50,51 without requiring the sliding of the hinge member 20,21 onto the bases 50,51 along substantially the entire length of hinge member 20,21. The hinge members 20,21 can be mounted to the bases 50,51 from the front portion thereof, exposed from the hinged objects 26,28.

The hinge members 20,21 define base receiving spaces 78, as shown in FIG. 8, which are preferably cavities or lengthwise channels on the underside thereof. The spaces 78 are configured and dimensioned to house and cover the corresponding bases 50,51 and base fasteners 62 to provide an attractive exterior appearance when mounted to the hinged objects 26,28.

The preferred fastening members 76 are releasable from their locked position, to enable the position of the hinge to be adjusted on the bases 50,51. Also, the preferred hinge has a plurality of fastening members 76 spaced longitudinally along the hinge members 20,21, however, at least one sufficiently effective fastening member can be employed. In an alternative embodiment, the fastening members extend from the bases.

Referring back to FIG. 1, the hinge members 20,21 are preferably slidable in longitudinally direction 29 along the bases 50,51. Preferably, the longitudinal ends 80 of the bases 50,51 on opposite longitudinal sides thereof are free from a stop that would restrict the positioning of the hinge members 20,21 on the bases 50,51 or prevent the hinge members 20,21 from sliding past the stops. An alternative embodiment, however, incorporates such stops.

Figure 36:
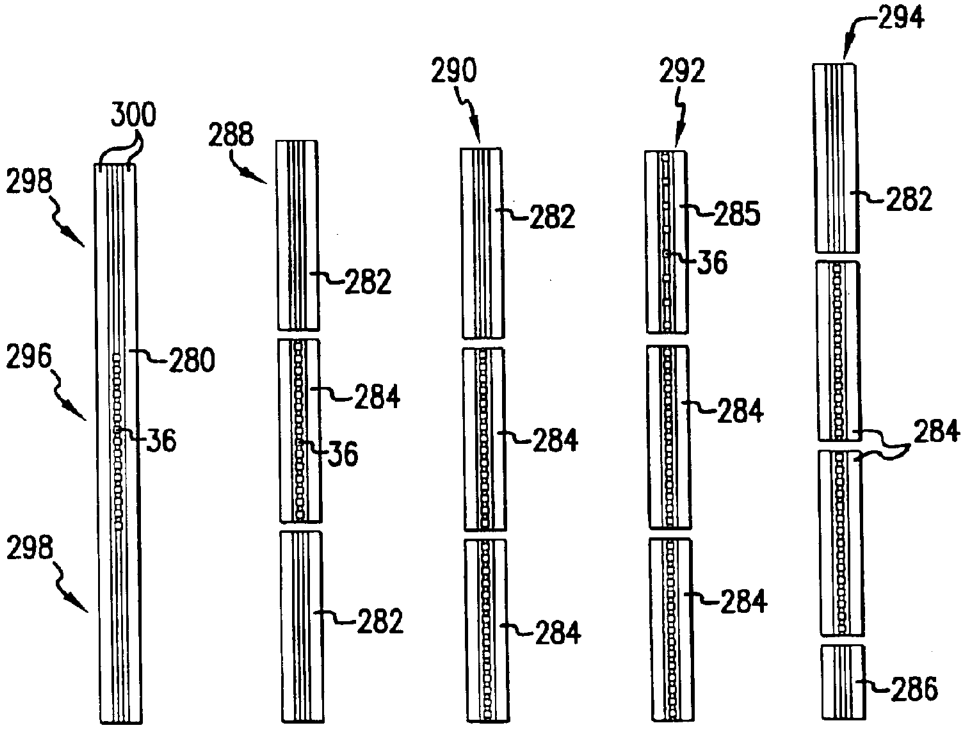
FIG. 36 is an underside view of several embodiments employing different combinations of hinge segments.
Figure 73A:
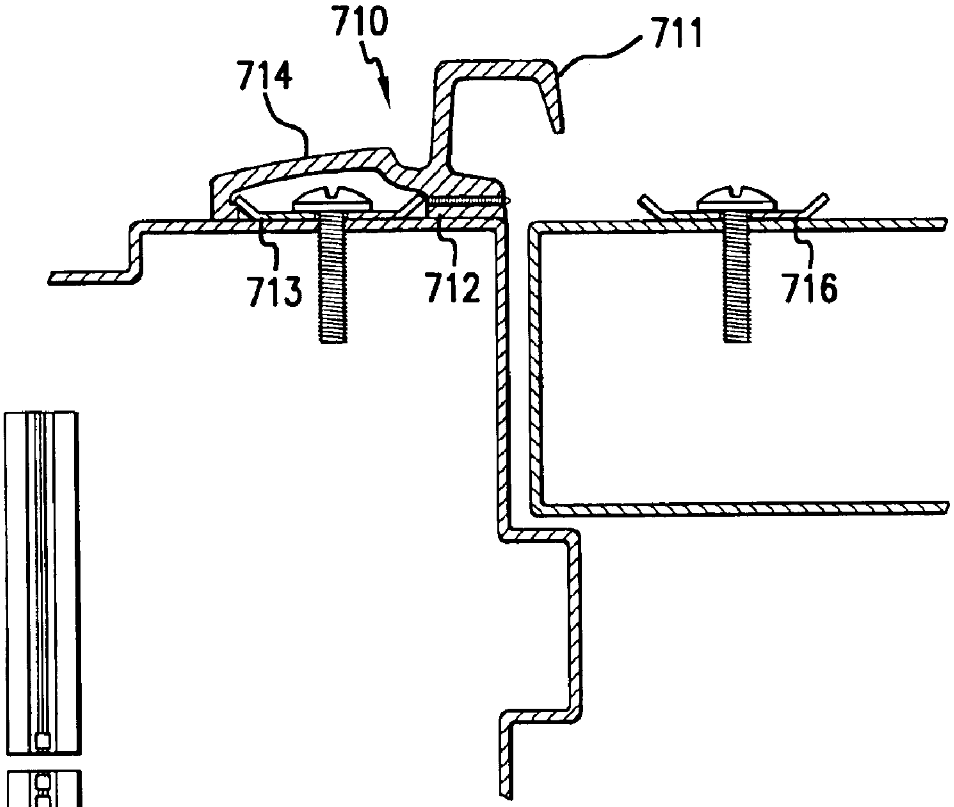
Figure 73B:
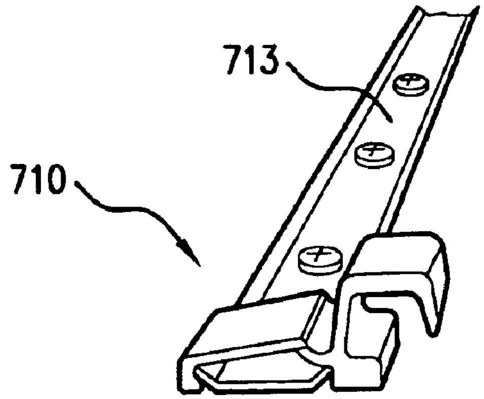

In another embodiment, a stop 710 as shown in FIGS. 73*a–c*, clamped to one of the mounting bases, could effectively keep the joining member of the hinge, which may be a clamp 24 (see FIG. 1), from sliding down to the floor or from rising upward when segmented hinge sections are used at the outside ends of the hinge assembly comprised of a longitudinally supported center section, and a top and a bottom section which are unsupported (as shown in the second drawing from the left of FIG. 36). The stop 710, shown engaged with a mounting base 713, has an engagement portion 714 which connects to the base in a similar fashion to the hinges described heretofore. A fastening member 712 is provided to secure the stop 710 to the base 713. Connected to and opposite the engagement portion 714 is a hooked portion 711 which is intended to contact the clamp (not shown) and prevent it from sliding downwards or upwards depending on whether the stop 710 is affixed to the lower portion or upper portion (not shown) of the base 713. The other base 716 may be provided with a complimentary member (not shown) configured with an engagement portion 714, but without the hooked portion of stop 710 that is secured to the base 716 across from and opposite the stop 710 connected to base 713.

Figure 37:
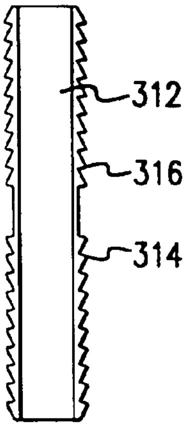
FIG. 37 is a front view of an embodiment of a coupling member.
Figure 74:
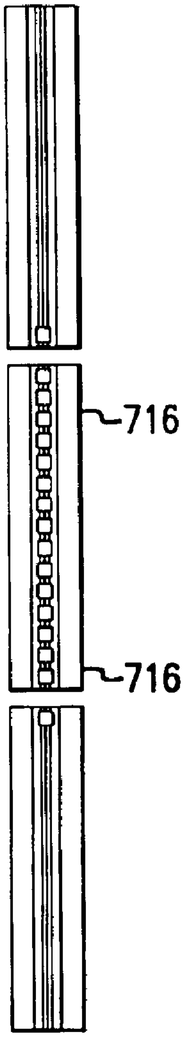
FIG. 74 is a plan view of a segmented hinge with single bearings in otherwise longitudinally unsupported segments.

Alternatively, a single bearing block 800 as shown in FIG. 74, equipped with a set screw, rivet or similar fastener securing the block to a hinge joining member, which may be a clamp 24 (see FIGS. 1 and 2), may be used which is located at the juncture between the supported hinge section and each unsupported hinge section. A connector 312 as shown in FIG. 37 may also be used in conjunction with this embodiment as well as other segmented clamp and hinge embodiments.

Figure 11:
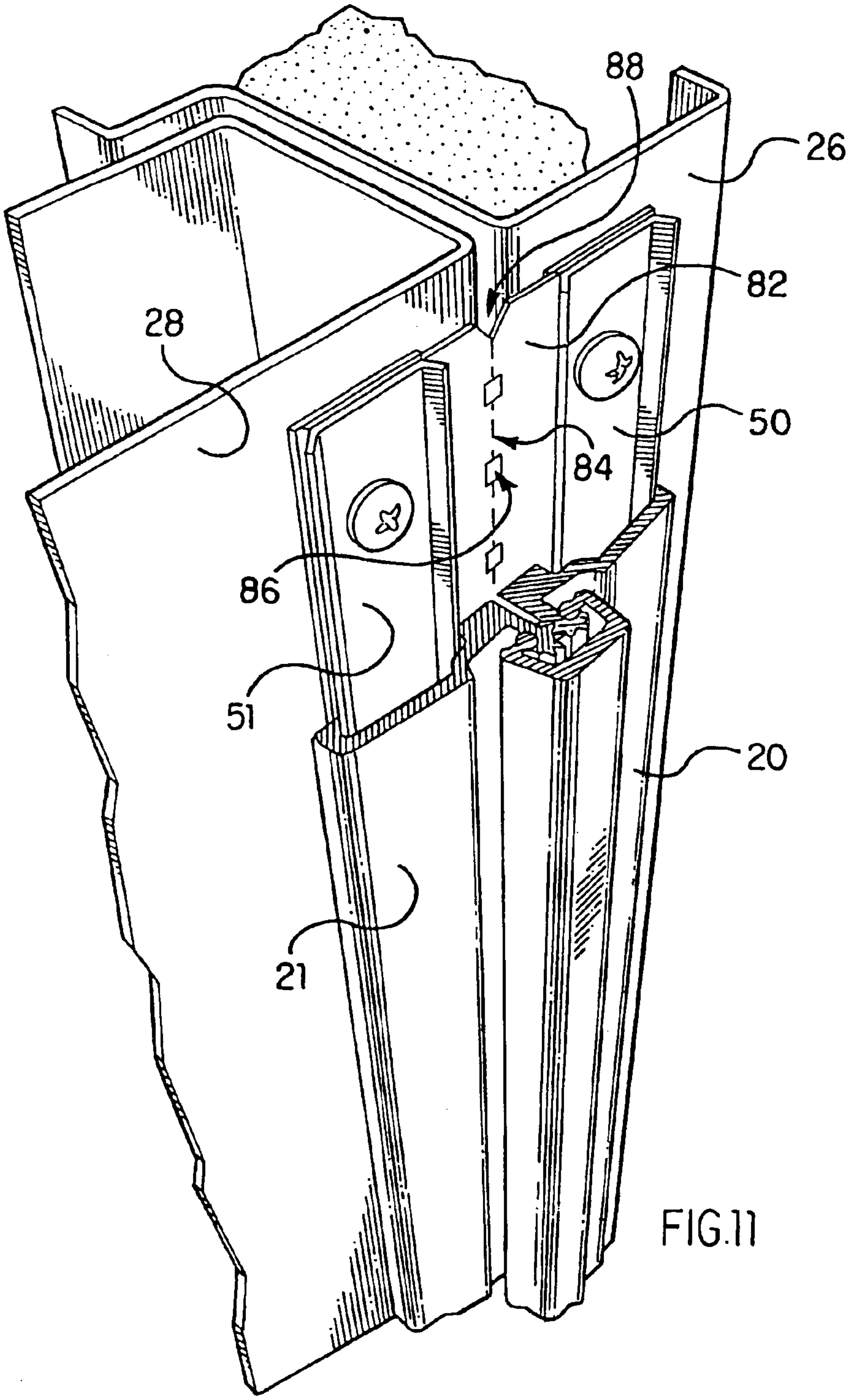
FIG. 11 is a perspective view of an alternative embodiment of a positioning tool constructed according to the invention.

An alternative embodiment of a flexible positioning tool 82 is shown in FIG. 11. Positioning tool 82 has a frangible portion 84, including cutouts 86 and a notch 88 at a longitudinal end to facilitate cutting and visual lateral positioning relative to the hinged objects 26,28.

Figure 12A:
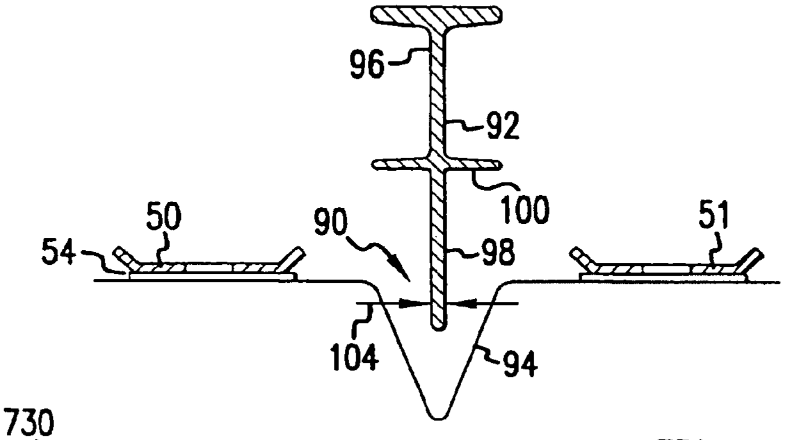
FIG. 12*a* is a cross-sectional view of a positioning tool having a plunger.
Figure 13:
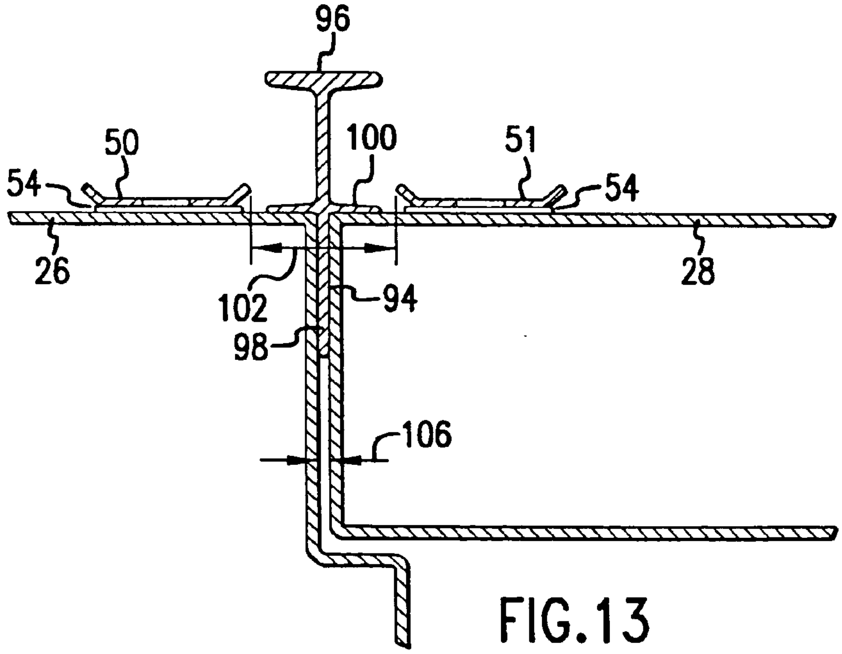
FIG. 13 shows the positioning tool of FIG. 12*a* with the plunging inserted between two hinged objects.

Referring to FIG. 12*a*, positioning tool 90 includes a plunger 92 and a flexible web 94 adhered to bases 50,51 by an adhesive layer 54. The plunger 92 has a handle 96, a plunging portion 98, and a stop 100 disposed therebetween and configured to cooperate with the hinged objects 26,28 to prevent the plunging portion 98 from being inserted past a predetermined depth between the hinged objects 26,28, as shown in FIG. 13.

In use, the plunging portion 98 is pressed against the web 94 at a predetermined location, which is preferably marked, bringing the bases 50,51 closer to each other to adjust the maximum distance 102 therebetween. The stop 100 prevents further insertion of the web 94 between the hinged objects 26,28 when it contacts the outer surface thereof. By selecting a plunging portion with a different length, the distance between the bases can be selectively adjusted and varied. The plunging portion 98 also has a thickness or width 104 selected to locate and space the hinged objects 26 and 28 from each other, cooperatively with the thickness of the web 94, at a desired predetermined distance 106, to provide proper hinging operation once the hinge is fully installed.

Figure 12B:
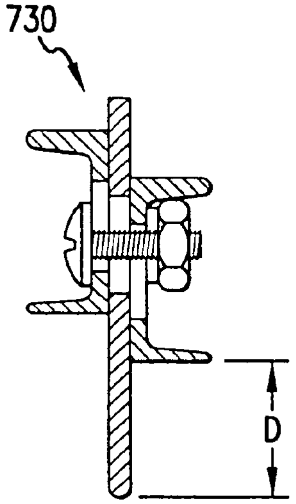
FIGS. 12*b–c* are cross-sectional views of a positioning tool having an adjustable plunger blade.
Figure 12C:
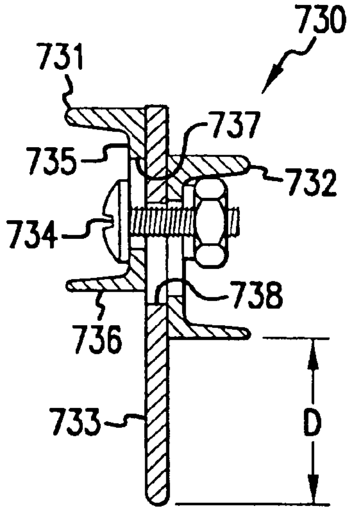

As shown in FIGS. 12*b–c*, an adjustable positioning tool 730 in another embodiment may be two-piece wherein each piece or half 731, 732 includes a handle 735, stop 736, and an elongated hole 737 through which a fastener 734 may be inserted. A blade 733, also containing an elongated hole 738, is secured between the two positioning tool halves 731, 732, whereby the blade in combination with the tool halves forms an adjustable plunger portion to adjust the depth "D" that the blade protrudes from the stops 736 as shown. This adjustable tool also allows it be used for door and frames having a planar offset or inset from each other. The adjustable tool, in addition to the tool shown in FIG. 12*a*, may be made of any suitable material which will be readily known in the art, and may include, but is not limited to metal, plastic, a combination thereof, etc.

Figure 14:
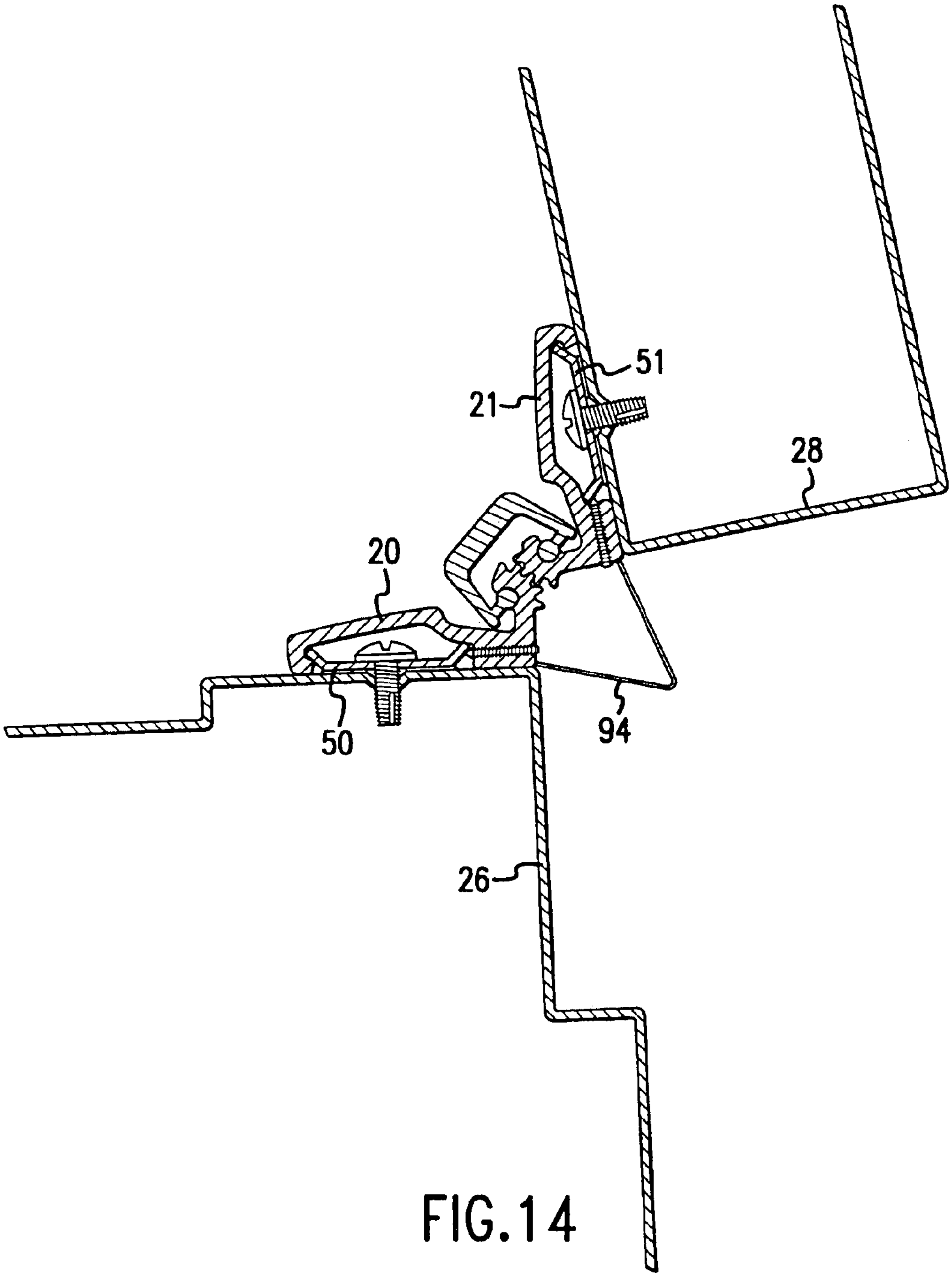
FIG. 14 is a cross-sectional top view showing another embodiment of a positioning tool with a width of web between hinged objects.

As shown in FIG. 14, an additional width of web 94 remains between the hinged members 26,28, preferably sufficient to permit operation of the hinge without cutting the web 94 or otherwise disconnecting it from the bases 50,51. In this embodiment, the remaining web 94 is configured and fabricated as a seal to seal the space between the hinged objects 26,28.

Figure 15:
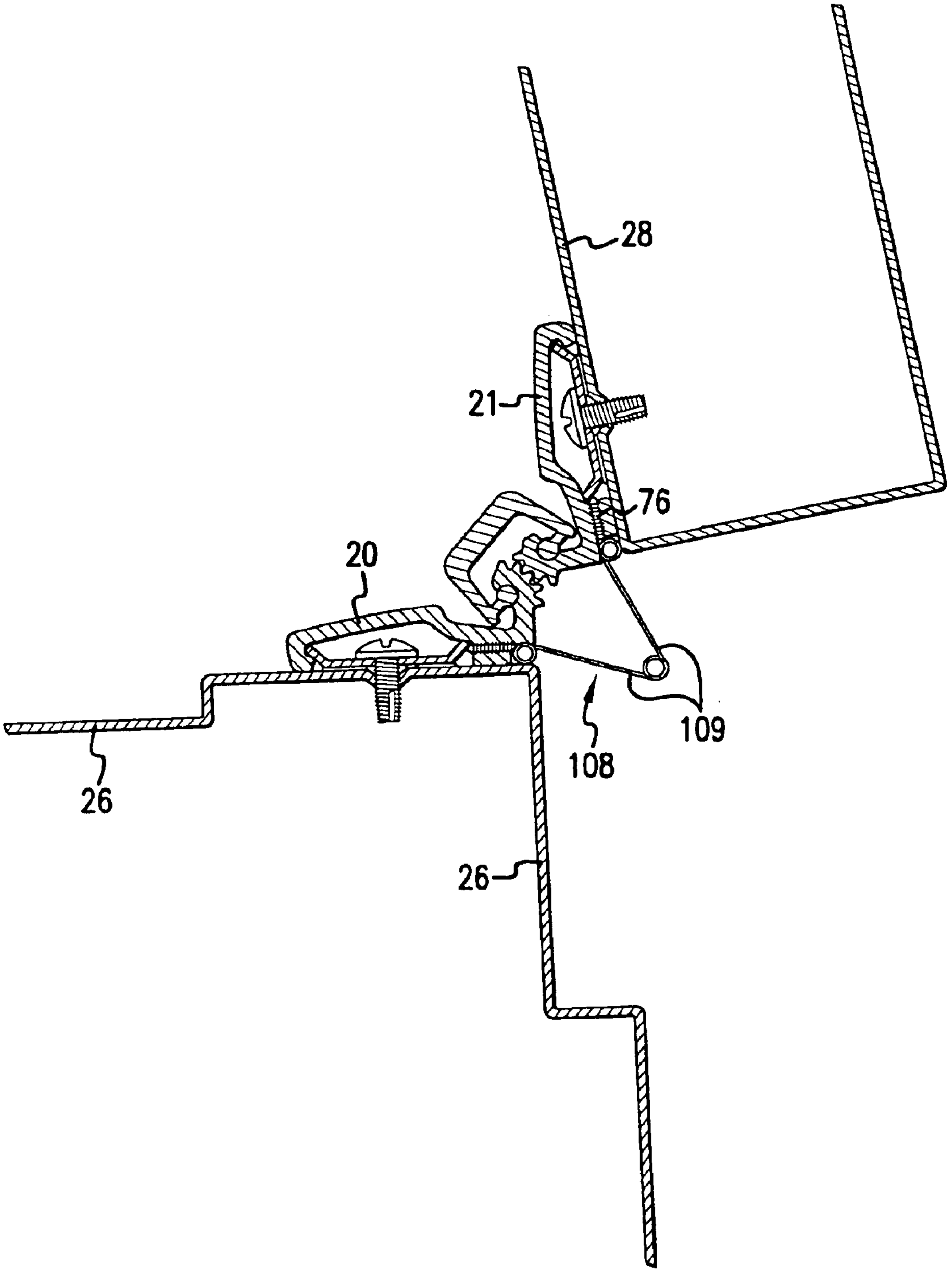
FIG. 15 is a cross-sectional top view of another embodiment of a positioning tool having hinged portions.

FIG. 15 shows another embodiment of a positioning tool 108 with hinged portions 109. The total width of these hinged portions 109 when closed controls the spacing between the hinged objects 26,28, providing a hinged object spacer and additional protection for the mechanism of the hinge and any thrust bearings the hinge may have. In this embodiment, small holes or slots through the hinged portions 109 can be provided aligned axially the fastening members 76 for access to the fastening member 76 during installation.

Figure 16:
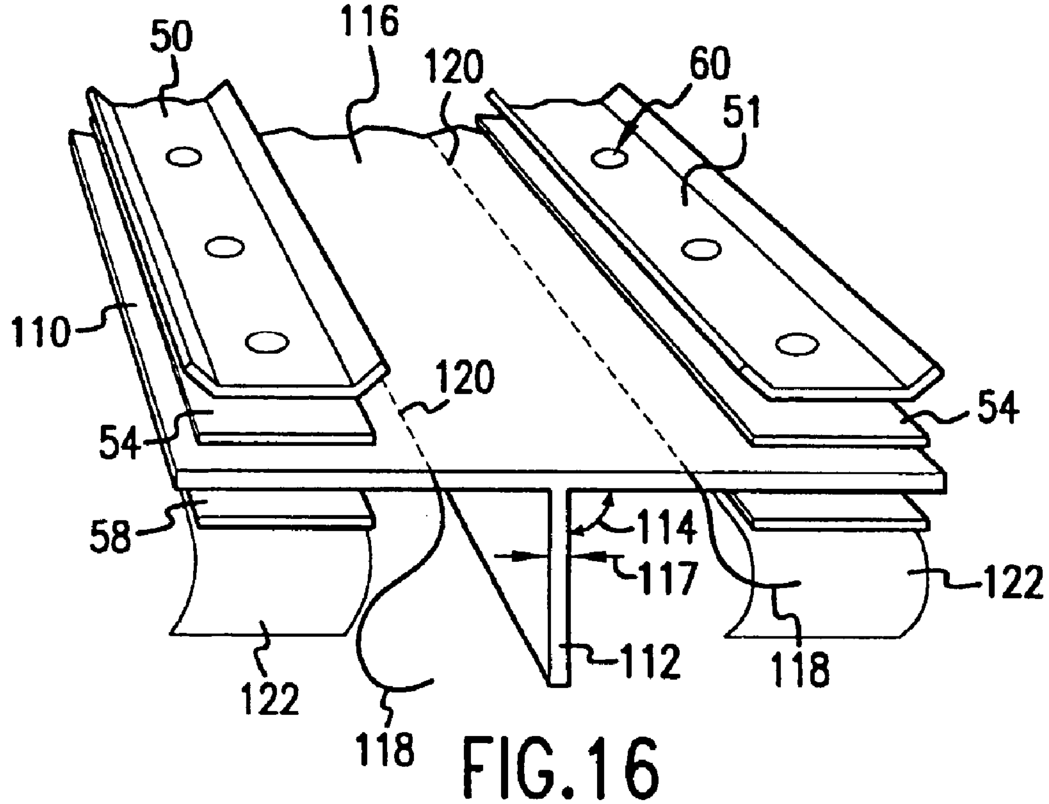
FIG. 16 is a perspective end view of another embodiment of the mount assembly and positioning tool.
Figure 17:
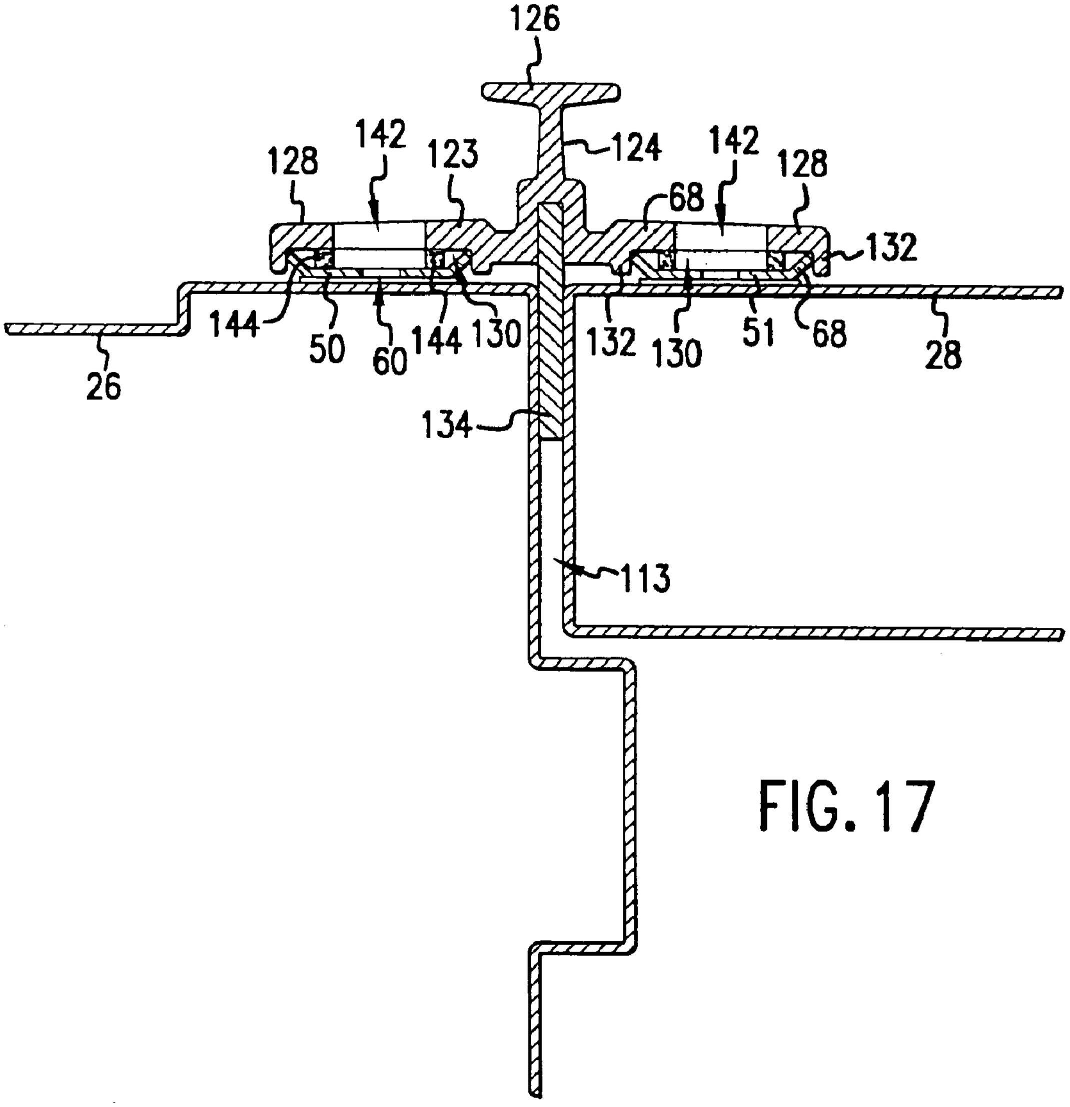
FIG. 17 is a cross-sectional top view of another embodiment of the positioning tool, with a removable hinged-object spacer.

The embodiment of FIG. 16 has a positioning tool 110 with an integral, preferably unitary, hinged object spacer 112 to position and space the hinged objects 26,28 with respect to each other, and also to facilitate the locating of the bases 50,51 with respect to the edges of the hinged objects 26,28 and the gap 113 therebetween, as shown in FIG. 17. The positioning tool 110 is preferably sufficiently rigid to maintain its shape and retain hinged objects separated by the object spacer 112. The object spacer 112 extends from a connecting portion 116 of the positioning tool 110, which connects the bases 50,51 together. The object spacer 112 has a thickness 117 and protrudes from the positioning tool 110 at an angle 119 to the direction of the predetermined distance between the bases 50,51 and is configured for providing a clearance between the hinged objects, depending upon the thickness 117 of the object spacer 112.

Tearstrips 118, which preferably comprise strings or bands embedded or attached to the connecting portion 116, are configured associated with the positioning tool 110 to sever the connecting portion 116 at frangible portions 120 upon pulling of the tearstrips 118 at an angle to the connecting portion 116. The frangible portions are most preferably located on both sides of the object spacer 112 to permit removal of the entire portion of the positioning tool 110 that includes the object spacer 112. This embodiment also includes adhesive protective backing 122 that are to expose the lower adhesive layers 58 for attaching to the hinged objects.

FIG. 17 shows an alternative embodiment of a substantially rigid positioning tool 124. Positioning tool 124 has a handle 126 and base positioners 128, which preferably extend from opposite sides of the handle 126. The positioners 128 are preferably configured for precisely locating the bases 50,51 with respect to each other. Thus, the preferred embodiment includes receptacles 130 with lateral walls 132 that engage a portion of the bases 50,51, preferably the lateral edges of the upturned sides 68, although the positioners 128 alternatively engage another portion of the bases 50,51. The preferred width of the receptacles 130 is substantially similar to the width of the bases 50,51. The receptacles 130 preferably include channels extending along the length of the positioning tool 124. The positioning tool also includes openings 142 of a larger size or diameter than the openings 60 provided for the base fasteners 62, and alignable therewith.

With continuing reference to FIG. 17, the bases 50,51 are preferably magnetically connected to the positioners 128, by magnets 144 of the positioning tool 124, preferably arranged as strips, although other shapes are suitable. As the bases 50,51 are preferably steel or other ferromagnetic material, the bases 50,51 are retained attached to the positioners 128, held against the hinged objects 26,28, and fasteners are applied through openings 142 and 60, and then the positioning tool 124, along with its magnets 144, is separated from the attached bases 50,51 to permit mounting of the hinge. The magnets 144 may be secured to the positioners by any means known in the art, which may include, but is not limited to the magnetic attraction forces between magnet and positioner alone, adhesives, fasteners recessed in depressions with through-holes provided in the magnets, interlocking and mating members which may be appurtenances provided with the positioner and/or magnet, etc. In general, the connection between the magnet and positioner is preferably stronger than the magnetic attraction between the magnet and mounting bases, so that the positioner with magnet attached may be readily uncoupled from the bases after the bases are fastened to the hinged objects.

It will be appreciated that in another embodiment, a non-magnetic positioning tool 124 may be used, such as, but not limited to aluminum, austenitic stainless steel, plastic, fiberglass, composites, etc. Consequently, the bases 50, 51 may be connected to the positioners 128 by alternative, non-magnetic releasable means. For example, spring clips, latches, set or thumb screws, velcro, or other suitable means (including even chewing gum) may be used to temporarily hold the bases 50, 51 to the positioners 128 while the bases are being installed. Alternatively, magnets may be secured to the non-magnetic positioning tool by some of the methods discussed above (with the exception of relying only on the magnetic force between the magnetic and positioner).

Figure 75A:
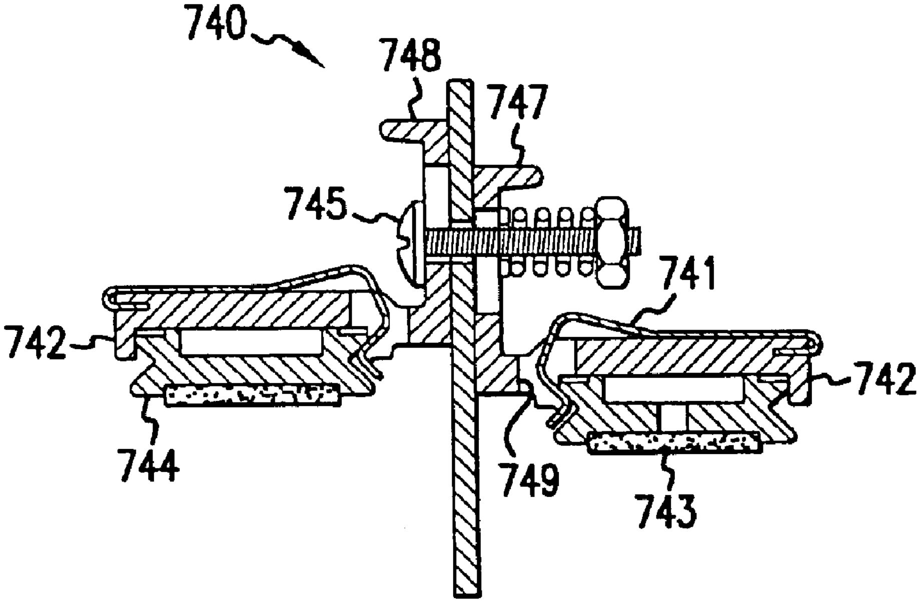
FIGS. 75*a*–*c* are various views of one embodiment of a positioning tool having spring clips that may be used with ferrous and non-ferrous mounting bases.
Figure 75B:
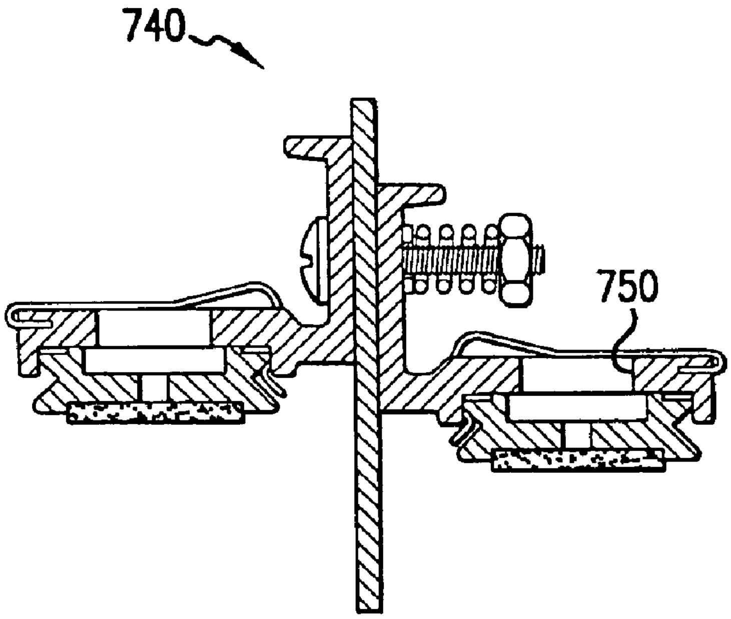
Figure 75C:
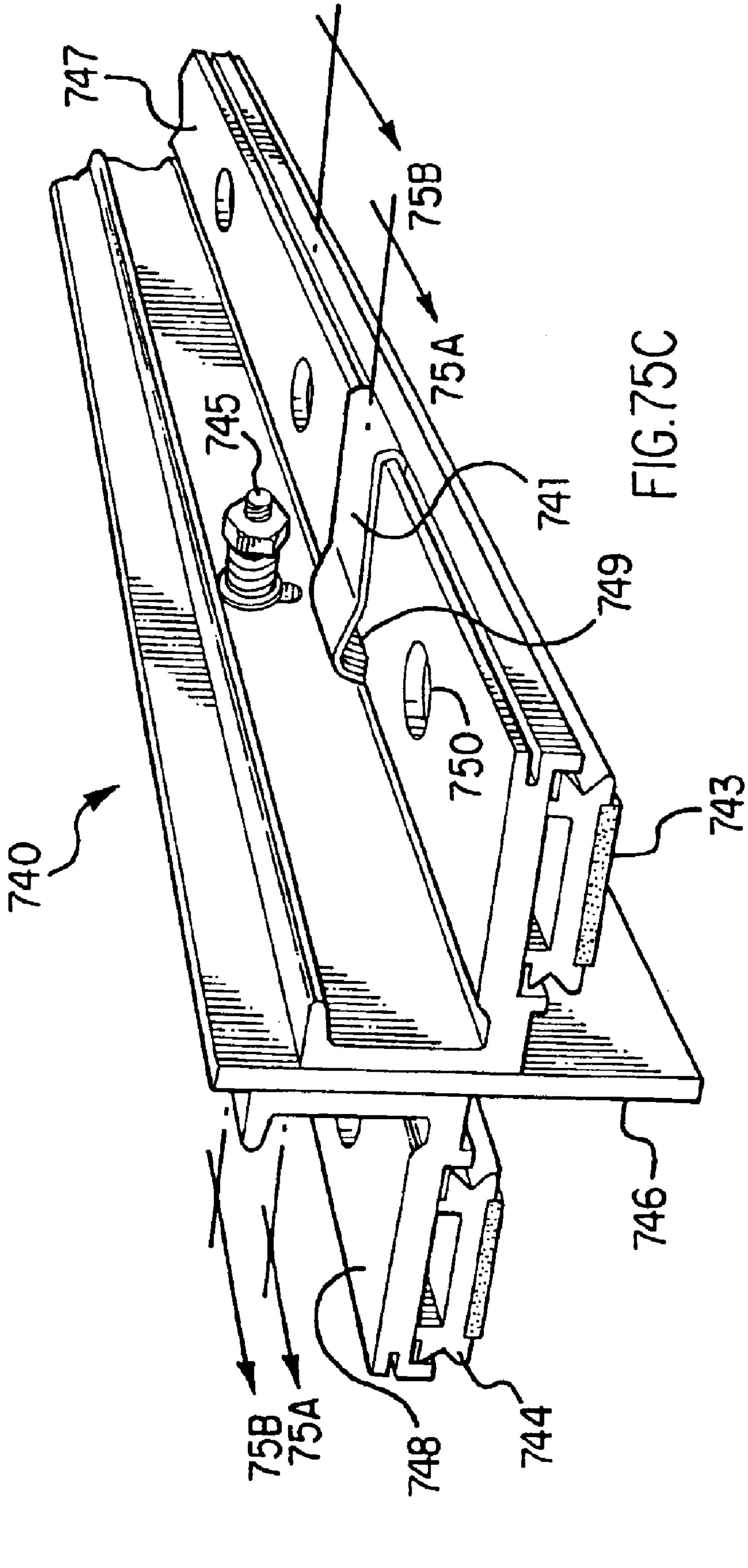

In FIGS. 75*a–c*, a non-magnetic positioning tool 740 embodiment is shown which utilizes spring clips and may be used for positioning tools made from either ferrous or non-ferrous materials. The positioning tool 740 in this embodiment is a two-piece adjustable tool with two halves 747, 748 with a spring-loaded fastener 745 that may be used to compensate for a door and frame having a planar offset. It should be recognized that the a one-piece, non-adjustable postioning tool as described previously herein may also be used. The positioning tool shown also includes a positioner spacer 746 with an integral hinged object spacer; however, the invention is not limited to non-magnetic positioning tools 740 having a spacer 746. The tool 740 has spring clips 741 which pass through openings 749 in the tool that allow the clips to be temporarily secured to mounting bases 744. The clips 741 are secured to the positioning tool 740 on one end and have an opposite end that is configured and adapted to be secured to mounting bases 744. At least one spring clip 741 is provided for each positioning tool half 747, 748; preferably, a plurality of spring clips are provided for each tool half. The spring clip 741 may be of any suitable configuration and made from any appropriate material commonly used which is readily known in the art.

The non-magnetic positioning tool 740 is secured by the spring clips 741 to two mounting bases 744 that are adapted and configured to receive the clips. The mounting bases 744 may include, but do not require, one-sided foam adhesive tape 743 which is attached to the mounting bases by adhesive on one side of the tape. The mounting bases 744 preferably include a plurality of mounting holes 750 in each base through which base mounting fasteners (not shown) may be inserted to secure the bases to hinged objects (e.g., door and frame).

Figure 6C:
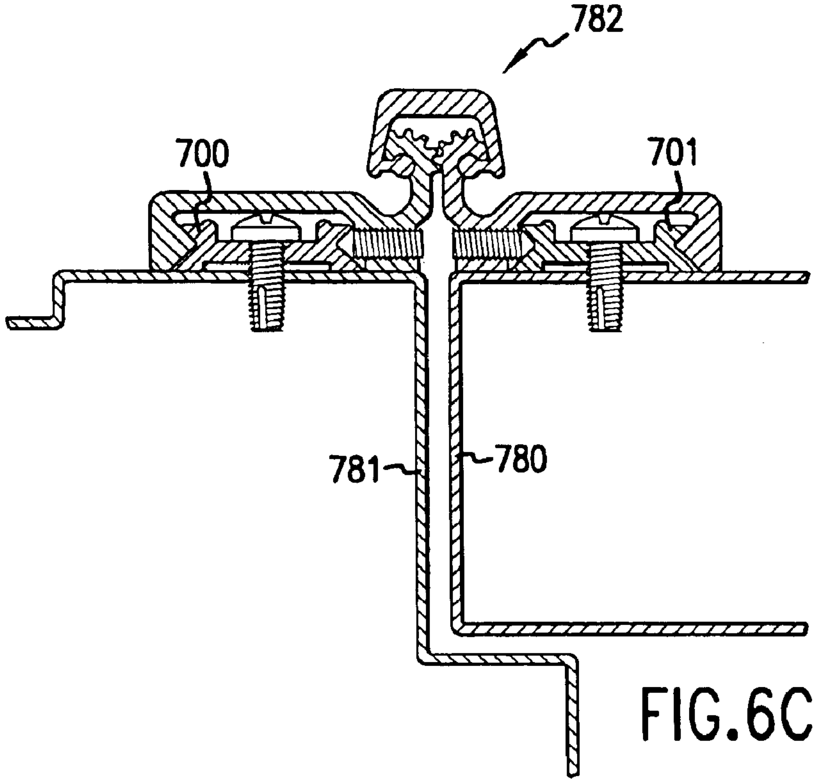
Figure 6D:
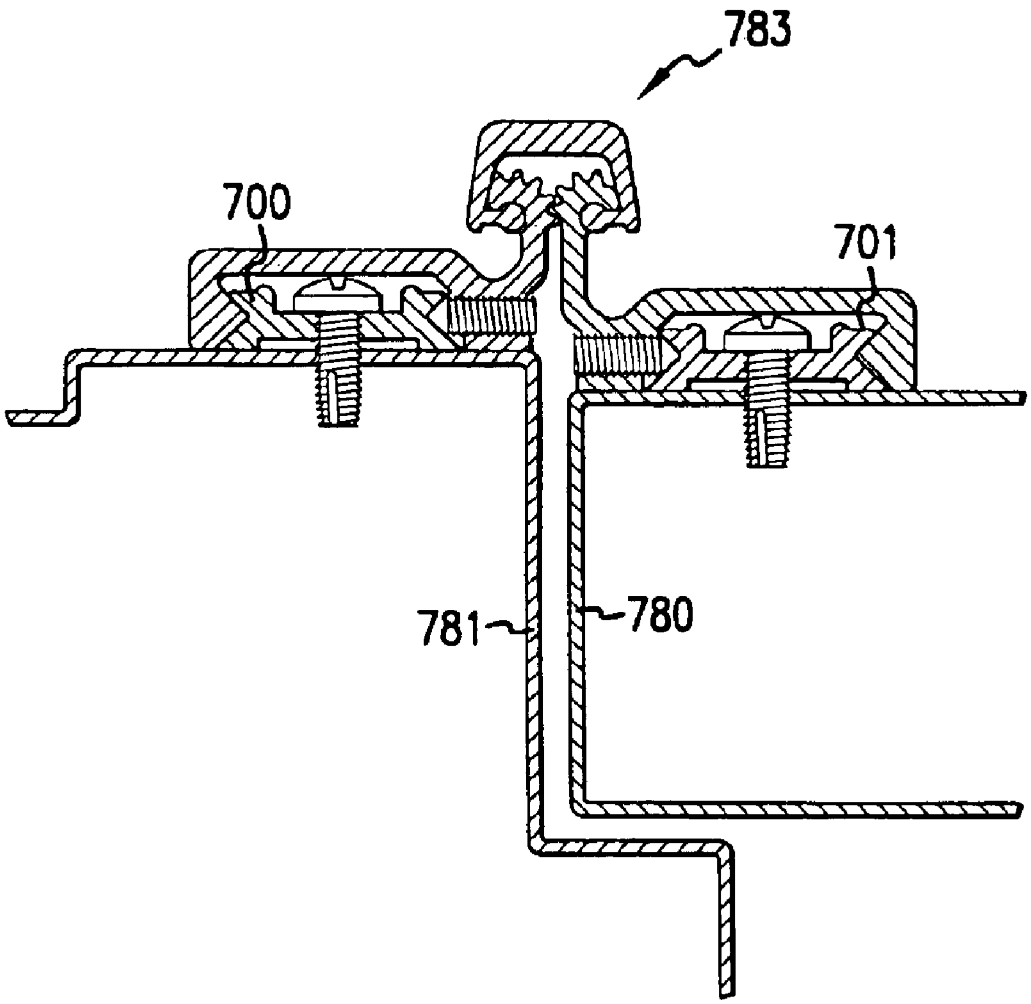

The non-magnetic positioning tool 740 is used by securing the tool to the mounting bases 744 with the spring clips 741 that engage the bases. The tool 740 with mounting bases 744 are then placed over hinged objects, positioned, and the mounting bases are secured to the hinged objects using fasteners inserted through the mounting holes 750. The tool 740 is then pulled off the bases 744 which disengages the spring clips 741 and allows the tool to be removed from the bases, leaving the bases mounted to the hinged objects. Hinges 782, 783 may then be attached to the bases 744 as shown in FIGS. 6*c–d*, respectively. FIG. 6*c* depicts a door 780 mounted flush with the face of the frame 781. FIG. 6*d* depicts a door 780 mounted inset from the face of the frame by using one hinge leaf that has a greater height or depth than the other hinge leaf.

Figure 35:
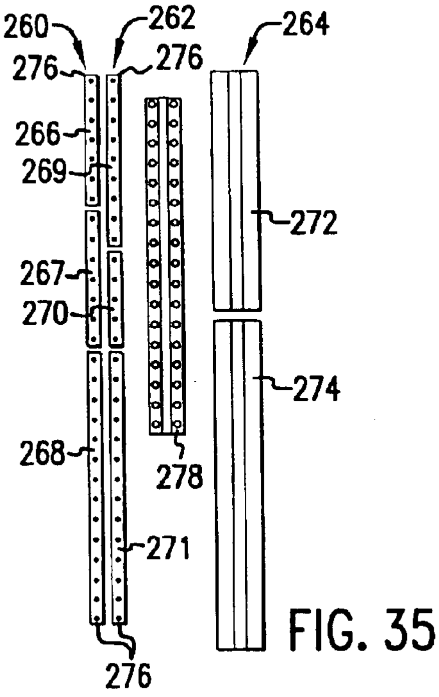
FIG. 35 is a front view of segmented components of different lengths employed together for mounting a hinge.

It should be recognized that the non-magnetic positioning tool may also be used with segmented mounting bases as shown in FIG. 35.

Figure 18:
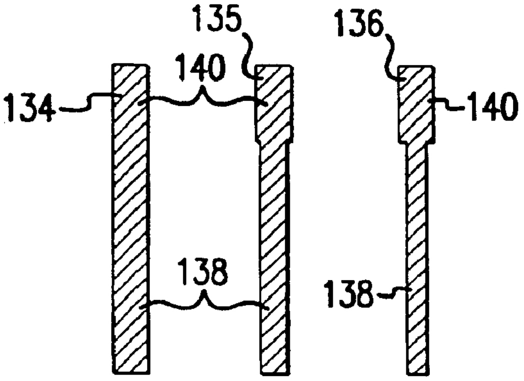
FIG. 18 is a cross-sectional view of three object spacers selectively usable with the positioning tool of FIG. 17.

A hinged object spacer 134 or shim is connected to the connecting portion 123 of the positioning tool 124. A plurality of object spacers 134–136, as shown in FIG. 18, is preferably provided, and each is selectively associable with the positioning tool 124 (FIG. 17) to preselect the distance between the hinged objects 26,28, while maintaining the same distance between the bases 50,51 when attached to the hinged objects 26,28. Object spacers 135 and 136 have a different width at their spacing portions 138 than at their connecting portions 140, which is configured for connecting to the positioning tool 124.

Figure 19:
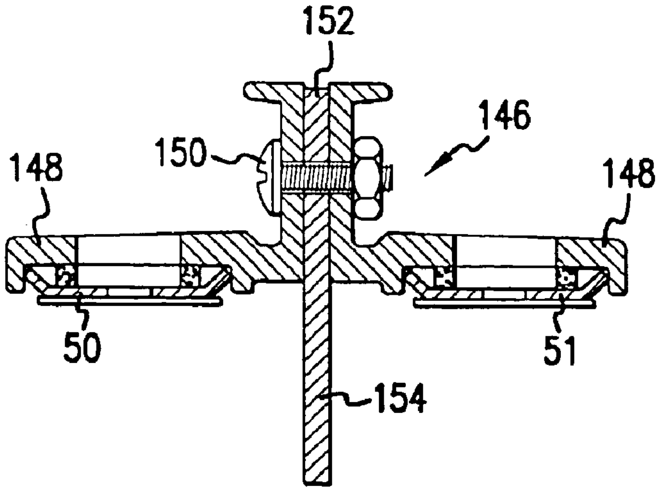
FIGS. 19–21 are cross-sectional top views of positioning tools with adjustable widths and selectable hinged object spacers and means for adjusting such positioning tools to accommodate hinged objects in different planes.

The embodiment of a positioning tool 146 of FIG. 19 is constructed by fastening two half base positioners 148 with at least one, but preferably a plurality, of fasteners 150. A positioner spacer 152 is disposed between the base positioners 148 to control and select the relative position and spacing between the bases 50,51. The positioner spacer 152 also includes a hinged object spacer 154.

Figure 20:
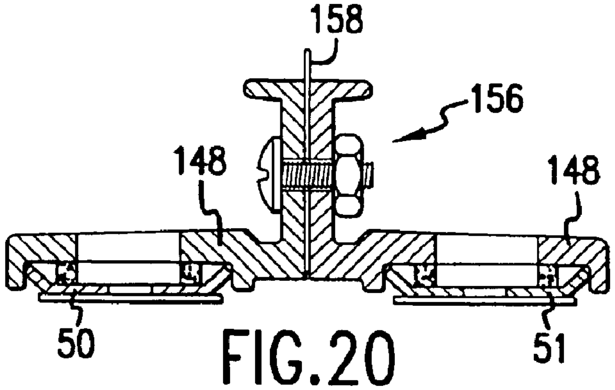

The positioning tool 156 of FIG. 20 has a narrower positioner spacer 158 sandwiched between the base positioners 148 to provide a smaller distance between the bases 50,51. This positioning tool 156 does not employ a hinged object spacer to permit the hinged objects to be placed against each other, or to employ another method of aligning the hinged objects themselves. Similarly, the positioning tool 160 of FIG. 21 does not employ a hinged object spacer. Positioning tool 160 also has base positioners in abutment with each other, as no positioner spacer is used either.

Figure 21:
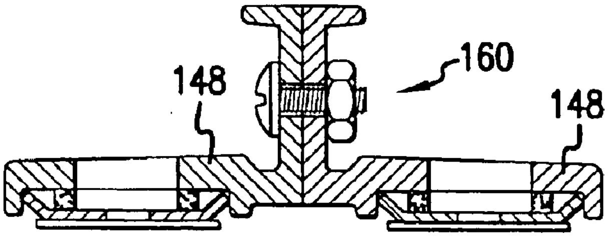
Figure 66:
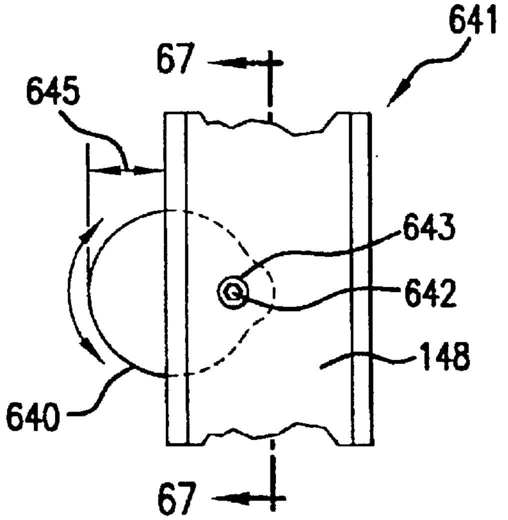
FIG. 66 is a top view of a two-piece positioning tool with a pivoting adjustable depth hinged object spacer.
Figure 67:
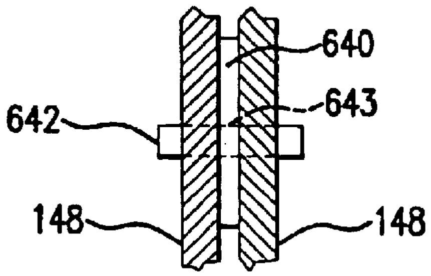
FIG. 67 is a cross section of a two-piece positioning tool with a pivoting adjustable depth hinged object spacer.

When using a positioning tool with two half base positioners 148 as shown in FIGS. 19–21, many alternative embodiments for a positioning spacer and hinged object spacer are possible. For example, FIGS. 66 and 67 show an adjustable depth hinged object spacer, which in this embodiment, has a substantially cam-shaped disk 640 that is pivotally attached to a positioning tool 641. The disk 640 may have a straight, generally cylindrically-shaped bushing 642 or similar member which is fixedly attached to the disk to prevent relative rotation between both members. The bushing 642 may have a round, hexagonal, or other exterior shape in cross section. The length of the bushing 642 is sized such that it projects from either side of the disk 640 (as shown in FIG. 67) a sufficient amount so as to protrude through holes 643 disposed in each of the two half base positioners 148 when the two halves are connected together as shown in FIG. 19. The bushing 642 preferably has a hexagonal-shaped internal socket for application of an Allen wrench, which can be used to rotate the disk around the pivot point formed by the coaxially-aligned bushing and holes 643, thereby allowing the projected depth 645 of the disk to be adjusted. As shown in FIG. 66, the pivot point is offset from the center of the disk. At least one disk 640 is provided for the positioning tool, preferably a plurality of disks are provided. The disks are interspersed between the fasteners 50 that hold both half base positioners together as shown in FIG. 19.

Figure 68:
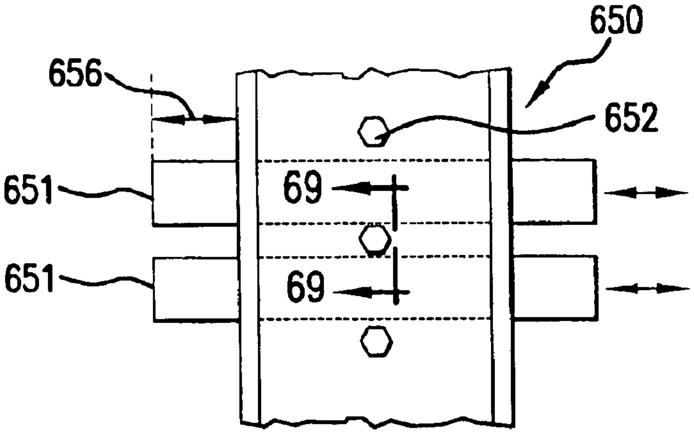
FIG. 68 is a top view of a two-piece positioning tool with slidable adjustable depth hinged object spacers.
Figure 69:
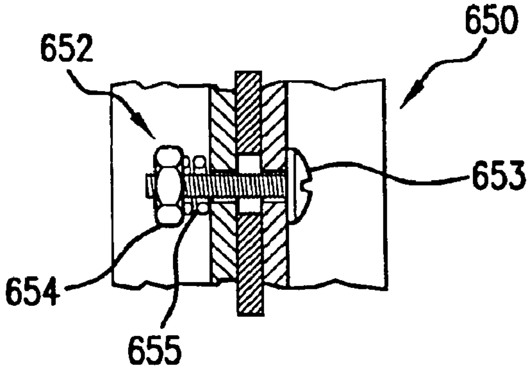
FIG. 69 is a top view of a two-piece positioning tool with slidable adjustable depth hinged object spacers.

FIG. 68 shows another adjustable depth hinged object spacer embodiment of a positioning tool 650 having two half base positioners 148 as shown in FIG. 19. Separate object spacers 651 may be disposed between the fasteners 652 that hold both halves of the base positioners together. In this embodiment, the fasteners 652 may be comprised of a bolt 653, a nut 654, and a compression spring 655 located under the nut as shown in FIG. 69. The fasteners 652 are initially set to provide a relatively low compression force sufficient to temporarily hold the object spacers 651 in the tool 650, but not to prevent the spacers from being slidably moved in and out of the tool to adjust their projection depth 656. Once the correct depth 656 has been found for the object spacers 651, the fasteners 652 may be tightened to retain that depth while the hinge installation is completed. At least one, but preferably a plurality of object spacers are provided.

Figure 70:
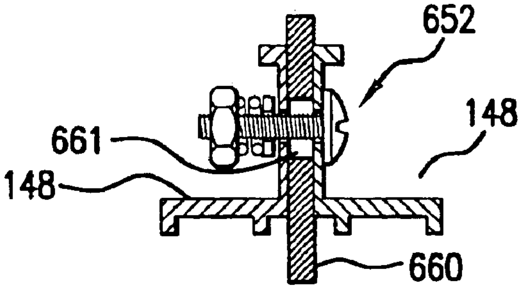
FIG. 70 is a cross sectional view of a two-piece positioning tool with an alternative embodiment of a slidable adjustable depth hinged object spacer wherein the spacer has elongated open slots.

Another adjustable depth hinged object spacer embodiment of a positioning tool having two half base positioners 148 as shown in FIG. 19 may be achieved by using the fastener 652 of FIG. 69 wherein a compression spring 655 is placed beneath the nut 654. The embodiment shown in FIG. 70 utilizes the basic positioning tool shown of FIG. 19; however, a single length or multiple shorter length object spacers 660 may be used along the length of the tool that have elongated slots 661 through which the fasteners 652 pass. The elongated slots are just wide enough so that the fasteners 652 may pass through with minimal clearance between the slots and fasteners to avoid a sloppy fit. This arrangement helps maintain a square or perpendicular alignment between the hinged object spacer 660 and the positioning tool. Thus, the object spacer(s) 660 may be slidably moved in and out of the tool in the same manner as described above until the desired projection depth is reached, and then locked into position by tightening the fasteners 652.

Figure 60:
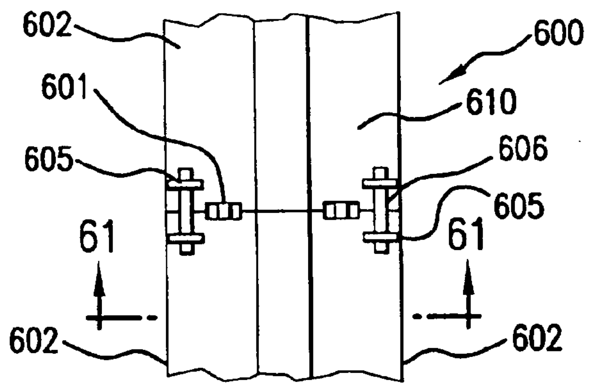
FIG. 60 is a front view of a hinged positioning tool.
Figure 61:
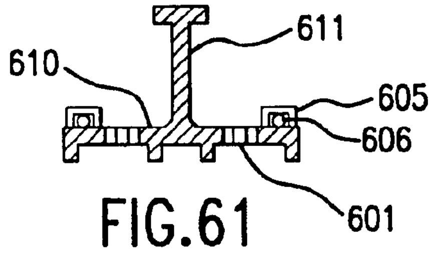
FIG. 61 is a cross-sectional view of a hinged positioning tool.

Many variations are also possible for adjusting the spacing between the two half base positioners 148 of the positioning tool 146 shown in FIGS. 19–21. For example, tapered pins may be used that are inserted through holes disposed in the handle of the tool. Alternatively, threaded pins may be used. The mounting base positioning tool may itself be hinged to facilitate handling. For example, the tool 600 may be made or cut into two or more longitudinal segments that are laterally hinged between the segments as shown in FIGS. 60 and 61. This would allow the tool to be folded for convenient storage and transportation to the job site since the tool may be nearly or as long as the full height of a door. The lateral hinge 601 may be formed as an integral part of the positioning tool. Preferably, two of these integral lateral hinges are provided at each location along the length of the positioning tool where the tool will be laterally hinged for folding; one hinge on each half base positioner 602 of the positioning tool 600. Alternatively, the lateral hinge may be a separate hinge or combination of hinges that is/are surface mounted to the tool by any suitable means known in art. Preferably, the surface mounted hinges are attached to the top of the base positioners 602. Also preferably, two surface mounted hinges 601 (one on each half base positioner 602 of the positioning tool 600) are provided at each location along the length of the positioning tool where the tool will be laterally hinged for folding. Although the laterally hinged positioning tool shown in FIGS. 60 and 61 is generally of the type shown in FIG. 23 having two integral base positioners, except divided into longitudinal segments, lateral hinges may also be used with a positioning tool comprised of two half base positioners 148 that are fastened together as shown in FIGS. 19–21.

A positioning tool restraining means may also be provided to substantially axially align and lock a segmented, laterally hinged positioning tool into an open (unfolded) and straight assembled configuration once it arrives on the job site. In one embodiment, the restraining means may comprise receptacles having a central opening which is adapted and configured to cooperatively receive restraining inserts 606 of similar shape. In FIGS. 60 and 61, the receptacles are C-shaped projection 605 rising from the surface of the tool. The projections 605 may have other shaped profiles and openings (e.g., round, triangular, etc.) to mate with restraining inserts having complimentary cross-sectional configurations. The restraining insert may be a threaded or unthreaded pin, threaded screw or bolt with nut, or any other suitable component capable of being removably inserted through the projection and being temporarily retained therein. The receptacle itself may be threaded or have a threaded insert (not shown) for receiving a threaded restraining insert. Although the restraining means are shown located on the top surface 610 of the base positioners 602, the restraining means may also be located on the handle portion 611 of the tool, on any combination of the foregoing tool portions, or on any other suitable location on the tool.

Figure 62:
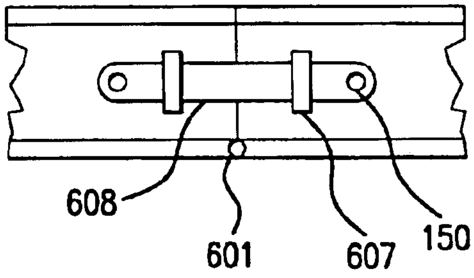
FIG. 62 is a side view of a hinged positioning tool with a strap embodiment of a restraining means.

In an alternative embodiment shown in FIG. 62, the restraining means comprises a projection 607 with a rectangular opening through which a locking member that may be a rectangular strap 608 can pass. This embodiment may be used in the situation where a positioning tool made of two half base positioners is employed (as in FIGS. 19–21). The ends of the strap 608 may have holes and be held into position by the same fasteners 150 passing through the holes which hold both halves of the positioning tool together as shown in FIG. 62. Preferably, the strap 608 is made of metal, but any suitable material which is rigid enough to snugly couple the tool segments together may be used.

It should be noted that restraining means are preferably provided on each longitudinal segment of the positioning tool on opposite sides of each lateral hinge location. The restraining means may be formed as an integral part of the positioning tool or may be separate structures that are mounted to the surface of the tool in any manner commonly known in the art.

It will be appreciated that the restraining means are not limited to the embodiments described above. Any type of structure or components may be used to lock the segmented, hinged positioning tool into an open position such as latches, spring-loaded locks, etc.

Figure 63:
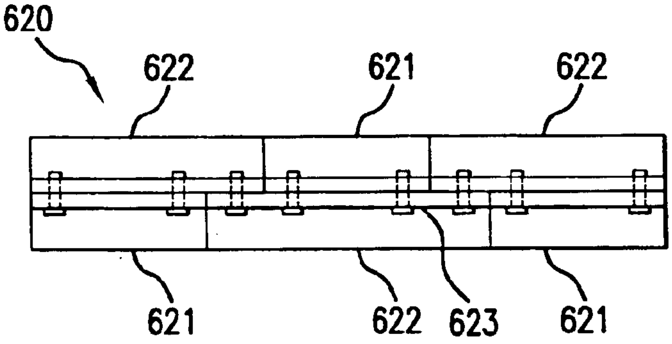
FIG. 63 is a top view of a segmented, two-piece positioning tool.
Figure 64:
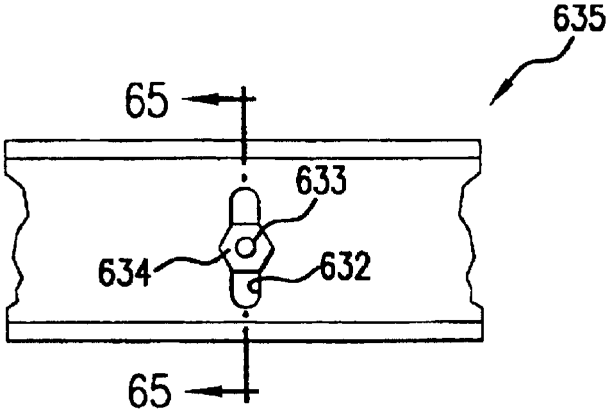
FIG. 64 is a side view of a two-piece positioning tool with an adjustable offset.

An alternate embodiment to facilitate handling of the two halves of the positioning tool shown in FIGS. 19–21 is shown in FIG. 63. The positioning tool 620 is divided into longitudinal segments of different lengths. In the embodiment shown, a combination of two different segment lengths may used which comprises short segments 621 and long segments 622. The tool is ordinarily stored and transported in a dismantled or "broken down" condition. When the tool arrives at the job site, it is assembled as shown in FIG. 63 using fasteners 623 which are inserted through pre-drilled holes in the tool which are strategically located to align the short and long segments 621 and 622, respectively. Once the segments are assembled, a substantially rigid positioning tool is formed and ready for use. Preferably, the segment lengths of the two halves of the positioning tool are arranged as shown in FIG. 63 such that the break lines between segments on one half of the tool are not aligned with the break lines on the other half of the tool. This arrangement adds stability to the tool once it has been assembled.

Figure 71A:
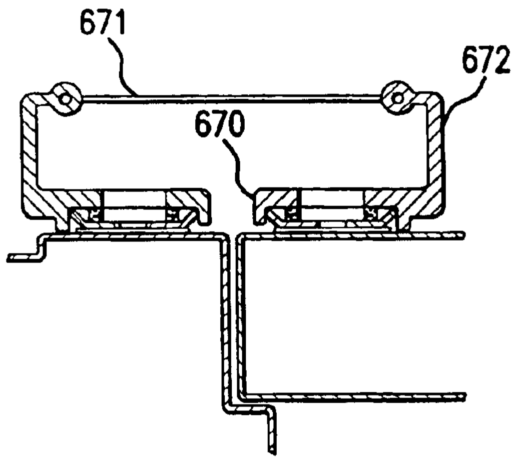
FIG. 71 is a cross-sectional view of a hinged positioning tool with a handle mounted hinge.
Figure 71B:
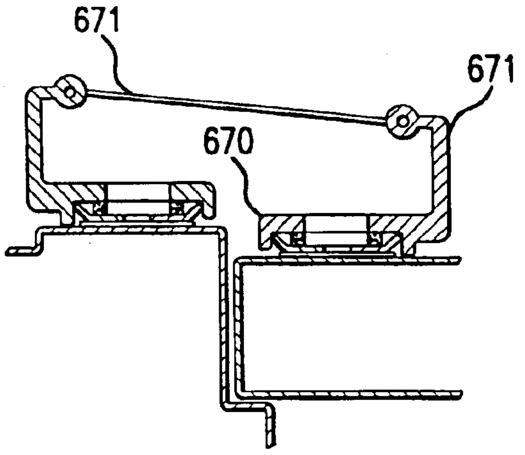

The two halves of the positioning tool shown in FIGS. 19–21 may also be hinged longitudinally at a number of points along the tops of the handles to allow the mounting bases to lie flat against the surfaces of the hinged objects. As shown in FIG. 71*a–b*, a positioning tool 760 is provided with a continuous hinge 671 equipped with access holes (not shown) for inserting a tool required for attaching the mounting bases to hinged objects. The hinge 671 is mounted on top of the handle portions 672 of each positioning tool half 670. Alternatively, a plurality of individual hinges may be intermittently provided along the longitudinal axis of the tool in the same general orientation as shown. This hinged embodiment of a postioning tool is intended to allow the base positioners to remain flat even with an offset. By locating the hinge points at a wide spacing as shown, the difference in lateral spacing through the angle required to maintain flat contact with both the door and the frame is kept to a minimum (compare FIG. 71*a* with 71*b*). It will be appreciated that the hinge may also be an integral part of the handle portions of the positioning tool or a separate hinge attached to the handle portions.

Positioning tools that comprise two half base positioners 148 of the type shown in FIGS. 19–21 are also capable of being made with an adjustable offset to accommodate a door and a frame which lie in two different planes. For example, many doors have the door inset slightly (about 1/16" to 1/8", for example) to make sure that the door, if warped slightly, will remain with all of its corners lying within the plane of the frame as opposed to having one or more of its corners projecting beyond the plane of the frame. FIGS. 64 and 65*a–f* show various embodiments of a two-piece positioning tool 635 with an adjustable offset. Both positioners halves 630, 631 of the tool 635 have an elongated slot 632 (shown oriented vertically) through which a locking member, which may be a fastener 634 as shown, passes through. Alternatively, a round hole configured and adapted to receive a fastener 634 may be provided in one half base positioner, while other half base positioner has an elongated slot 632 (not shown). By placing the respective tool halves against the door and frame, the installer can loosen the fastener 634 to adjust for any planar offset present between both hinged objects and then tighten the fastener to hold the adjustment.

Figure 65A:
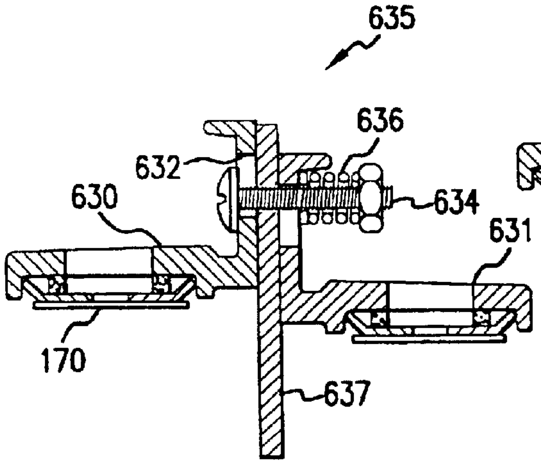
FIGS. 65*a*–*f* are cross-sectional views of a various embodiments of a two-piece positioning tool with an adjustable offset.
Figure 65D:
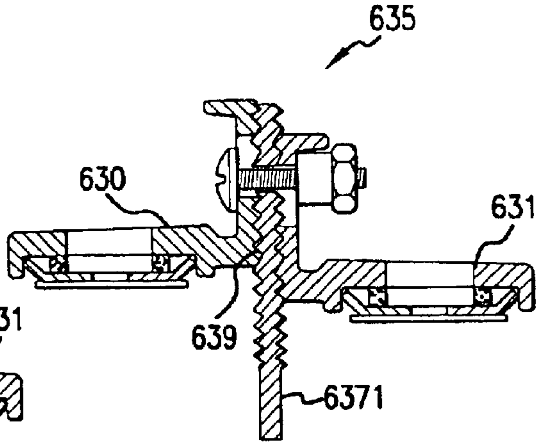
Figure 65B:
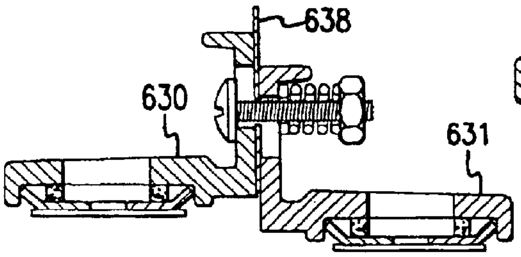
Figure 65E:
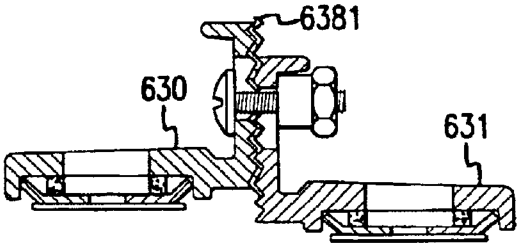
Figure 65C:
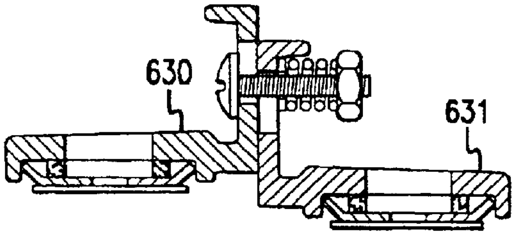

FIGS. 65*a–c* show two-piece positioning tools with a continuously adjustable offset. FIG. 65*a* shows a two-piece positioning tool 635 having a position spacer 637 which includes an integral hinged object spacer. A biasing member, which may be a spring 636 as shown, is provided to assist in holding both halves of the positioning tool together without slippage therebetween. FIG. 65*b* shows a two-piece positioning tool 635 having only a positioner spacer 638. FIG. 65*c* shows a two-piece positioning tool 635 without a positioner spacer or hinged object spacer.

The continuously adjustable tool has the advantage of allowing the mounting bases to move out of parallel with each other (i.e., longitudinally in and out from the face of the door/frame) for the situation where the door face is not parallel to the frame face. This condition may be encountered with old, hand-made wood frames. The out-of-parallel adjustment capability of the tool allows the mounting bases to still be seated against the door/frame faces. The door and frame misalignment will be corrected when the hinge itself is attached. It should be noted that the positioning tool will still insure that the lateral spacing and parallelism of the mounting bases, with respect to the door/frame interface or gap, is maintained.

Figure 77A:
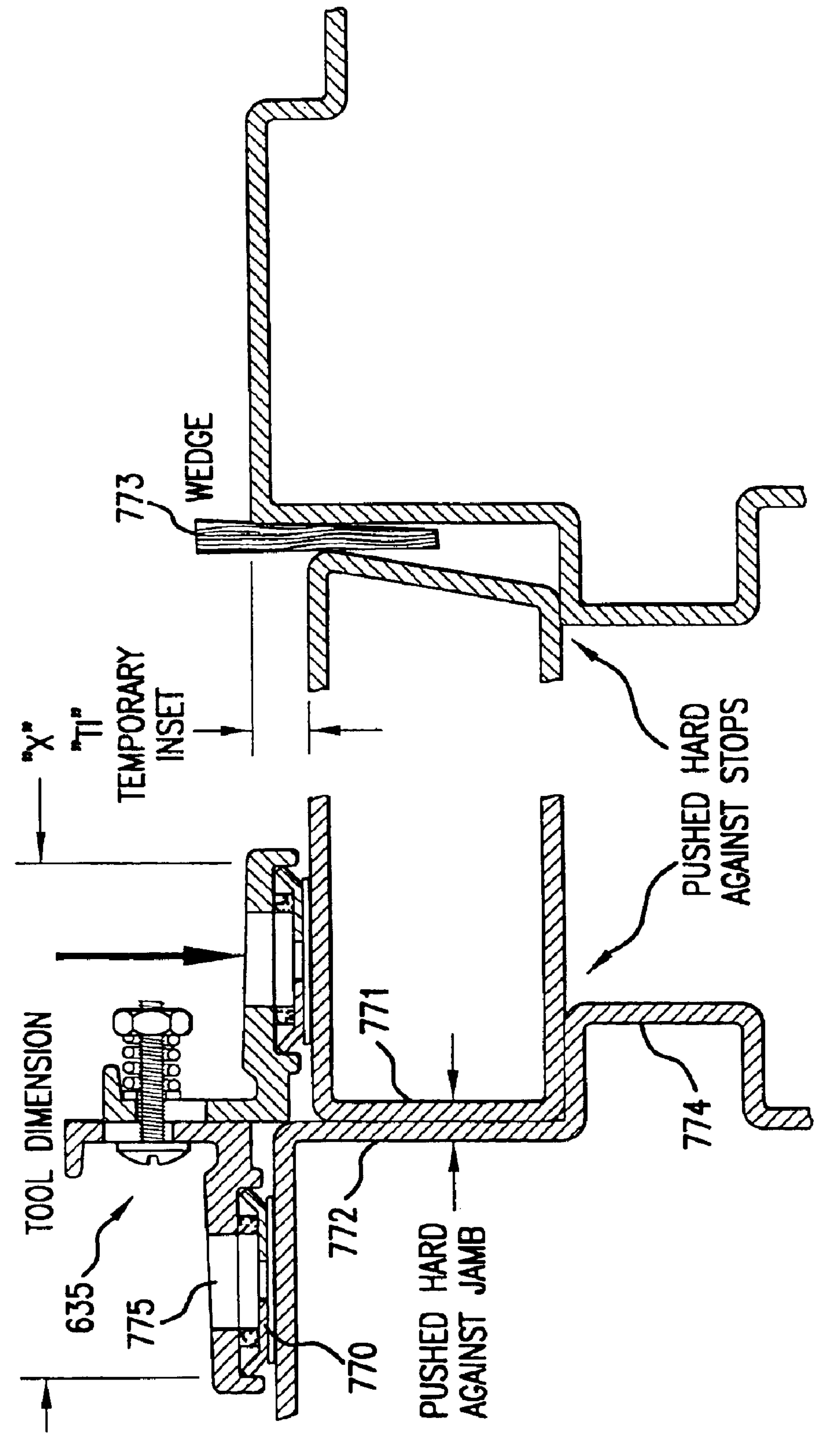
FIGS. 77*a*–*b* are top cross-sectional views of using a positioning tool with an adjustable planar offset.
Figure 77B:
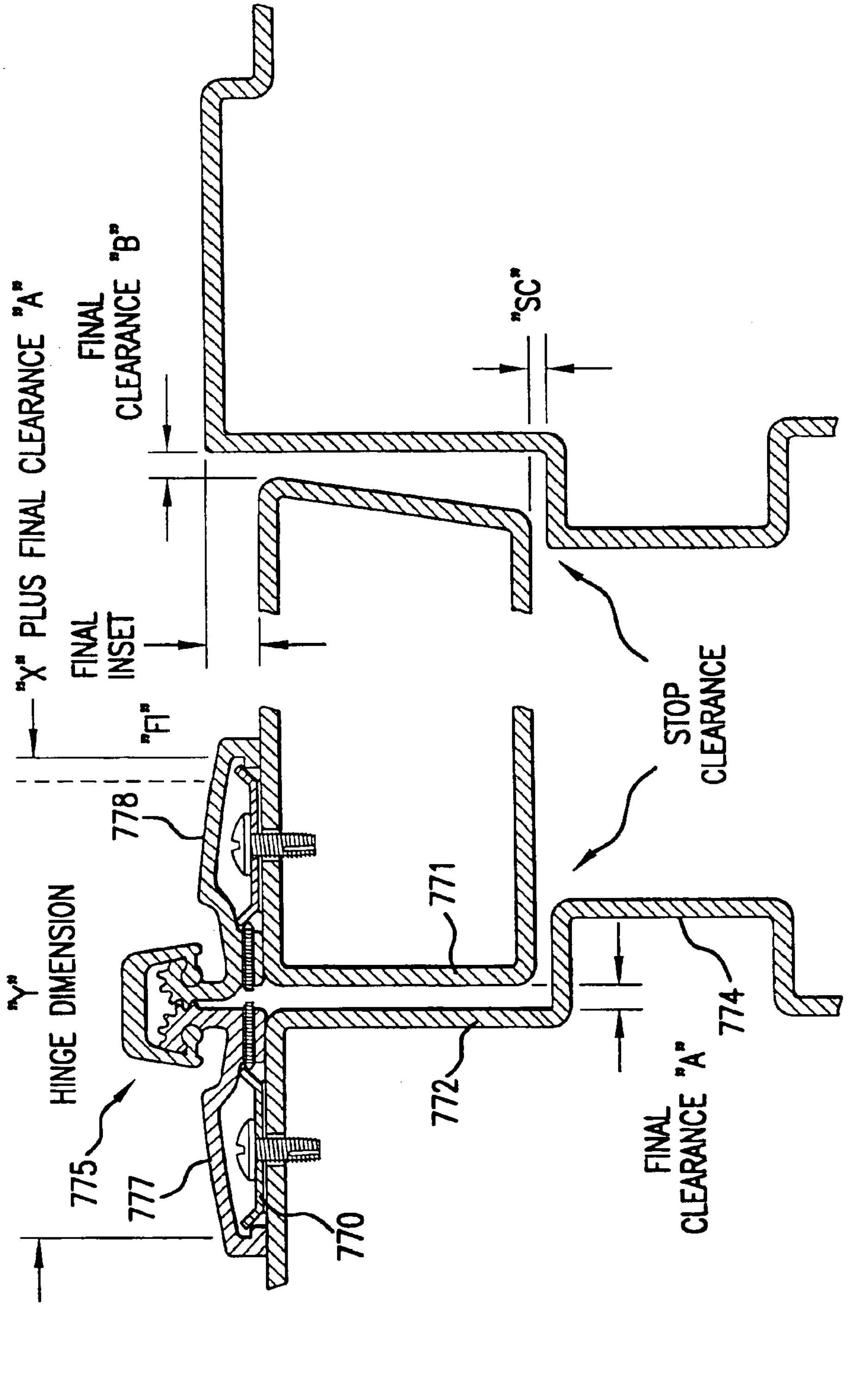

As shown in FIGS. 77*a–b*, the adjustable two-piece positioning tool of FIG. 65*c* is used to install hinges such that the final door installation will have an inset between the faces of the door and frame, and a final clearance between the door and doorjamb 772. In this application, no wedge or shim is used initially to space the door away from the hinge jamb of the frame because a wider dimension between the mounting bases will be created to space the door away from the hinge jamb when the hinge is installed as described below.

In FIG. 77*a*, the positioning tool 635 is used to locate and attach the mounting bases 770 to the door 771 and frame hinge jamb 772. The door 771 is pushed tight against the jamb 772 (i.e., no clearance between door and jamb) and held in position by a wedge or shim 773 as shown. The door 771 is also pushed tight against the frame door stops 774 (i.e., no clearance between stops and door) as shown creating a temporary initial inset "TI." The tool width "X" as shown sets the mounting width between the mounting bases 770.

In FIG. 77*b*, a hinge 775 is installed having a width "Y" which equals tool width "X" plus the desired final clearance "A" between the door 771 and jamb 772 (i.e., a wider base 770 spacing results because the installed has a greater width than the positioning tool). One hinge leaf 778 has a greater depth or height than the other hinge leaf 777, which is predetermined to provide a desired final inset "FI" as shown, whereby a clearance "SC" may also be provided and produced between the frame door stops 774 and door 771. It should be recognized that a positioning tool as shown in FIG. 65*b* may alternatively be used (not shown) to narrow the final clearance "A" between the door 771 and jamb 772 because the shim will effectively reduce the difference between the positioning tool spacing created by the mounting bases 770 and that resulting after the hinges are installed. It will be appreciated that a hinge having a width equal to the width of the positioning tool may also be used whereby the initial and final spacing between the mounting bases will be the same.

Figure 78A:
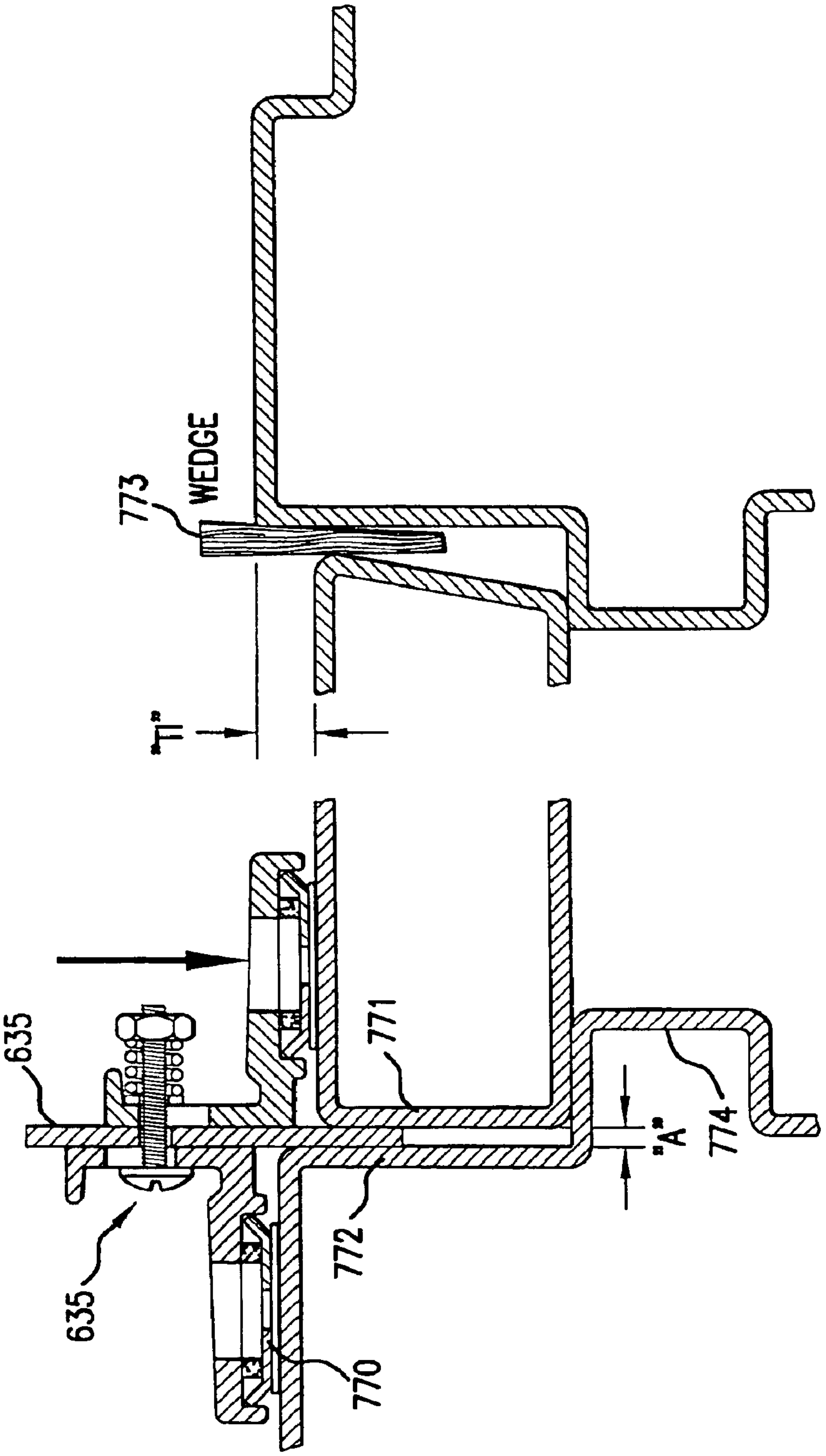
FIGS. 78*a*–*b* are top cross-sectional views of using a positioning tool with a positioner spacer and an adjustable planer offset.
Figure 78B:
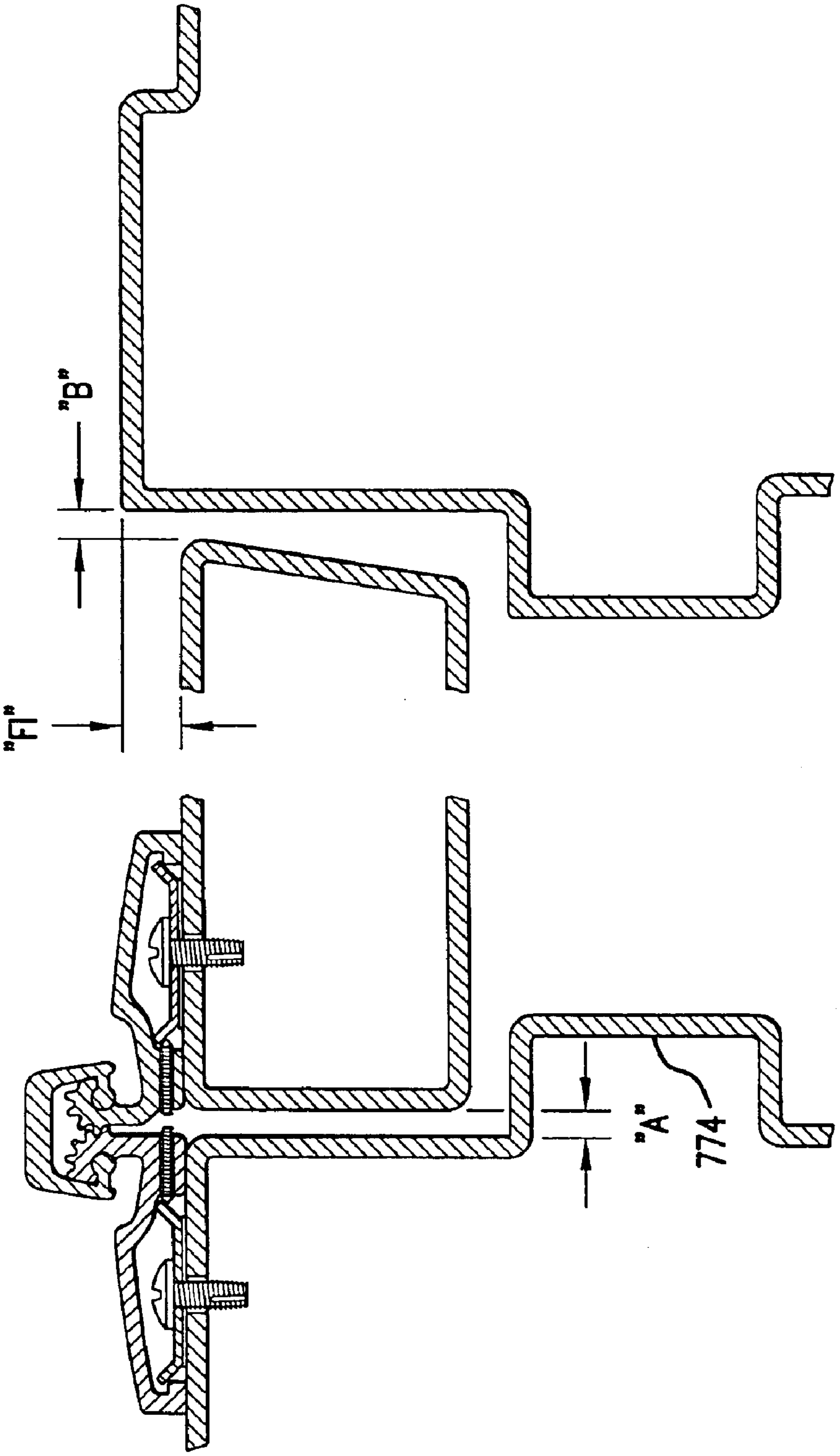

In FIGS. 78*a–b*, the tool shown in FIG. 65*a* is used which has a positioner space 637 with an integral hinged object spacer. In this instance, the final clearance "A" between the frame door jamb and door will be the same as the initial clearance due to the thickness of the hinged object spacer. A final inset "FI" may also be provided using the same general principles as discussed above in conjunction with FIGS. 77*a–b*.

Figure 65F:
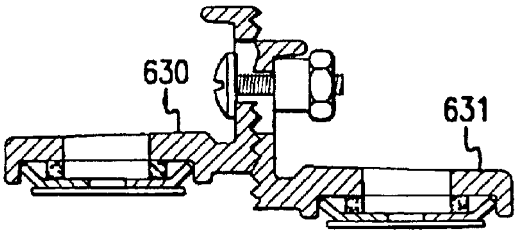

In FIGS. 65*a–c* discussed above, the part of the two base positioner halves that contact each other are substantially flat. However, other embodiments are possible. For example, FIGS. 65*d–f* show a two-piece multi-position positioning tool 635 wherein each base positioner half 630, 631 has a sawtooth-like ratcheting surface 639 adapted and configured to mate with a corresponding ratcheting surface 639 on the other base positioner half. The ratcheting surfaces allow both halves of the base positioning tool to be positively engaged together without slippage therebetween when the fastener is been tightened. FIG. 65*d* shows a two-piece positioning tool having a positioner spacer 6371 with an integral hinged object spacer. The positioner spacer 6371 has ratcheting surfaces disposed on opposite sides of the spacer as shown to engage the ratcheting surfaces of both halves of the positioning tool. FIG. 65*e* shows a two-piece positioning tool having only a positioner spacer 6381 which similar has ratcheting surfaces disposed on opposite sides. FIG. 65*f* shows a ratcheting positioning tool without a positioner spacer or hinged object spacer.

The ratcheting positioning tool shown in FIGS. 65*d–f* is particularly useful if a number of identical doors are to be outfitted with similar hinges because the initial insert of the door could be locked in place for repeated use in attaching the mounting bases to the hinged objects. The ratcheting positioning tool may also be used to insure that a door is installed with an inset parallel to the frame face if the frame does not have door stops, if the door were of non-uniform thickness, or if the door or frame is bowed (i.e., not flat and level) and it is the intention of the installer to restore flatness to the finished door installation.

Figure 76A:
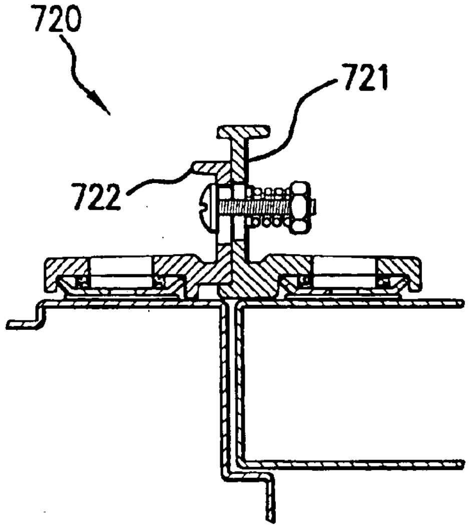
FIGS. 76*a*–*b* are cross-sectional views of a two position positioning tool.
Figure 76B:
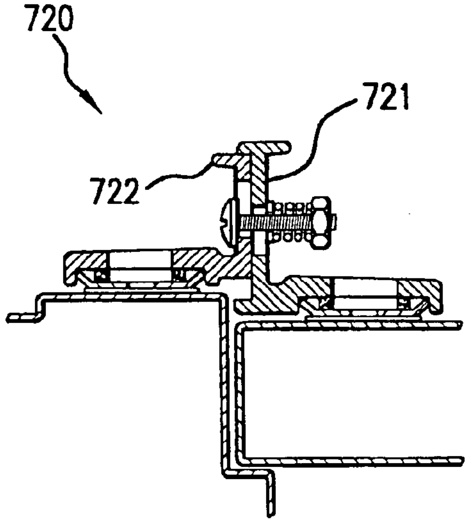

In another embodiment shown in FIGS. 76*a–b*, a two-piece positioning tool 720 has a lower and an upper limit of movement to provide two-position tool. One half of the tool 721 forms a handle and a vertical channel in which the opposing half 722 can assume a lower position (FIG. 76*a*) and an upper position (FIG. 76*b*). Both the upper and lower limits maintain the tool in a fully parallel condition; however, intermediate positioning between these limits does not.

The two-piece positioning tool is not limited to the various embodiments of an offset mechanism described above, and other slidable arrangements known in the art may be used to create an adjustable offset.

Figure 22:
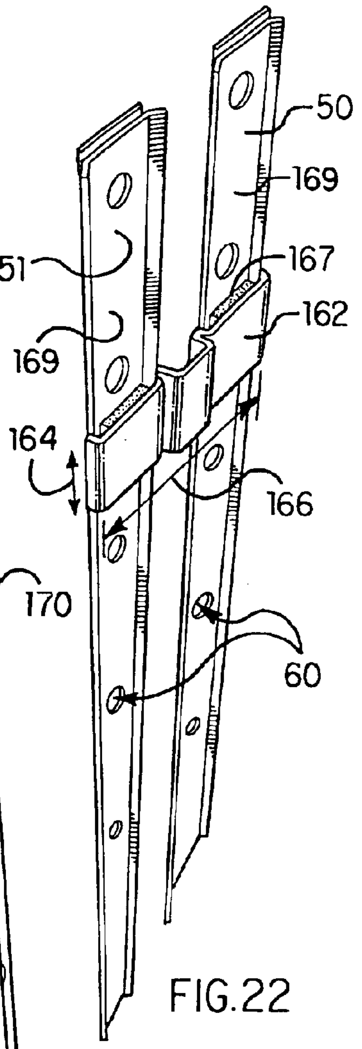
FIGS. 22–24 are perspective views showing alternative embodiments of positioning tools.
Figure 23:
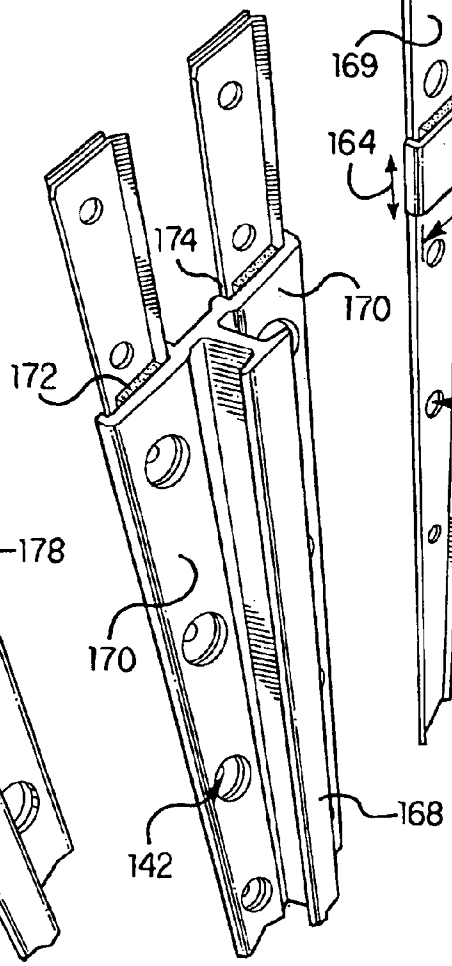
Figure 24:
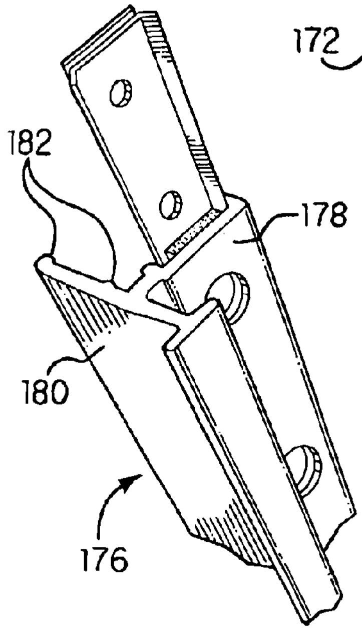

FIGS. 22–24 show alternative embodiments of positioning tools. Positioning tool 162 is constructed from a sheet of material, such as sheet metal. It has a small longitudinal length 164 compared to its lateral width 166. The length of positioning tool 162 is less than the distance between fastener openings 60 and sufficient to fit therebetween to permit drilling and screwing in the openings 60. A plurality of positioning tools 162 of this embodiment can be employed with one set of bases 50,51. Magnets 167 are generally rectangular and span the width of the central portion 169 of the bases 50,51.

The positioning tool 168 of FIG. 23 is similar to the positioning tool 160 of FIG. 21, but has base positioners 170 that are of unitary construction. Magnets 172 may extend along most of the underside of the receptacles 174, and have openings that correspond and are aligned with openings 142, or the magnets may be segmented and selected to have only the retaining force necessary to hold the mounting bases in position until they are attached to the hinged object.

Figure 25:
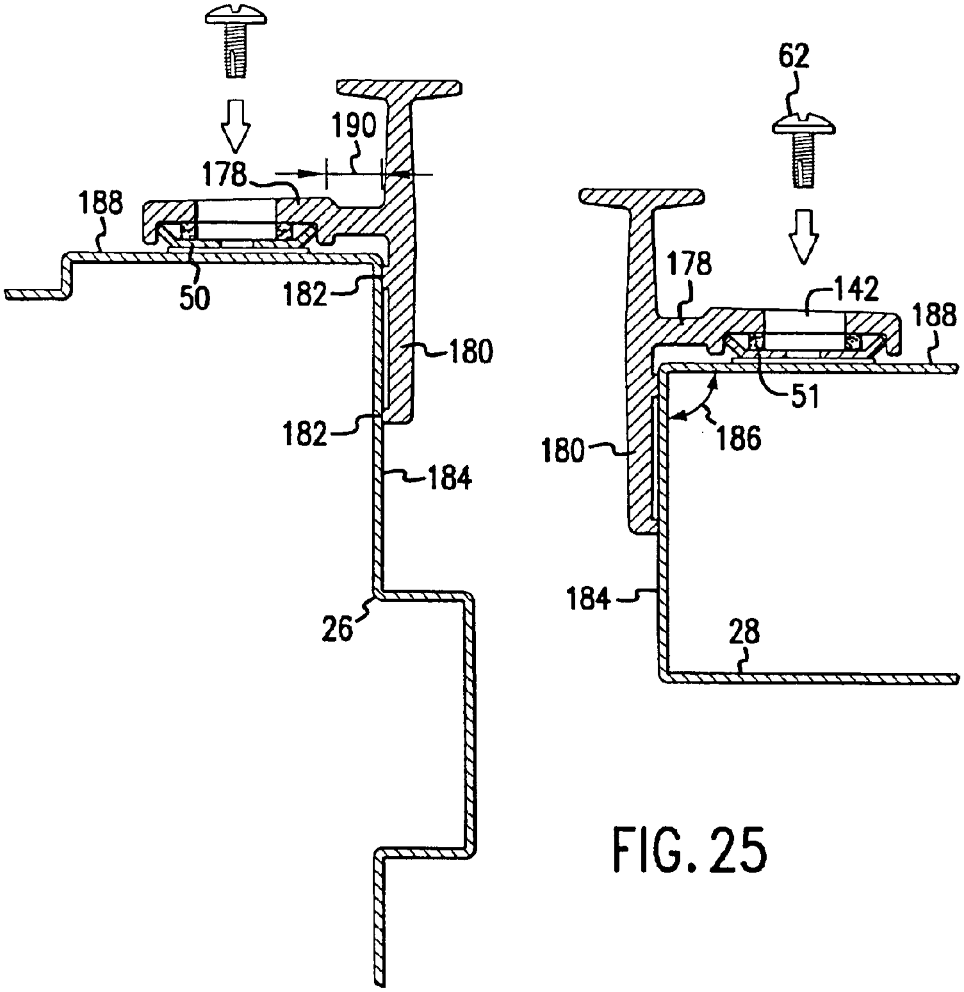
FIGS. 25 and 26 are cross-sectional top views of single sided positioning tools.

The positioning tool 176 of FIG. 24 has a single base positioner 178 and an edge alignment portion 180, which preferably includes an alignment surface 182 configured to abut a surface 184 of the hinged object as shown in FIG. 25 to which the base 50 is to be attached, which is oriented at an angle 186 to surface 188 to which the base 50 is to be attached. In the embodiment shown, the angle 186 between the surfaces 184,188 and between the retained bases 50,51 and the alignment surfaces 182 is a right angle. This may be varied to fit other hinged objects. The base positioner 178 controls the distance 190 between bases 50,51 and the edges of the hinged objects 26,28.

Figure 26:
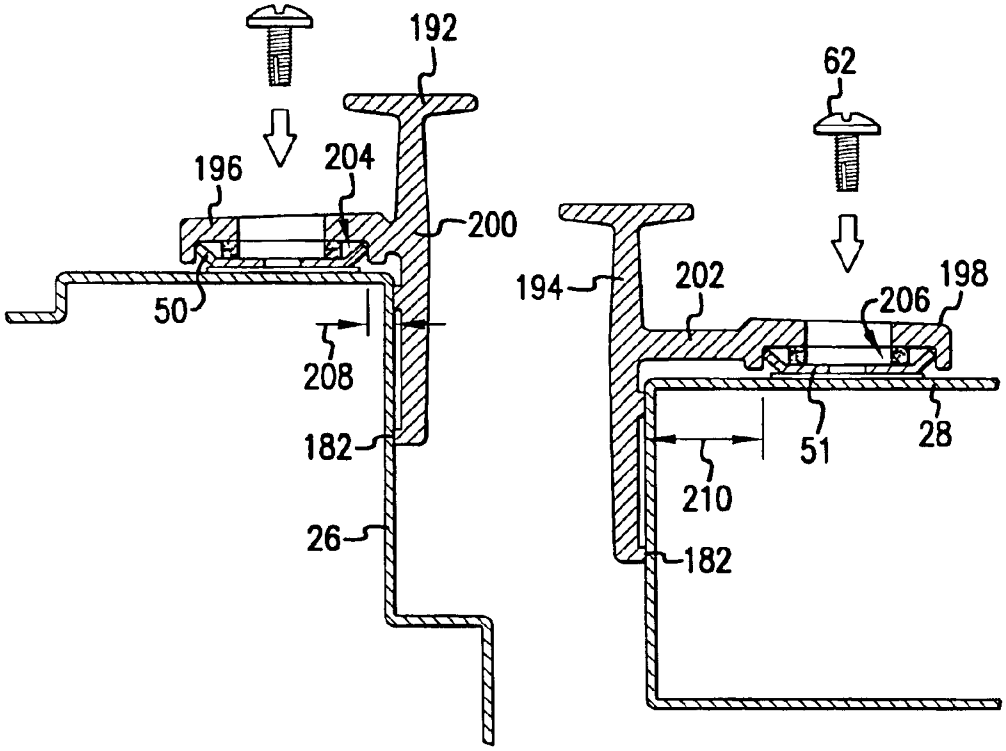
Figure 27:
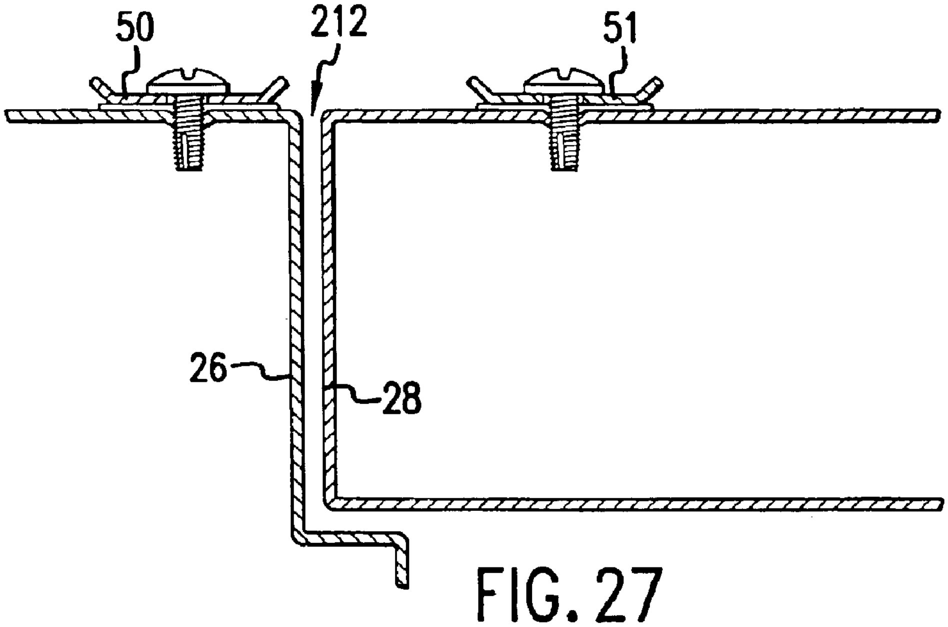
FIG. 27 is a cross-sectional top view of mounting bases positioned and attached to hinged objects.

Referring to FIG. 26, positioning tools 192,194 have base positioners 196,198 configured to position the bases 50,51 at different distances from the edges of the hinged objects 26,28. Arms 200,202 have different widths, to retain the receptacles 204,206 at different distances 208,210 from the alignment surfaces 182 of the positioning tools 192,194. The final positioning of the attached bases 50,51 is shown in FIG. 27, and is such that the bases 50,51 are located at different distances from the gap 212 between the hinged objects 26,28. This positioning can also be achieved with positioning tools that have two base positioners, by altering their position relative to the gap between the hinged objects, or with an object spacer that is off center with respect to the base positioners.

Figure 28:
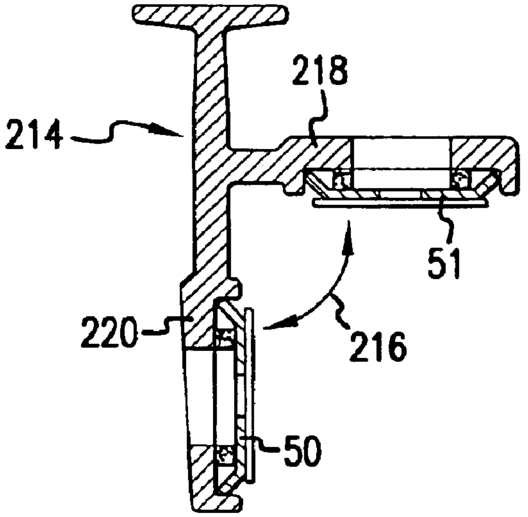
FIG. 28 is a cross-sectional top view of a multi-purpose positioning tool with base positioners disposed at an angle with respect to each other so that the positioning tool can be used for positioning each base in a different plane or for positioning bases for hinges of different widths or for hinges assembled from various hinge member combinations.

FIG. 28 shows a positioning tool 214 configured for holding and mounting two bases 50,51 at an angle 216 to each other. To achieve this, base positioners 218,220 are oriented at an angle to each other. This tool 214 can also be used in place of both tools 192,194 of FIG. 26 first to mount one base 50 to one hinged object 26 at a first distance from the edge thereof, and then to mount the other base 51 to the other hinged object 28 at a second distance from the edge thereof, by rotating the tool 214 and placing the appropriate side of the tool against the hinged objects as needed. In an alternative embodiment, one of the positioners 218,220 faces the opposite direction, for example, positioner 220 would face left in the figure as opposed to right, as shown.

Figure 29:
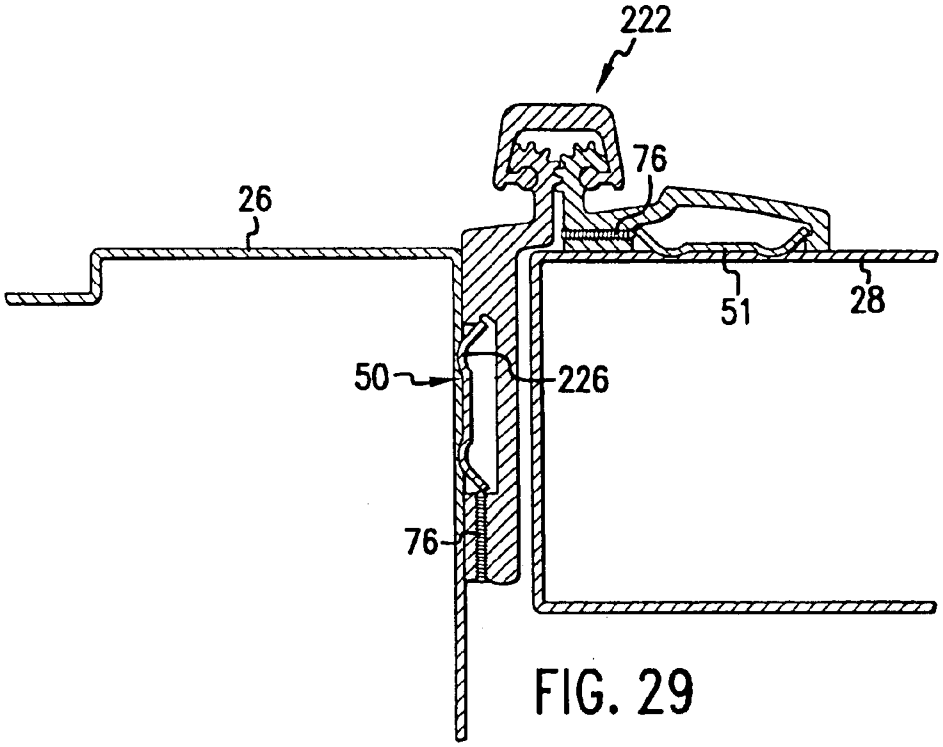
FIGS. 29–31 are cross-sectional top views of different hinge embodiments with bases preferably welded to the hinged objects to suit various combinations of hinged object mounting surfaces, planes and hinge member locking locations.
Figure 30:
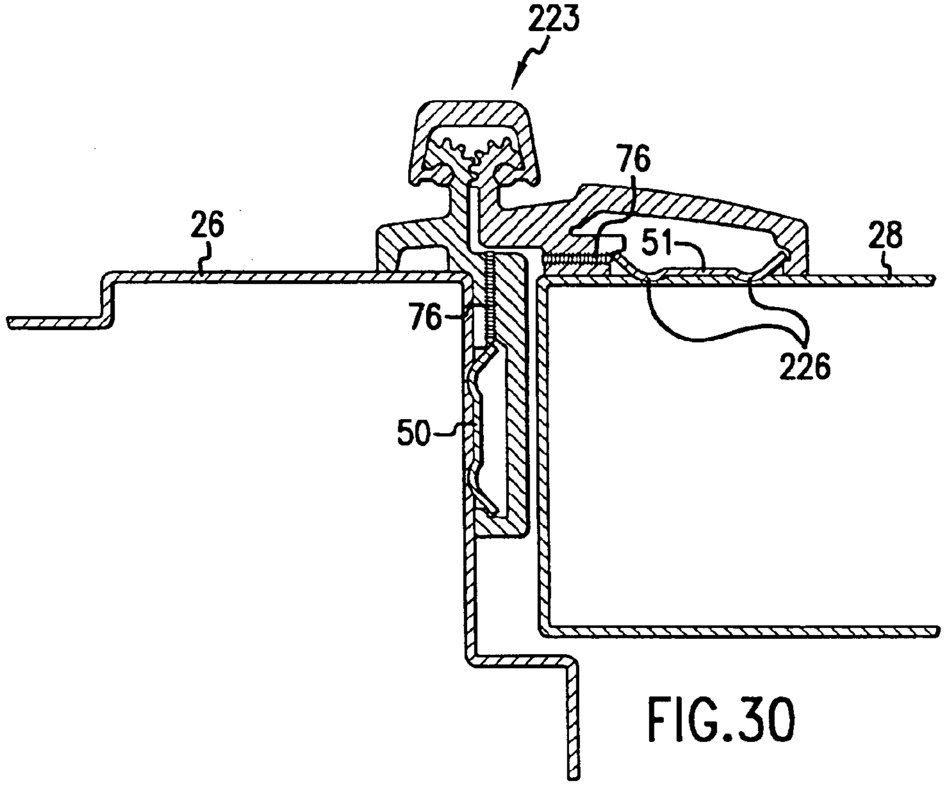
Figure 31:
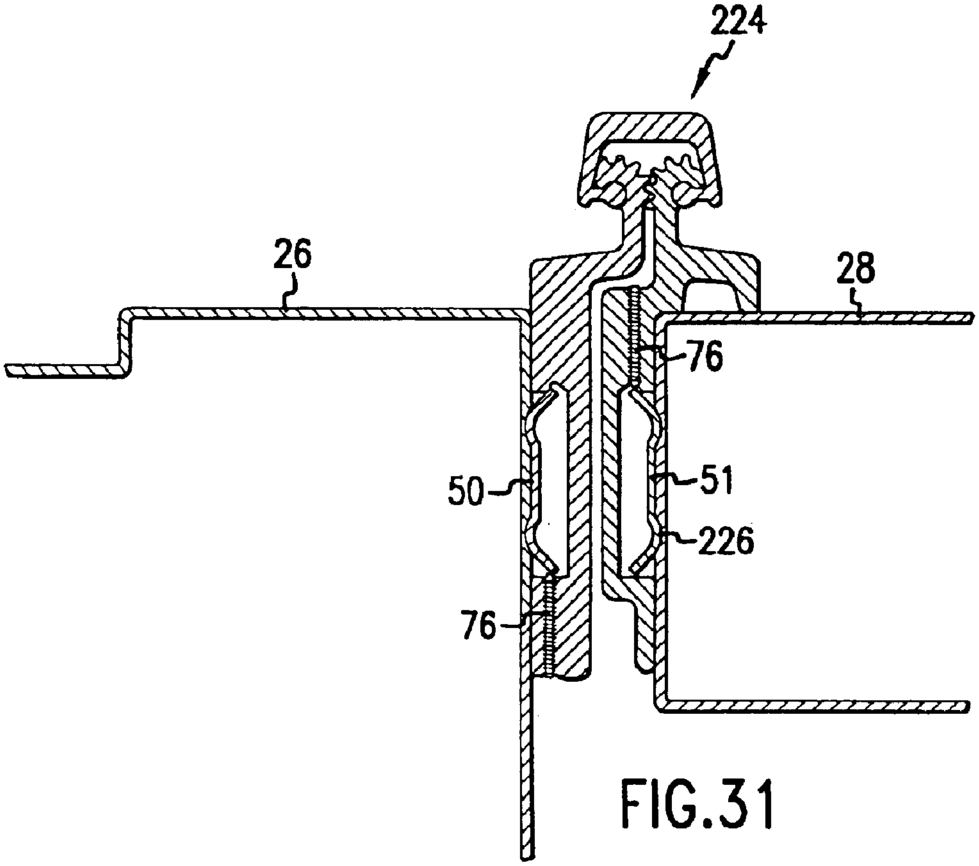

FIGS. 29–30 show hinges 222–223 mounted on bases 50,51 that have been attached to the hinge members using positioning tools or factory-designed jigs and fixtures configured to position the base 50,51 at angles to each other by using base positioners at angles to each other. FIG. 31 shows hinge 224 shows the bases 50, 51 installed directly opposite and opposing each other in a fully mortised hinge assembly. The bases 50,51 shown in FIGS. 29–31 are preferably welded, more preferably spot welded, at welds 226 to the hinged objects 26,28. The welds can be made in the field or in a factory. It should be noted that the bases 50, 51 may also be attached to the hinged objects using fasteners or other similar means (not shown) instead of or in combination with welding. The mounting positions shown in FIGS. 29–31 further show some possible variations on the fastener 76 locations which may be used for security purposes.

Figure 32:
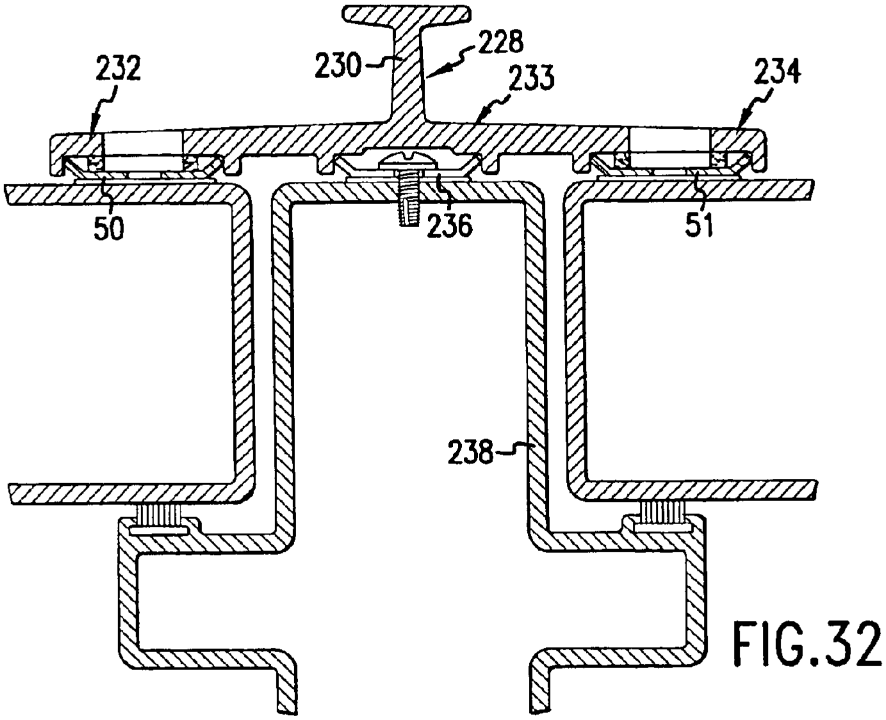
FIGS. 32 and 33 are cross-sectional top views showing steps in the mounting of a double hinge to hinged objects.

Referring to FIG. 32, positioning tool 228 has a central handle 230 and three base positioners 232–234. The central base 236, mounted to hinged object 238, is attached first. Then the central base positioner 233 is placed against the central base 236 for cooperatively aligning therewith by virtue of the configuration of the central positioner compared to the base 236. The lateral base positioners 232,234 thus locate the lateral bases 50,51 in the desired aligned position. In this embodiment, the central base positioner 233 does not have a magnet to engage the central base 236, but another embodiment is provided with a magnet. Also, an alternative embodiment has one or more offset handles in place of the central handle 230 shown, as well as openings to align with openings in the central base 236 to enable drilling and screwing therethrough so that the central base 236 can be attached to the central hinged member while held by the positioning tool 228. It is understood that the alternate embodiments of the positioning tools which include shims and accommodate doors that are not in the plane of the frame face are also possible with the positioning tool shown in FIG. 32.

Figure 33:
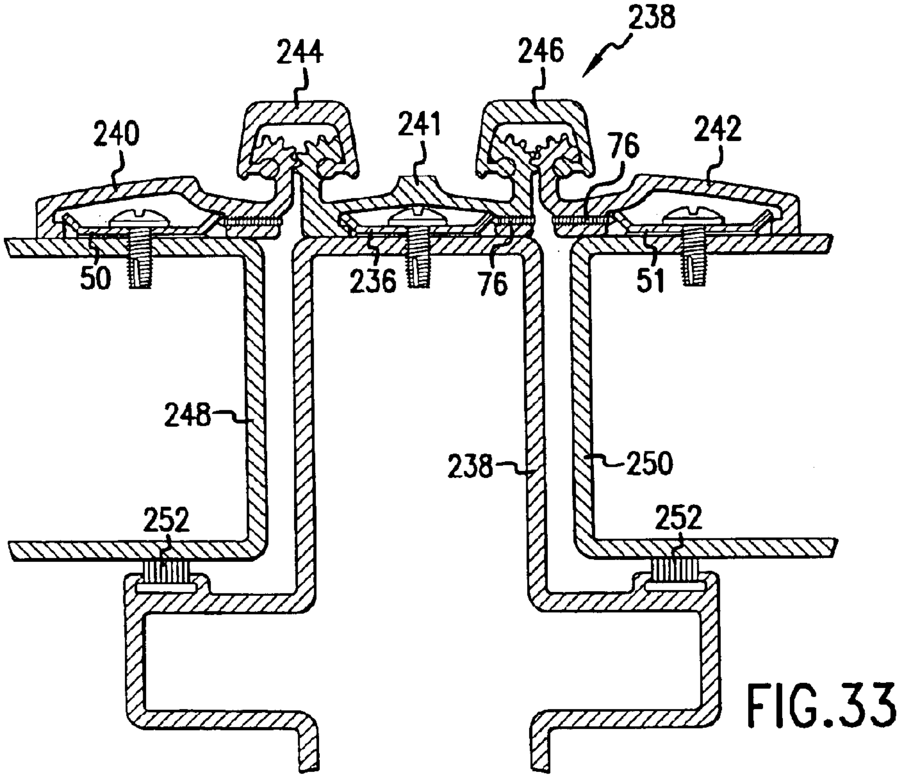

FIG. 33 shows a double hinge 238 mounted to the three bases 50,51,236 with three hinge members 240–242 connected pivotally in lateral series by clamps 244,246. The hinged objects 238,248,250 comprise a multiple door assembly with a central post 238. Seals 252 seal the gap between the lateral hinged objects 248,250 and the central hinged object 238. Preferably, the fastening members 76 are accessible and operable from the underside of the hinge 238, on a side opposite from the clamps 244, and are accessible and operable when the hinges of the double hinge 238 are open, and are preferably concealed and not exposed from the outside of the hinge when closed.

Figure 34:
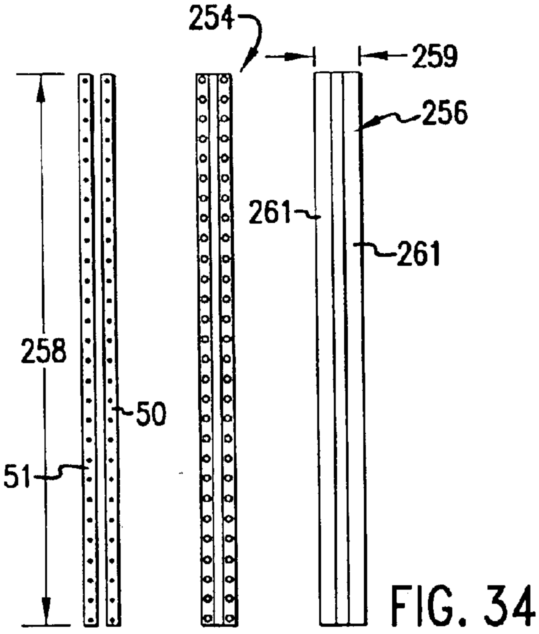
FIG. 34 is a front view of components employed together for mounting a hinge.

FIG. 34 shows a pair of mounting bases 50,51, a positioning tool 254, and a hinge 256 shown next to each other but in the longitudinal association preferred during their use. In this embodiment, each of the bases 50,51, the positioning tool 254, and the hinge 256 have a similar length 258. In addition, the hinge 256 has a hinge width 259 measured with the attachment leaves 261 of the hinge members pivoted away from each other, and the ratio of the hinge length 258 to the hinge width 259 being greater than about 1.25, more preferably greater than about 2, and most preferably greater than about 4.

The bases 260,262 and the hinge 264 of FIG. 35 comprise various base segments 266–271 or hinge segments 272,274, preferably of non-unitary or independent construction and disposed in longitudinal sequence or series. The bases 260,262 are preferably assembled and attached to the hinged objects in longitudinal end-to-end contact with each other so that the total length of the bases 260,262 is the combined length of the segments. Similarly, the hinge 264 is assembled and mounted to the bases 260,262 with the hinge segments in longitudinal end-to-end contact with each other so that the total length is the combined length of the hinge segments 272,274.

The total length of the hinge in this embodiment is longer than the total length of the bases 260,262. Alternatively, the base segments 266–271 may be separated as desired to alter the total base length, which may be made substantially equal to the hinge length. Also, the hinge 264 may alternatively be mounted with a separation between segments 272,274.

It is also noted that the base segments 266–271 are of different lengths. The segments 268,271 are attached to the hinged objects adjacent to each other with ends 276 aligned at a same longitudinal station. Segments 266,267,269,270 have different lengths and are attached to the hinged objects with staggered ends, although preferably, the terminal ends 276 of the bases 266,269 are aligned at a same longitudinal station.

The positioning tool 278 is shorter than the bases 260,262 or the hinge 264, but is preferably long enough to overlap all of the base segments 266–271 to align and position them all together. Alternatively, a segmented positioning tool can be used, with two positioning tool segments overlapping at least one base segment to maintain alignment of all of the base segments 266–271.

FIG. 36 shows a plurality of hinge segments 280,282, 284,285,286 arranged to form different hinges and viewed from the underside. Each of the hinges 280,288,290,292,294 shown include longitudinally supported portions 296 and longitudinally free end portions 298, as disclosed in U.S. Pat. No. 5,778,491. The longitudinally supported portions include a group of thrust bearings 36, while the longitudinally free end portions are free from any longitudinal support between hinge members 300, which are preferably laterally supported by a clamp in the longitudinally free end portion. This arrangement can provide a hinge with maximum lateral support where it is most needed, and that can tolerate greater tolerance in curvatures of the mounted hinge.

Hinge 280 has a single hinge segment, also depicted with numeral 280. Hinge 288 includes a segment 284 with thrust bearings 36, forming the longitudinally supported portion of the assembled hinge 288. Two segments 282 of the hinge 288, without thrust bearings, are positioned at the longitudinal ends of the hinge 288 to provide the longitudinally free end portions of the assembled hinge 288. Thus, the segments 282,284 have different longitudinal and lateral support arrangements, as the segments 282 have no longitudinal supports. Hinge 290 has one bearingless segment 282 at the top and two segments 284 with bearings in series below. In hinge 292, segment 285 has thrust bearings 36 spaced further apart than the thrust bearings 36 of segments 284. Consequently, different segments 282,284 of a same hinge 288,290,292,294 have different lateral and longitudinal support configurations, as well as different configurations of the portions of the hinge members that are associated with each other and with the clamp. The position and size of the longitudinally supported and free portions can be selected according to the loads placed on the door, without having to manufacture a customized hinge. It will be understood that independent means, such an end stop, that allows limited longitudinal slippage between the hinge members and a clamping member or pin may be employed which is sufficient to retain the hinge parts in position regardless of the ability of such end stop to assist in the support of the door weight or other door load.

The manufacture of hinges such as these, and especially of pinless hinges, can be facilitated and accomplished at reduced cost by employing segmented hinges such as the ones described. The relatively short length segments of the continuous hinges can be manufactured with standard sizes, and combined to provide a hinge of the desired length. Shipping and storage of shorter segments is also less costly and more efficient, and inventories required are smaller, as fewer lengths of hinges need to be stored. Quality control deficiencies are less notable in shorter segments than in traditional full length continuous or pinless hinges, and any twisting or bending out of tolerance of the segments is not magnified along other segments that are not of unitary construction therewith.

Also, for a door or other hinged object of unusual height, a final segment may be cut to size, thus potentially requiring the scrapping of a small unused portion of the segment, instead of a large part of a full length traditional hinge. Custom orders do not require manufacture of full scale hinges, as different combinations of segment lengths can be used, reducing delivery times on custom orders. Hinge 294 includes a shorter segment 286 that is used to obtain the small amount of additional length necessary for a non-standard size door.

It is also possible to use a full-length (door height) clamp while using segmented hinge members in the same assembly. This arrangement allows manufacturing savings in scrap reduction and handling to be realized, as well as allowing the installer to choose two or more longitudinally supported hinge member segments for heavier door loads which can then be slipped together in a common or full-length clamping member for ease of handling during installation, as well as improved appearance.

It will be appreciated that various combinations using various mounting base, tool, and hinge configurations shown in FIGS. 34–36 is possible. For example, a continuous or one-piece mounting base may be used on one side with a segmented rail on the other side, a segmented installation tool may be used with one-piece mounting bases, several smaller mounting tools can be joined with a continuous shaft, etc. Accordingly, the invention is not limited to the embodiments described herein.

Figure 38:
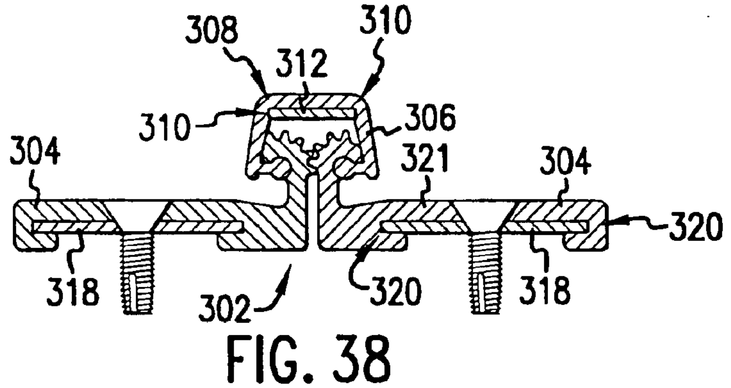
FIG. 38 is a cross-sectional top view of a coupled hinge segment.

Although the embodiments described above employ the mounting bases of the invention, alternative embodiments of segmented hinges are affixed directly to the hinged objects without mounting bases. Referring to FIGS. 37 and 38, hinge 302 is configured for mounting directly to two hinged objects and has openings oriented through the hinge members 304 to fix the hinge members 304 to the hinged objects.

Figure 39:
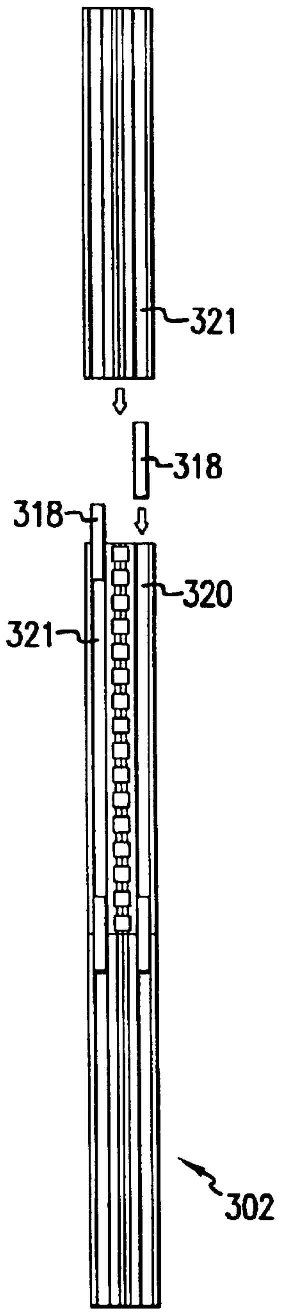
FIGS. 39 and 40 are underside views showing steps in coupling hinge segments.
Figure 40:
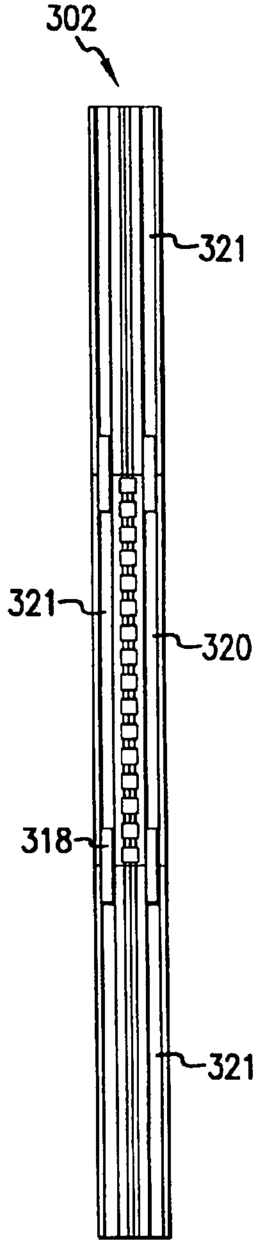

Clamp 306 of the hinge 302 has a couplable portion 308 with opposed grooves 310 configured to receive a coupling member, such as flat spline 312. Spline 312 is constructed of a material having sufficient strength to interconnect, interlock, and maintain two hinge segments 321 of the hinge in coupled association, preferably prior to mounting to the hinged objects. Splines 312 are preferably made of steel and the hinge members and clamp of aluminum, preferably extruded. Spline 312 also preferably has teeth 314,316 or serrations or other means or members to lock or increase friction with the portion of the hinge 302 in which it is received and which it couples. Teeth 314,316 are preferably configured to allow insertion into the hinge segment and engagement therewith, but to prevent or resist extraction or disengagement therefrom. Thus teeth 314,316 have a sloped surface facing the end adjacent to the respective group of teeth 314,316 to allow insertion, and a steeper surface facing in the opposite direction to resist extraction. Teeth 314 are oriented in an opposite direction from teeth 316. Such coupled clamping members are also especially useful to prevent longitudinal motion in hinges with longitudinally unsupported free ends, such as end segments 282 shown in FIG. 36. Similar but laterally wider splines 318 are engaged with couplable portions 320 of the hinge members 304 to couple the hinge members of adjacent segments, preferably prior to mounting to the hinged objects. As shown in FIG. 39, the splines 318 are inserted into the couplable portions 320 of the hinged members 302, coupling the segments to form a single hinge 302, as shown in FIG. 40.

Figure 41:
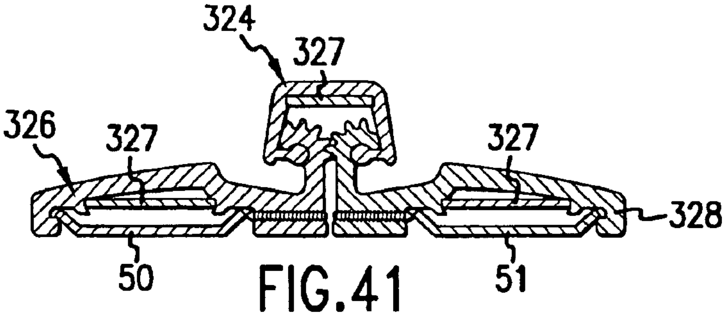
FIGS. 41–43 are cross-sectional top views of different embodiments of coupled hinge segments.
Figure 42:
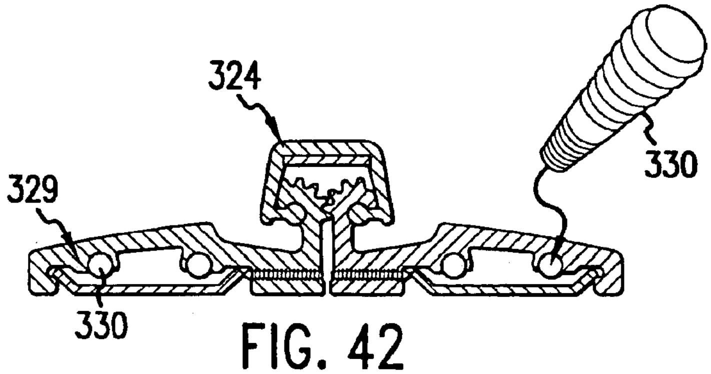
Figure 43:
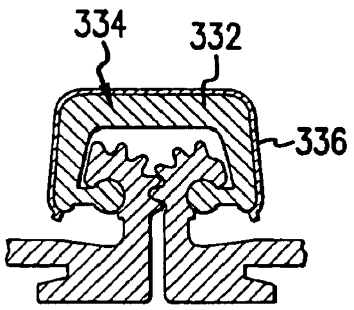

FIG. 41 shows another embodiment of a hinge 302 with couplable portions 324,326 of the clamp and hinge members, coupled to adjacent segments of the clamp and hinge members by splines 327, as well as mountable portions 328 for mounting to bases 50,51. The couplable portions 329 of FIG. 42 are configured for engagement with and for receiving round, or cylindrical splines 330 or pins, which are preferably serrated. Couplable portion 332 of clamp 334 shown in FIG. 43 is effectively the entire length of the clamp, as segments are coupled by a snap-on cover 336 coupling member of resilient material, such as spring steel. The snap-on cover 336 can be made of a different color, finish or material than the rest of the hinge. In an alternative embodiment, the snap-on cover is shorter than the length of the clamp 334, but of sufficient length to couple adjacent clamp segments.

Figure 44:
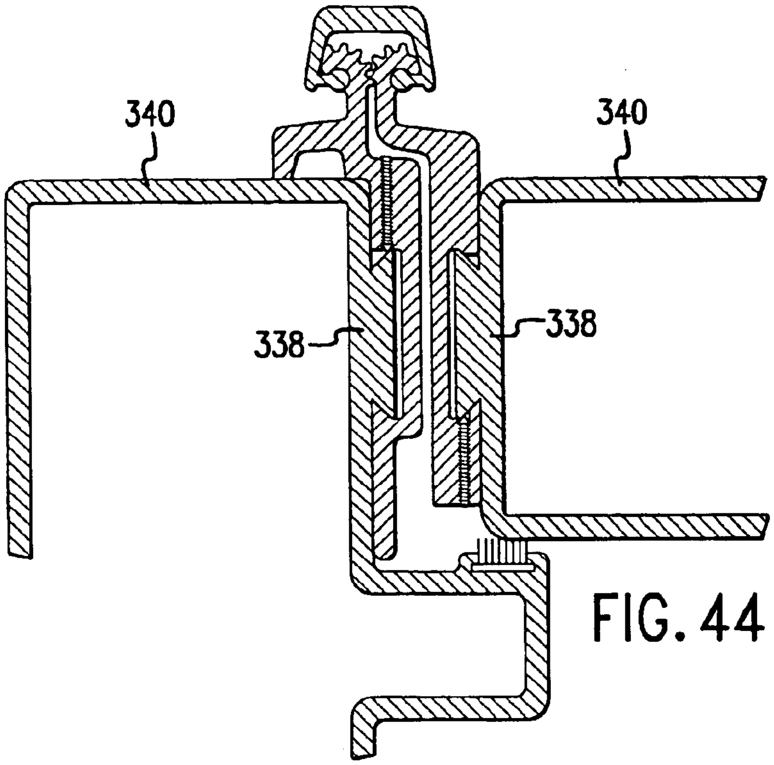
FIG. 44 is a top cross-sectional view of an embodiment of mounting bases that are of unitary construction with the hinged objects.

Referring to FIG. 44, bases 338 are of unitary construction with the hinged objects 340. FIG. 45 shows different pinned hinges with mounting portions 342 and base fasteners 344 for mounting to and engaging with bases. The hinge members of these hinges are pivotally connected by pins 345, which are the joining members. Hinge 346 has a cover 348 movably associated with the hinge members 350 as disclosed in U.S. Pat. No. 5,991,975. Hinge 352 is constructed from roll formed sheet-metal or a sheet of other material and has U-shaped portions 354 to house the base fasteners 344, which are received in openings in opposite walls of the U-shaped portions 354.

Figure 46:
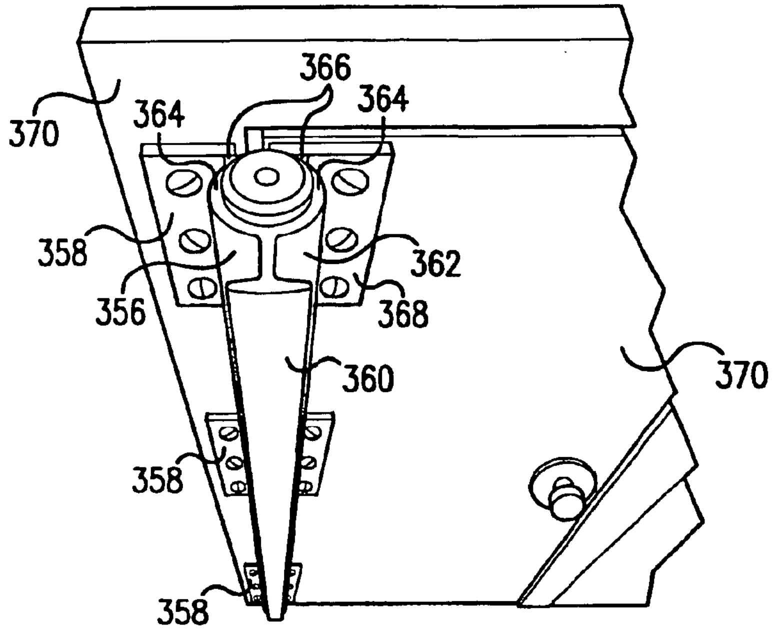
FIGS. 46 and 47 show steps in aligning and mounting butt hinges to hinged objects.
Figure 47:
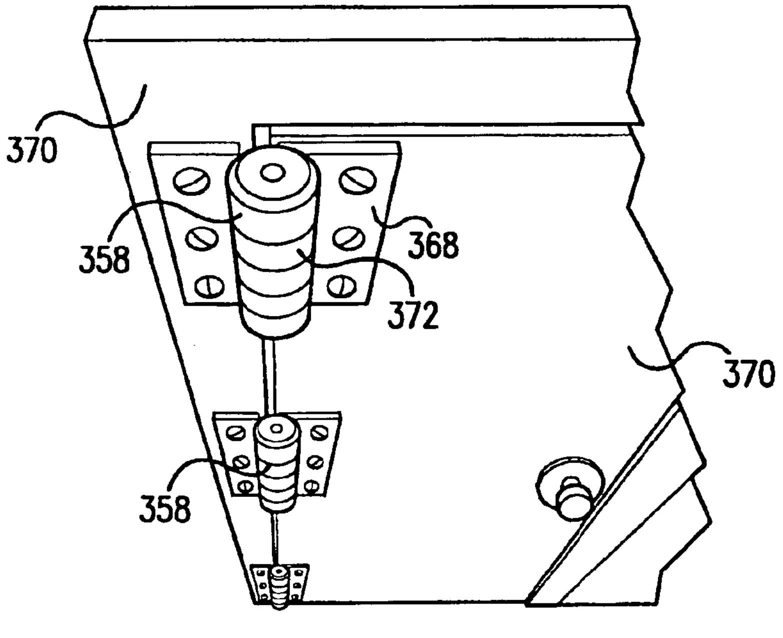

Referring to FIGS. 46 and 47, hinge member positioner 356 is configured for receiving and aligning hinge segments which are independent butt hinges 358. This type of hinge is typically used for door repair and are traditionally frequently misaligned in practice. Positioning tool 356 has a handle 360 and a semi-cylindrical hinge receiving portion 362, preferably with resiliently deformable side walls 364, preferably made of a metal or a plastic, or other suitable material. The side walls extend around a sufficiently large circumference so that edges 366 thereof contact the attachment portions 368 of the hinge members maintaining them in a closed position for mounting to the hinged objects 370.

Knuckles 372 of the hinges 358 are received in the receiving portion 362. The hinges 358 are aligned axially and placed as desired against the hinged objects, and the hinge members are fastened thereto. Then the positioning tool 356 is separated from the hinges, producing easily pivotable hinged members, such as the door and frame shown. It will be understood that similar door clearance shimming devices as shown in FIG. 19, for example, are also envisioned in this embodiment.

Figure 48:
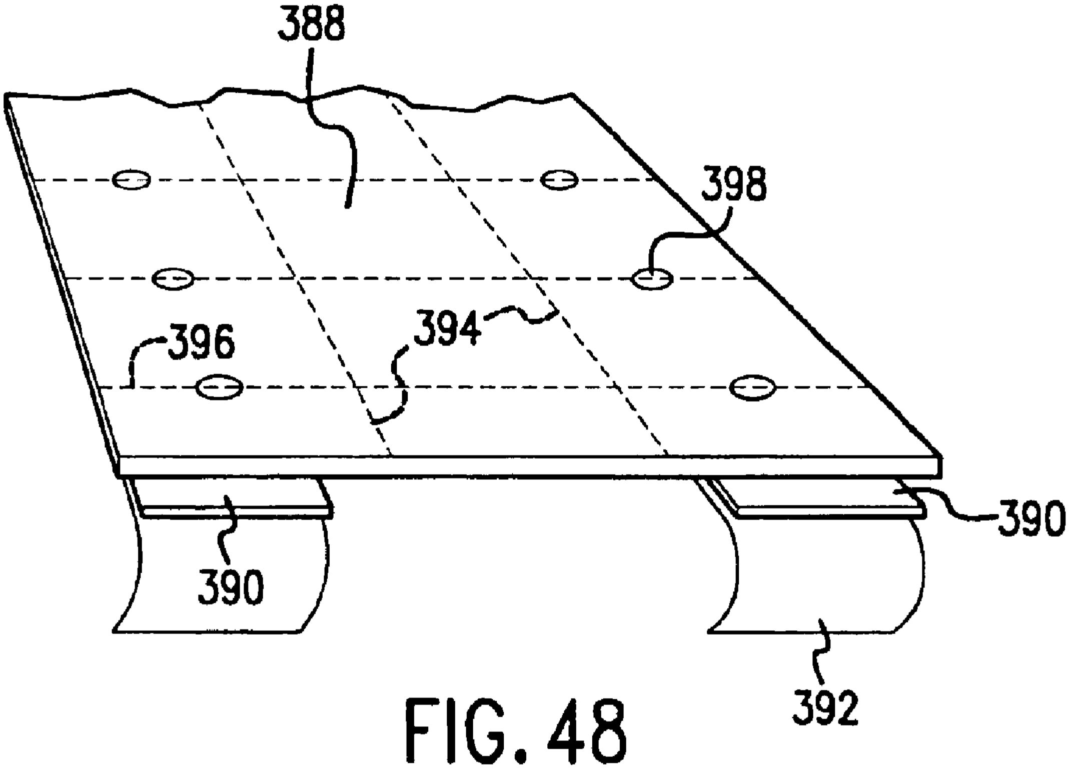
FIG. 48 is a perspective cut-away view of another embodiment of a positioning tool.

Referring to FIG. 48, positioning tool 388 includes an adhesive layer 390, preferably in two portions, disposed for attaching to two hinged objects, and covered by removable covers 392. Indicia is disposed on the topside of the positioning tool 388 for aligning hinge members with respect thereto. The indicia preferably includes longitudinal and lateral indicia 394,396, configured for aligning with the hinge members longitudinally and laterally, and also preferably includes drilling indicia 398, configured and disposed for aligning and locating drilling holes, pre-aligned with fastener holes in the hinge members.

Figure 49:
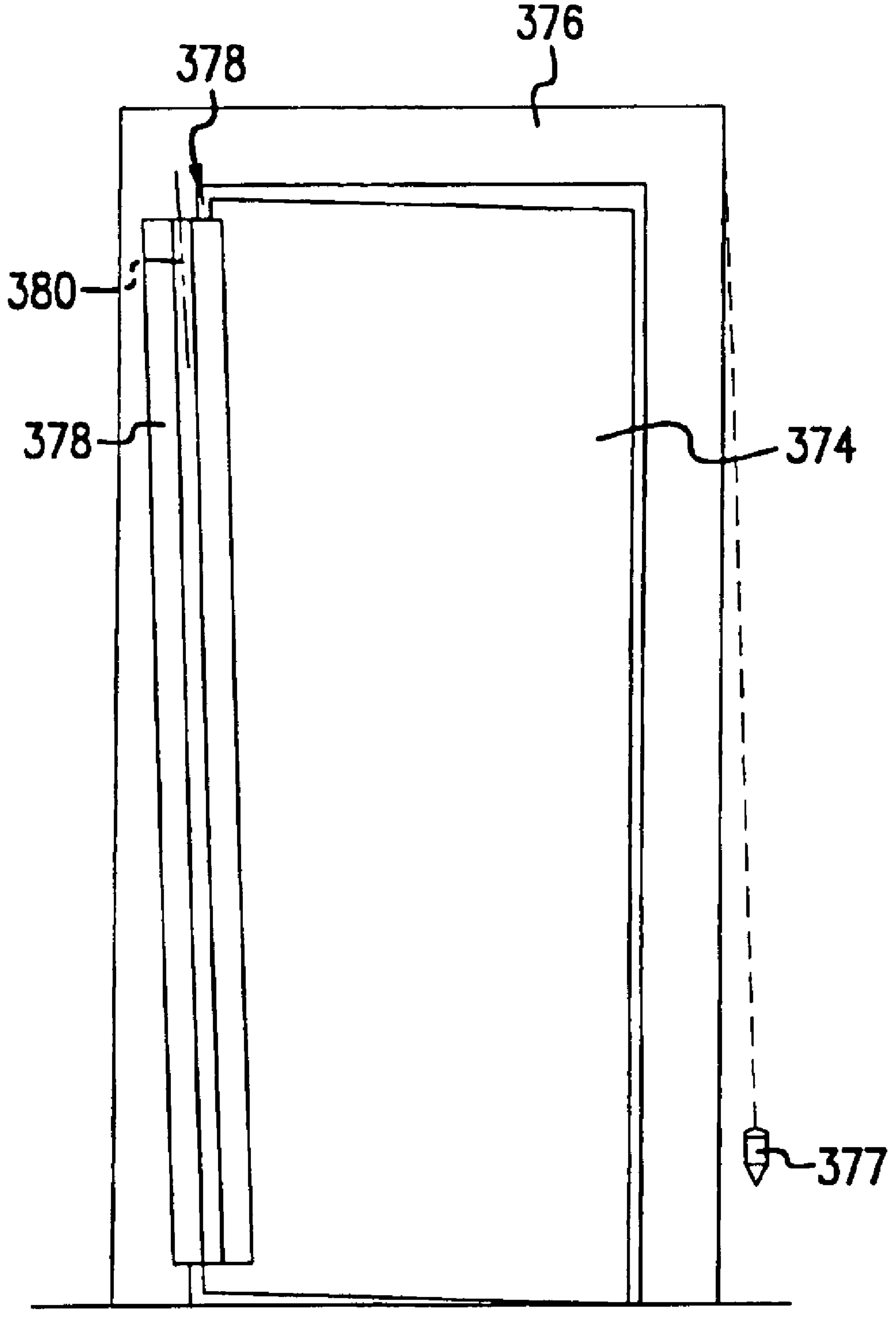
FIG. 49 is a front view of a hinge mounted in plumb to a door and frame that are out of plumb.

The present invention is particularly useful for attaching hinges to out-of-plumb doors and frames, or to doors to be hung in frames of which the top and bottom widths do not match. As shown in FIG. 49, door 374 and frame 376 are out of plumb, or not aligned properly vertically and horizontally as seen with respect to plumb 377. If a hinge were attached thereto in line with the gap 378 between the door 374 and frame 376, the door would not be neutrally stable, as is desirable, but would tend to fall towards its lowest position, which may be full open or closed or somewhere in between. The positioning tool of the invention, particularly those without object spacers, are used with the door 374 and frame 376 shown to mount a hinge 378 in plumb, with a substantially vertically aligned hinge axis 380, to improve the hinging motion of the door 374. These positioning tools can also be used to insure that the gap on the lock side remains substantially uniform while a continuous hinge covers an uneven gap on the hinge side.

Figure 50:
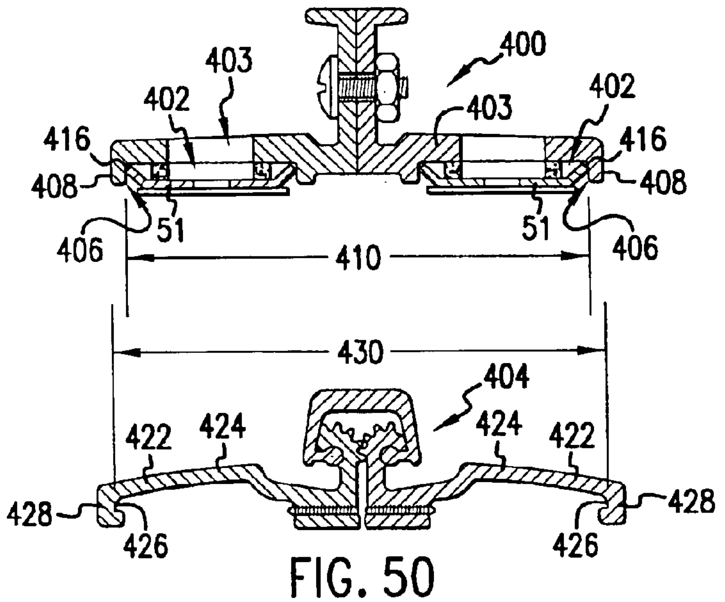
FIG. 50 is a cross-sectional top view of a positioning tool and hinge.
Figure 51:
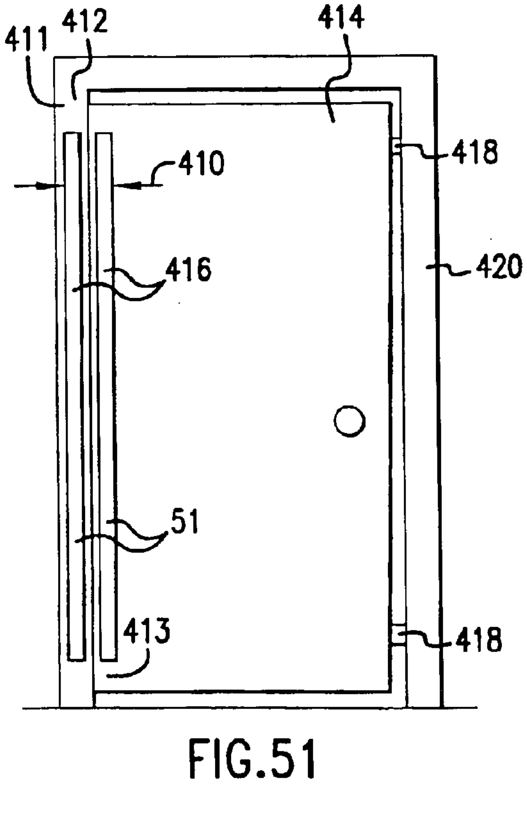
FIGS. 51–52 are front views showing steps of mounting a door in a frame.

Referring to FIG. 50, positioning tool 400 has receptacles 402 of the base positioners 403 separated at a distance to locate mounting bases 51 at a distance from each other that is different than when the bases 51 are attached to hinge 404. Portions of the positioning tool that are configured to locate the bases 51, such as the inner surfaces 406 of the outer lateral walls 408, which positively locate the outer edges 416 of the mounting bases 51, are separated by a tool distance 410. Positioning tool 400 is thus configured for locating the bases 51 on the hinged frame and door 412,414 shown in FIG. 51 with the outer edges 416 of the bases 51 spaced by the tool distance 410.

In the preferred method for using positioning tool 400, the door 414 is positioned and held against the hinged side 411 of the frame 412. Wedges (shims) 418 are preferably inserted between the latch side 420 of the frame 412 frame and the side of the door which typically includes part of a latch mechanism (opposite from the hinged side 411). The longitudinal axes of the mounting bases 51 are preferably aligned substantially in plumb or vertically. The positioning tool 400 thus is configured to locate the mounting bases 51 with respect to the hinged side 411 of the frame 412.

Figure 52:
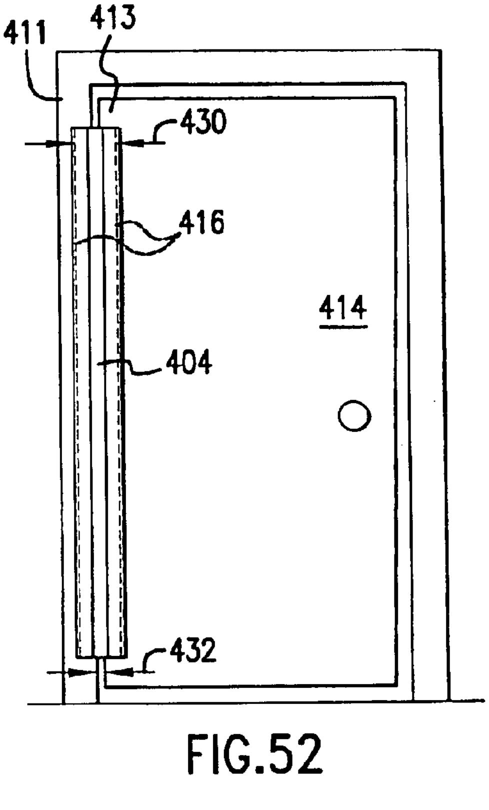

Referring again to FIG. 50, hinge 404 has mountable portions 422 separated at a distance to mount the mounting bases 51 at a distance from each other that is different than when the bases 51 are held with the positioning tool 400. Portions of the mountable portions 422 of the hinge members 424 that are configured to locate with the bases 51, such as the inner surfaces 426 of the mounting portions 428, which positively locate hinge members 424 with respect to the outer edges 416 of the mounting bases 51, are separated by a hinge distance 430. Distance 430 is greater than tool distance 410 by a clearance distance 432 of FIG. 52, which remains between the hinged sides 411,413 of the frame 412 and door 414 when the hinge 404 is mounted to the bases 51 that are attached to the door 414 and frame 412. Thus, distance 430 is substantially equal to the sum of tool distance 410 and clearance 432. Also, the mounting bases 51 are positioned closer to each other in FIG. 51, as located by the positioning tool 400, than when mounted to the hinge 404, as shown in FIG. 52. The hinged sides 411,413 are disposed generally parallel to each other both when attaching the bases 51 to the frame and door 412,414 and when the hinge 404 is mounted.

Figure 53:
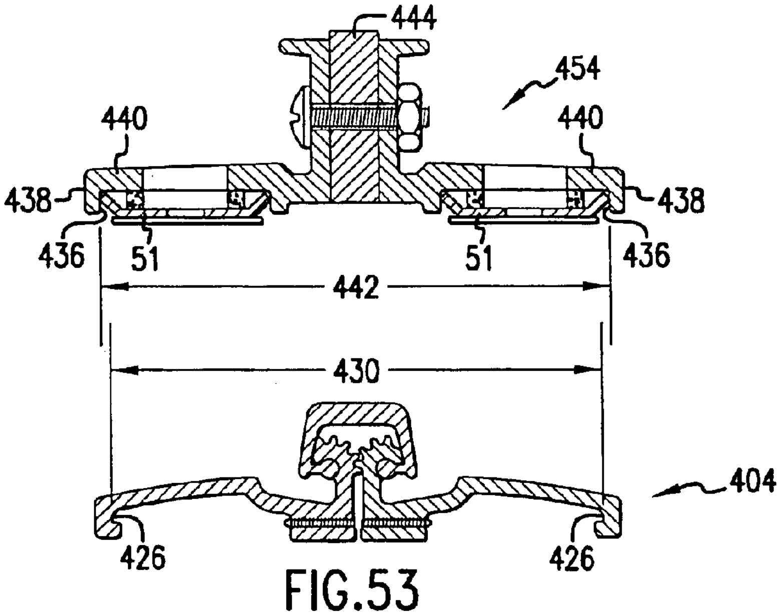
FIG. 53 is a cross-sectional top view of another embodiment of a positioning tool and hinge.

The positioning tool 434 of FIG. 53 is wider than positioning tool 400, and is configured to locate the bases 51 at a distance greater than when the hinge 404 is mounted thereto. The inner surfaces 436 of the outer lateral walls 438 of the mounting portions 440 are spaced by a tool distance 442, which is greater than mounted distance 430. The width of the positioning tool 434 can be controlled by the size of spacer 444, and a narrower spacer can be employed similarly with positioning tool 400.

Figure 54:
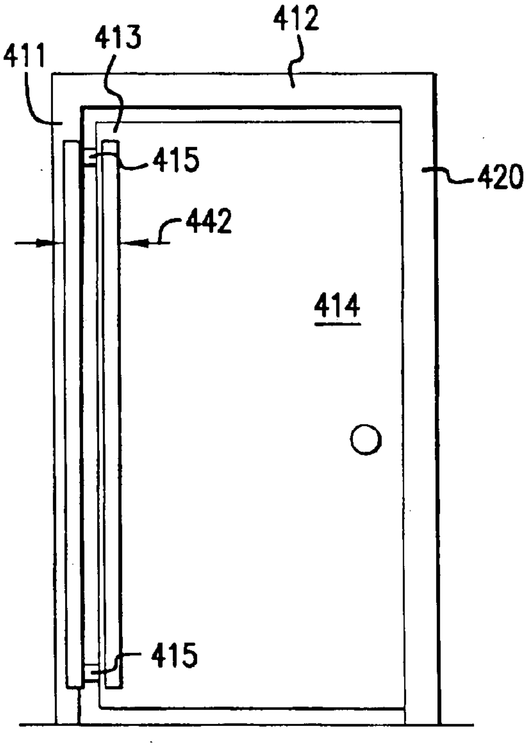
FIGS. 54–55 are a front view showing steps of mounting a door with a different positioning tool.
Figure 55:
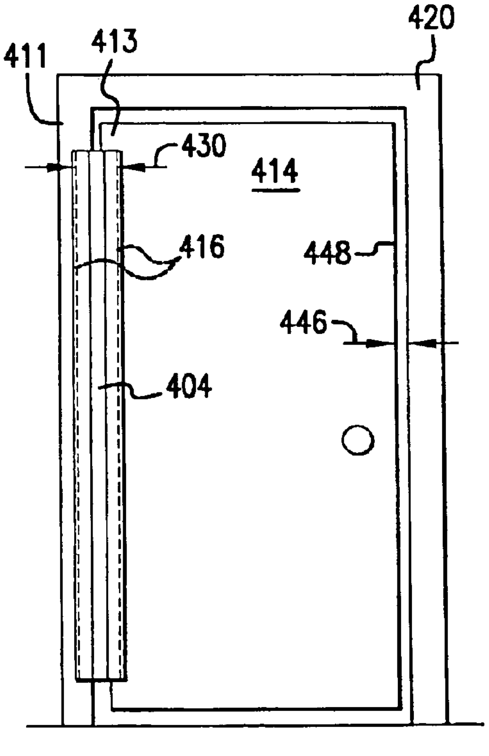

As shown in FIG. 54, door 414 is placed against the latch side 420 of the frame 412, and wedges 415 hold the door 414 in place on the hinged side 411. The wedges 415 can be of different sizes where one or both of the door and frame are out of square, as shown. Positioning tool 434 is configured to locate the bases 51 with respect to the latch side of the frame 412, and to provide a clearance 446 between the latch sides 448,420 of the door 414 and frame 412. Tool distance 442 is substantially equal to the sum of distance 430 and clearance 446, shown in FIG. 55. The mounting bases 51 are positioned closer to each other in FIG. 54, as located by the positioning tool 434, than when mounted to the hinge 404, as shown in FIG. 55. The latch sides 448,420 are disposed generally parallel to each other both when attaching the bases 51 to the frame and door 412,414 and when the hinge 404 is mounted. The hinge mounting method shown in FIGS. 53–55 provides optimum clearance on the exposed edge of the door and contributes to proper latch clearance and operation. The difference between the tool distances 410,442 and the mounted distance 430 is greater than about 2% in some installations, greater than about 5% in others, and can be greater than 10% or 20% in others.

Figure 56:
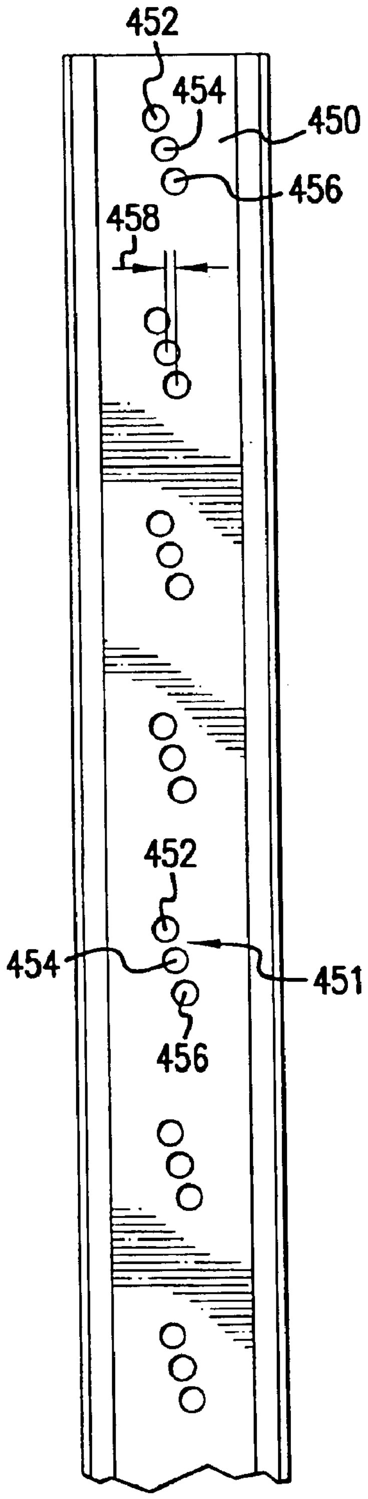
FIG. 56 is a front view of an alternative embodiment of a mounting base.

Referring to FIG. 56, mounting base 450 includes a fastening assembly that comprises part of the attachment portion 451 of the base 450 and fasteners that extend through mounting holes 452–456. This part of the attachment portion has a plurality of sets of fastener openings for attaching to a hinged object. Three sets 452–456 are shown, each set including holes preferably substantially longitudinally aligned for use together. The central set 454 can be used initially to attach the mounting base 450. If the clearance between the two hinged objects is different than desired once the hinge is mounted, the fasteners placed in the set of holes 454 can be removed, the base 450 shifted laterally and longitudinally to align another set of base holes 452 or 456 with the holes already present in the hinged object, and the fasteners can be replaced in the newly aligned set of holes 452 or 456. Thus, the spacing 458 between adjacent sets of holes 452–456 determines the changes in clearance between the mounted hinged objects and the lateral position at which the base 450 is attached to the hinged object. The fastening assembly is thus associated with the attachment portion 451 for selectively attaching in a plurality of positions to the hinged object at a certain attachment position on the hinged object without re-drilling and threading of the holes in the hinged objects. In an alternative embodiment, a fastener is used that is configured for repositioning the base laterally without removing the fastener from the base or the hinged object, for example by using set screws or a rotary cam.

Figure 57:
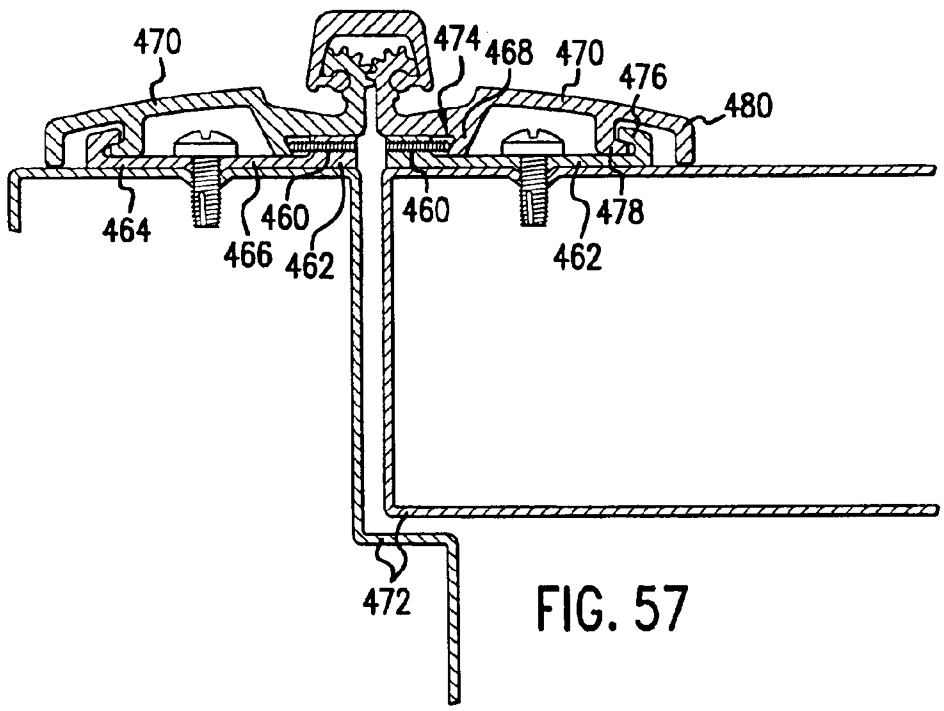
FIG. 57 is a cross-sectional top view of an alternative embodiment of a hinge.

Referring to the embodiment of FIG. 57, fasteners 460 are screwed into mounting portions 462 of mounting bases 464 through openings 469 disposed therein. The mounting portions 462 are elevated with respect to an adjacent recessed portion 466 of the mounting bases 462. The fasteners engage mounting portions 468 of hinge members 470. Similarly to the upturned edges 68 of the mounting base 51 shown in FIG. 1, the hinge member mounting portions 468 preferably include a surface that is angled with respect to the corresponding fastener 460 and base 464 so that tightening the fastener 460 draws the hinge members 470 tighter against the base 464 or hinged object 472. Preferably, the fasteners 460 are received in recesses 474 of the hinge members 470. The bases 464 also include a hook member 476, preferably facing inwardly, to engage and hold a corresponding hook member 478 of the hinge members 470, which preferably faces inwardly, opposite from the base hook member 476. Hinge members 470 include hook covers 480, preferably including flanges, which extend beyond the bases 464 to cover and conceal the bases 464 when mounted thereto.

Figure 58:
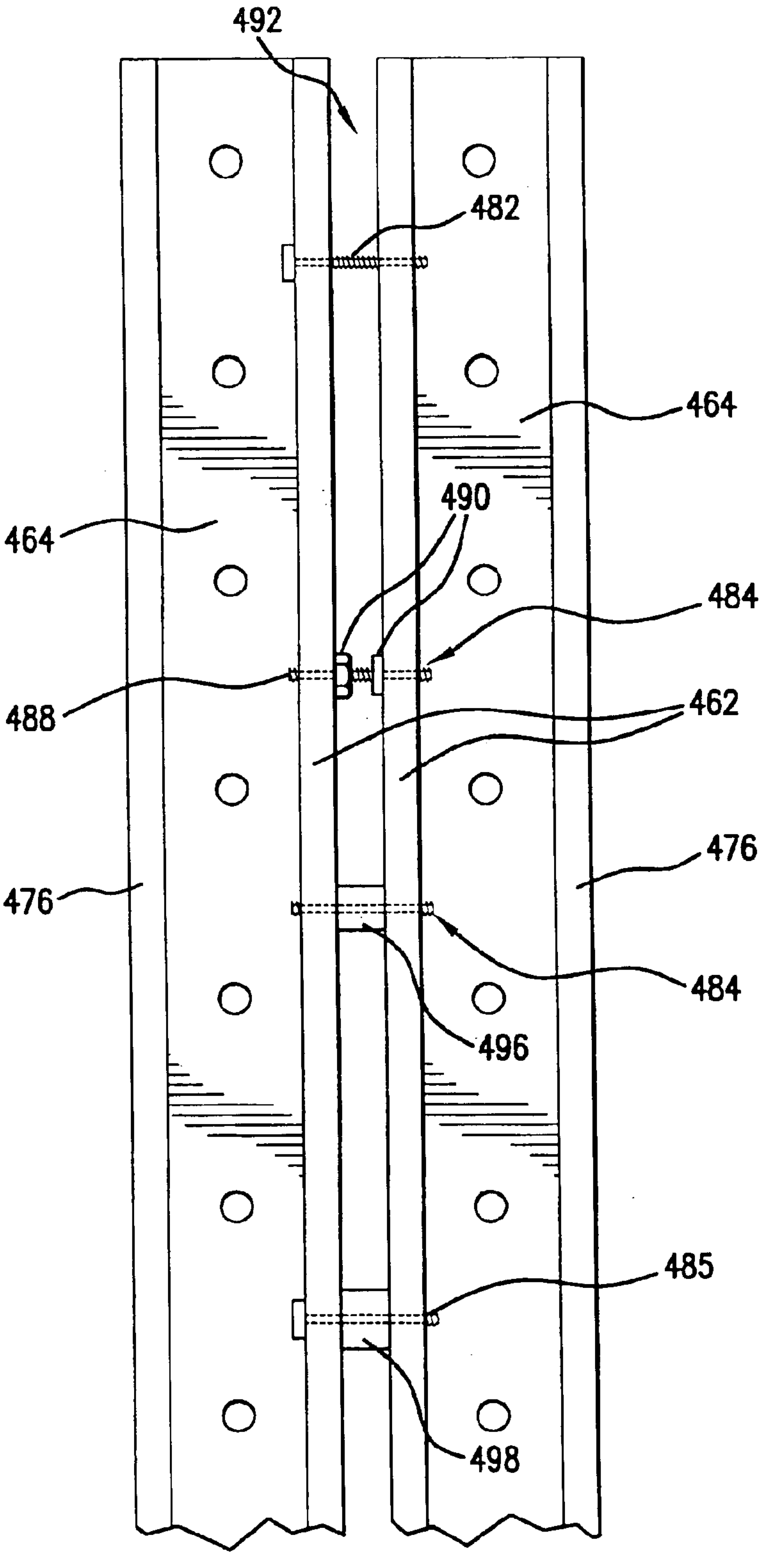
FIGS. 58 and 59 are front views of mounting bases thereof with a alternative positioning tools.

Referring to FIG. 58, alternative embodiments of a positioning tool using bases 464 of FIG. 57 includes mounting fasteners 482,485 fastening the two base 464 together. Spacers 484,486 show some alternative embodiments that have been placed between the bases 464 through openings 499 disposed therein. Preferably, the openings 499 are the same openings 469 through which fasteners 460 pass to secure the hinge members 470 to the bases 464, as shown in FIG. 57.

Spacer 484 includes a threaded rod 488, preferably of smaller diameter than the opening 499 of the base 464 through which it is received, as the opening is also preferably threaded to receive fasteners 460, shown in FIG. 57. Two adjustable nuts 490 are screwed onto the rod 488 to a selected separation, to preset the size of mounting gap 492 between the bases 464 when the fasteners 482,485 are tightened to hold and draw the bases 464 closer together.

Alternative embodiment spacer 486 includes a smooth rod 494, sized to be slidably received through the openings 499 in bases 464 and through a spacer 496, to set the size of the gap 492 when the fasteners 482,485 are tightened.

Fastener 485 is received through spacer 498, to which is may be screwed or slidably received. Spacer 498 may also set the gap 492 size, and another spacer 498 may also optionally be used with fastener 482.

Figure 59:
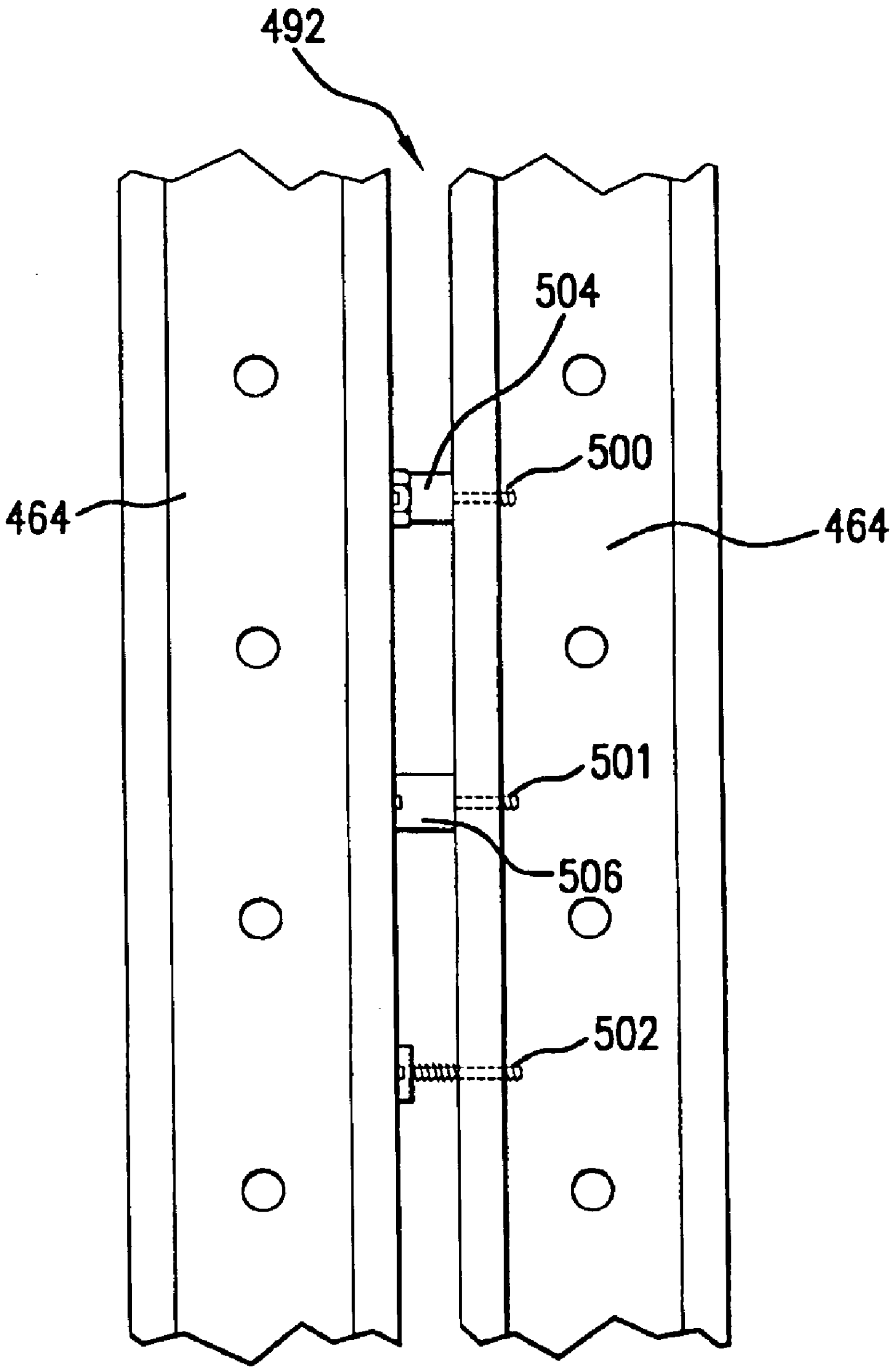

Referring to FIG. 59, the positioning tool includes fasteners 500–502, which are screwed into the bases 464 to a position to set the size of gap 492 when the base 464, opposite from the base 464 to which the fasteners 500–502 are attached, abuts the ends of the fasteners 500–502, preferably the fastener heads. Fastener 500 is received through spacer 504, to preset the position of the fastener 500 to set the gap 492 size. Fastener 501 has a head 506 to preset the depth of fastener insertion into the base 464, in turn, to set the gap 492 depth. Additional fasteners can be used to hold the bases 464 together.

With reference to FIGS. 58 and 59, it will be appreciated that any combination of the foregoing fasteners, rods, and spacers may be used, in addition to other similar fixed or adjustable gap-setting means which are suitable. Furthermore, alternative gap-setting means can be used between the bases 464 that do not rely on inserting a rod or fastener through openings in the bases.

Figure 72:
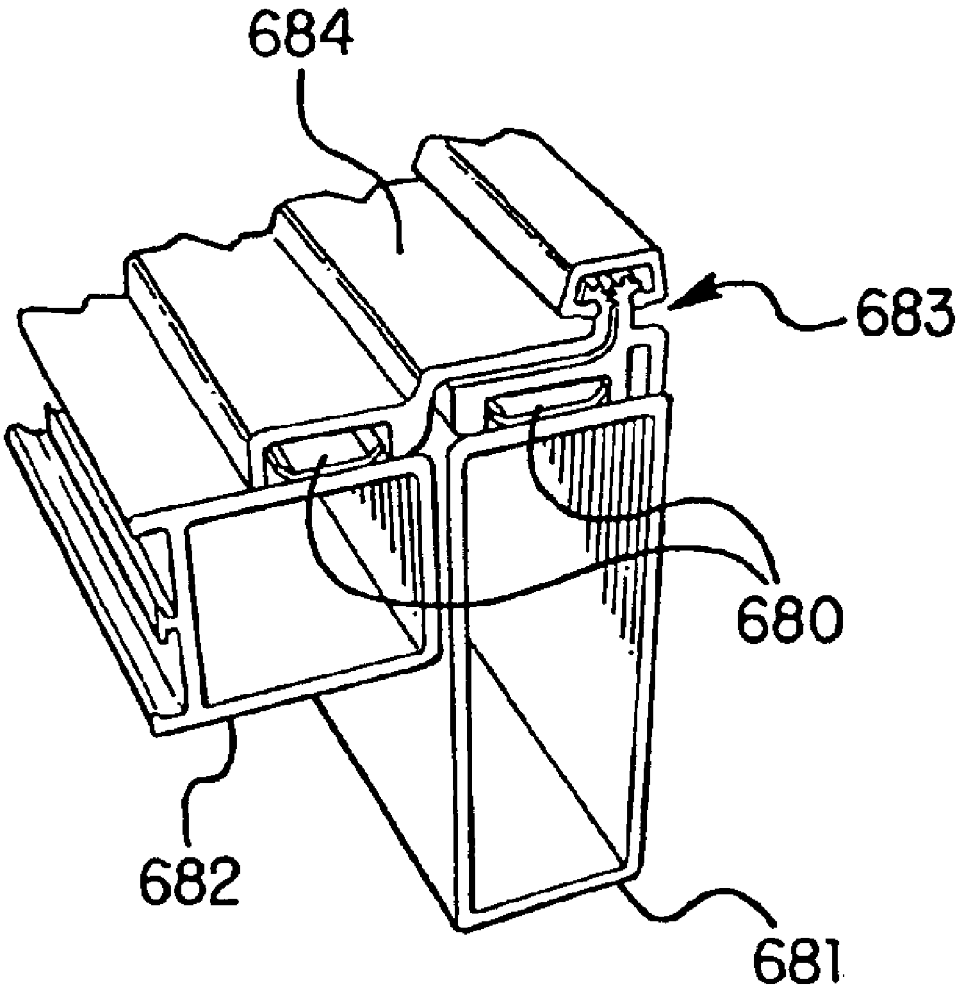
FIG. 72 is a perspective view of an asymmetrical hinge according to the invention in which the pivot point is located substantially over the frame.

Although the positioning tool has been discussed and shown with generally symmetrical hinges (with the exception of FIGS. 29–31 and FIG. 44), the tool may also be used with asymmetrical hinges. Referring to FIG. 72, for example, an embodiment is shown having an asymmetrical hinge 683 wherein the pivot point is located substantially over the frame 681 to achieve a wide-throw action that is very useful for many entrance doors to provide a wider opening width. Mounting bases 680 are shown attached to the frame 681 and door 682. When such hinges are normally mounted without the use of bases 680, the longer leaf 684 is typically attached to the door 682 using heavy duty "sex-bolts" (through-bolts having an elongated cylindrically-shaped nut and bolt going through the nut) for added support. The sexbolts are cumbersome to install because a hole must be pre-drilled through the entire thickness of the door. Conversely, the mounting bases 680 can be mounted to the door using a plurality of screws (e.g., pan-head screws). Because the mounting base and screw arrangement distributes the load more evenly along the height of the door, the need for sexbolts is eliminated.

Although FIG. 72 shows an assymetrical hinge of the pinless design, it will be appreciated that the invention may also be used with pinned or pinned and covered hinges of the types shown in FIG. 45, for example.

The invention described and claimed herein is not to be limited in scope by the specific embodiments herein disclosed, as these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. For example, the mounting bases and the hinge members can have configurations engageable with each other different than shown, such as with a protrusion extending outwardly from the hinge member to engage inwardly facing shoulders of the bases. Such modifications are also intended to fall within the scope of the appended claims.

The disclosure of U.S. Pat. Nos. 5,778,491 and 5,991,975 is hereby incorporated by reference in their entirety.

What is claimed:

1. A method of mounting a hinge comprising:

(a) providing a hinge comprising:
 - a first elongated mounting base having a length and two longitudinally extending lateral sides for mounting a hinge member to the first base, the first base attachable to a first hinged object;
 - a first hinge member configured to engage the two lateral sides of the first base;
 - a second hinge member pivotally connected to the first hinge member, and
 - at least one first locking member associated with the first hinge member for locking the first hinge member to the first base in a plurality of mounted positions, the first locking member engaging one of the lateral sides of the first base to lock the first hinge member to the first base, the first locking member movable from a locked position for locking the first hinge member to the first base to an unlocked position for releasing the first hinge member from the first mounting base;

(b) mounting the first base to the first hinged object;

(c) placing the first hinge member against the first base; and (d) engaging the first locking member of the first hinge member with one of the lateral sides of the first base, thereby locking the first binge member to the first base.

2. The method of claim 1, wherein the first locking member comprises a set screw, the step of engaging the first locking member with the first base further comprising tightening the set screw against one of the lateral sides of the first base.

3. The method of claim 1, further comprising the hinge comprising a second elongated mounting base having a length and two longitudinally extending lateral sides for mounting the second hinge member to the second base, the second base attachable to a second hinged object, and further comprising the step of mounting the second base to the second hinged object.

4. The method of claim 3, further comprising at least a second locking member associated with the second hinge member for locking the second hinge member to the second base, and further comprising the steps of placing the second hinge member against the second base and engaging the second locking member with one of the lateral sides of the second base, thereby locking the second hinge member to the second base.

5. The method of claim 1, further comprising at least one of the lateral sides of the first mounting base having a fastening surface and the first hinge member having an inwardly curved hook, wherein placing the first hinge member against the first base includes hooking the curved hook of first hinge member against the fastening surface of the first base.

6. The method of claim 5, further comprising the step of rotating the hooked first hinge member against the first base prior to locking the first hinge member to the first base.

7. The method of claim 1, wherein the first hinged object is a door or a door frame.

8. A method of mounting a hinge comprising:

(a) providing a hinge-mounting positioning tool comprising:

a first base positioner configured and adapted for receiving a first hinge mounting base, the first base for mounting to a first hinged object;

a detachable second base positioner configured and adapted for receiving a second hinge mounting base, the second base for mounting to a second hinged object; and a connecting means for releaseably holding the first and second mounting base positioners together;

(b) providing the first base and a first hinge member;

(c) connecting the first base to the first base positioner;

(d) aligning and spacing the first base in a mounting position on the first hinged object with the positioning tool; and (e) attaching the first base to the first hinged object; and (f) mounting the first hinge member to the first base.

9. The method of claim 8, wherein attaching the first base to the first hinged object includes fastening a fastener through the first base into the first hinged object.

10. The method of claim 8, wherein the first hinged object is a door or a door frame.

11. The method of claim 8, further comprising the steps of providing the second base and a second hinge member, connecting the second base to the second base positioner, aligning and spacing the second base in a mounting position on the second hinged object with the positioning tool, attaching the second base to the second hinged object, and mounting the second hinge member to the second base.

12. A method of mounting hinge mounting bases to hinged objects with a positioning tool comprising:

providing a first hinge mounting base and a second hinge mounting base, the mounting bases connected to one side of a positioning tool comprising a web and held at a predetermined distance from each other on the positioning tool;

placing the positioning tool with connected bases against a first hinged object and a second hinged object;

attaching the first mounting base to the first hinged object; and attaching the second mounting base to the second hinged object;

whereby the first and second mounting bases are attached to the first and second hinged objects, respectively, at the predetermined distance from each other.

13. The method of claim 12, wherein the positioning tool holds the first and second mounting bases in a substantially parallel relationship to each other.

14. The method of claim 12, wherein the web is flexible, and further comprising the step of pulling the web to a generally flat condition upon placing the positioning tool against the first and second hinged objects before attaching the first mounting base to the first hinged object.

15. The method of claim 12, further comprising the step of severing the web between the first and second mounting bases after attaching at least the first mounting base to the first hinged object.

16. The method of claim 12, wherein the first and second mounting bases are generally elongated.

17. The method of claim 12, further comprising the first and second mounting bases being connected to the positioning tool by a layer of adhesive.

18. The method of claim 17, further comprising a layer of adhesive disposed on the positioning tool on a side opposite the side where the first and second hinge members are connected, and further comprising the step of attaching the positioning tool to the first and second hinged objects by the adhesive disposed on the opposite side.

19. The method of claim 18, wherein the adhesive disposed on the opposite side is double-sided tape.

* * * * *